US012753072B2

(12) United States Patent
Dagle et al.

(10) Patent No.: US 12,753,072 B2
(45) Date of Patent: Oct. 6, 2026

(54) THERMOCATALYTIC DECOMPOSITION OF METHANE USING CATALYST SYSTEM DESIGN AND OPERATIONAL PARAMETERS TO CONTROL PRODUCT YIELD AND PROPERTIES

(71) Applicants: Battelle Memorial Institute, Richland, WA (US); West Virginia University, Morgantown, WV (US)

(72) Inventors: Robert A. Dagle, Richland, WA (US); Juan A. Lopez-Ruiz, Richland, WA (US); Robert S. Weber, Walla Walla, WA (US); Mengze Xu, Beijing (CN); Jianli Hu, Morgantown, WV (US); Changle Jiang, Morgantown, WV (US)

(73) Assignees: Battelle Memorial Institute, Richland, WA (US); West Virginia University, Morgantown, WV (US)

( * ) Notice: Subject to any disclaimer, the term of this patent is extended or adjusted under 35 U.S.C. 154(b) by 668 days.

(21) Appl. No.: 18/201,632

(22) Filed: May 24, 2023

(65) Prior Publication Data

US 2023/0382727 A1 Nov. 30, 2023

Related U.S. Application Data

(60) Provisional application No. 63/345,603, filed on May 25, 2022.

(51) Int. Cl.

| | |
|---|---|
| ***C01B 3/26*** | (2006.01) |
| ***B01J 21/18*** | (2006.01) |
| ***B01J 23/755*** | (2006.01) |
| ***B01J 35/30*** | (2024.01) |
| ***B01J 35/77*** | (2024.01) |
| ***B01J 37/02*** | (2006.01) |
| ***B01J 37/08*** | (2006.01) |
| ***C01B 32/05*** | (2017.01) |

(52) U.S. Cl.

CPC ................. *C01B 3/26* (2013.01); *B01J 21/18* (2013.01); *B01J 23/755* (2013.01); *B01J 35/393* (2024.01); *B01J 35/77* (2024.01); *B01J 37/0201* (2013.01); *B01J 37/088* (2013.01); *C01B 32/05* (2017.08); *B01J 35/30* (2024.01); *B01J 2235/00* (2024.01); *B01J 2235/10* (2024.01); *B01J 2235/15* (2024.01); *B01J 2235/30* (2024.01); *C01B 2203/0277* (2013.01); *C01B 2203/1076* (2013.01); *C01B 2203/1241* (2013.01)

(58) Field of Classification Search

CPC ... C01B 3/26; C01B 32/05; C01B 2203/0277; C01B 2203/1076; C01B 2203/1241; C01B 2203/043; C01B 2203/1058; B01J 21/18; B01J 23/755; B01J 35/393; B01J 35/77; B01J 37/0201; B01J 37/088; B01J 35/30; B01J 2235/00; B01J 2235/10; B01J 2235/15; B01J 2235/30; B01J 21/185; B01J 23/72; B01J 33/00; B01J 35/615; B01J 37/14; B01J 37/18

See application file for complete search history.

(56) References Cited

U.S. PATENT DOCUMENTS

| | | | |
|---|---|---|---|
| 6,995,115 | B2 | 2/2006 | Wang et al. |
| 7,338,917 | B2 | 3/2008 | Matsuo et al. |
| 7,354,563 | B2 | 4/2008 | Smalley et al. |
| 7,364,712 | B2 | 4/2008 | Ohtsuka et al. |
| 8,236,271 | B2 | 8/2012 | Dupeyrat-Batiot et al. |
| 9,050,583 | B2 | 6/2015 | Ozaki et al. |
| 2008/0107586 | A1 | 5/2008 | Smalley et al. |
| 2009/0208391 | A1 | 8/2009 | Ma et al. |
| 2022/0339609 | A1 | 10/2022 | Hu et al. |

FOREIGN PATENT DOCUMENTS

| | | |
|---|---|---|
| CN | 101337655 A | 1/2009 |
| CN | 103007945 A | 4/2013 |
| WO | WO 2021/087405 | 5/2021 |

OTHER PUBLICATIONS

Shen, et al., Synthesis of Ni and Ni—Cu supported on carbon nanotubes for hydrogen and carbon production by catalytic decomposition, Applied Catalysis B: Environmental 2015; 164: 61-69 (Year: 2015).*

Baca, et al., Synthesis of Ni—Cu Catalysts by Impregnation to Obtain Carbon Nanofibers by Catalytic Decomposition of Methane, Rev Soc Quim Peru 2018; 84(1): 91-106 (Year: 2018).*

Chen et al., "Formation of bamboo-shaped carbon filaments and dependence of their morphology on catalyst composition and reaction conditions," Carbon, 39(10): 1467-1475, Jun. 26, 2001.

Rehyana et al., "Effect of Ni, Pd and Ni—Pd nano-islands on morphology and structure of multi-wall carbon nanotubes," *Applied Surface Science*, 253, 8458-8462 (2007).

Shen et al., "Synthesis of Ni and Ni—Cu supported on carbon nanotubes for hydrogen and carbon production by catalytic decomposition of methane," *Applied Catalysis B: Environmental*, 164, 61-69 (2014).

Almiron Baca, J. et al., "Synthesis of Ni—Cu Catalysts by Impregnation to Obtain Carbon Nanofibers by Catalytic Decomposition of Methane," *Rev. Soc. Quim. Peru.*, vol. 84, No. 1, pp. 91-106 (2018).

International Search Report and Written Opinion for Application No. PCT/US2023/023401, mailed Sep. 8, 2023, 8 pages.

Shen, Y. et al., "Deactivation of bimetallic nickel-copper alloy catalyst in thermocatalytic decomposition of methane," *Catal. Sci. Technol.*, vol. 8, pp. 3853-3862 (2018).

(Continued)

*Primary Examiner* — Daniel C. Mccracken

(74) *Attorney, Agent, or Firm* — Klarquist Sparkman, LLP

(57) ABSTRACT

Disclosed herein are aspects of a method for contacting a methane composition with a catalyst system to produce $H_2$ and a carbon co-product. In some aspects, the catalyst system comprises (i) a Ni—Cu alloy catalyst comprising Ni and Cu, and (ii) a support. In some additional aspects, the Ni and Cu are present at a Ni:Cu mass ratio ranging from greater than zero to 4.5. Also disclosed herein are aspects of a method for making the disclosed catalyst system.

20 Claims, 46 Drawing Sheets

(56) References Cited

OTHER PUBLICATIONS

Wang, I-W. et al., "Catalytic Decomposition of Methane into Hydrogen and High-Value Carbons: Combined Experimental and DFT Computational Study," *Catal. Sci. Technol.*, vol. 11, pp. 4911-4921 (2021).

Office action issued for Saudi Arabia Application No. SA 1120246564, issued on Feb. 11, 2026.

* cited by examiner

THERMOCATALYTIC DECOMPOSITION OF METHANE USING CATALYST SYSTEM DESIGN AND OPERATIONAL PARAMETERS TO CONTROL PRODUCT YIELD AND PROPERTIES

CROSS REFERENCE TO RELATED APPLICATION

This application claims the benefit of and priority to the earlier filing date of U.S. Provisional Application 63/345,603, filed May 25, 2022, which is incorporated by reference in its entirety herein.

ACKNOWLEDGMENT OF GOVERNMENT SUPPORT

This invention was made with government support under Contract DE-AC05-76RL01830 awarded by the U.S. Department of Energy. The government has certain rights in the invention.

FIELD

A method for using a catalyst system to convert a methane composition to produce $H_2$ and a carbon co-product is disclosed, which utilizes operational parameters and catalyst system tuning to control yields and morphologies of $H_2$ and/or carbon co-product formation. Also disclosed is a method to make the catalyst system used in method aspects herein.

PARTIES TO JOINT RESEARCH AGREEMENT

This invention was made under a CRADA (CRADA 401) between C4-MCP, LLC and Pacific Northwest National Laboratory operated for the United States Department of Energy.

BACKGROUND

Thermocatalytic decomposition (TCD) of methane ($CH_4$) offers a path to generating $H_2$ without incurring the production of any $CO_2$. Catalyst systems conventionally used in such methods often experience deactivation at the high temperatures typically desired for good yields using TCD. A need exists in the art for a method to generate and use a catalyst system that is stable and active at relatively high operation temperature to enable broader application of TCD. Commercialization of TCD process also would benefit from being able to recover and sell carbon by-products generated by TCD methods; therefore, there also exists a need in the art for a method that can produce suitable carbon by-products having high quality and purity.

SUMMARY

Disclosed herein are aspects of a method, comprising: contacting a methane composition with a catalyst system at a reaction temperature ranging from 500° C. to 700° C. to produce $H_2$ and a carbon co-product. In some aspects, the catalyst system comprises (i) a Ni—Cu alloy catalyst comprising Ni and Cu, and (ii) a support, wherein the Ni and Cu are present at a Ni:Cu mass ratio ranging from greater than zero to 4.5.

Also disclosed are aspects of a method for making a catalyst system, comprising: i) contacting a solution comprising a first metal with a support material to impregnate the support material with the first metal, thereby forming an impregnated support; ii) heating the impregnated support using a ramping temperature protocol to provide a pre-catalyst system, wherein the ramping temperature protocol comprises increasing a temperature to which the impregnated support is exposed by 5° C. per minute until a final temperature of 350° C. is reached; iii) contacting the pre-catalyst system with a second metal to form a bimetallic impregnated support; and (iv) heating the bimetallic impregnated support using the ramping temperature protocol to provide the catalyst system. In some aspects, the first metal and the second metal are different from each other and independently are selected from Ni and Cu and wherein the first metal and the second metal provide a Ni:Cu mass ratio ranging from greater than zero to 4.5.

The foregoing and other objects, features, and advantages of the present disclosure will become more apparent from the following detailed description, which proceeds with reference to the accompanying figures.

BRIEF DESCRIPTION OF THE DRAWINGS

FIGS. 1A-1D show XRD patterns of catalyst systems before and after reaction at 600° C. under different $CH_4$ concentrations, wherein FIG. 1A shows the pattern for a 5Ni-0.5Cu/CNT catalyst system, FIG. 1B shows the pattern for a 10Ni-1Cu/CNT catalyst system, FIG. 1C shows the pattern for a 20Ni-2Cu/CNT catalyst system, and FIG. 1D shows the pattern for a 40Ni-4Cu/CNT catalyst system.

FIGS. 3A-3D are Raman spectra that compare the Raman profiles of different catalyst systems synthesized via the ST method or an incipient wetness (IW) method; wherein FIG. 3A shows comparisons between the catalyst systems made using the ST method after use in TCD performed using 30 vol. % $CH_4$ in $N_2$ at 600° C.; FIG. 3B shows comparisons between the catalyst systems after use in TCD performed using 100 vol. % $CH_4$ at 600° C.; FIG. 3C shows comparisons between the catalyst systems made using the IW method after use in TCD performed using 30 vol. % $CH_4$ in $N_2$ at 600° C.; and FIG. 3D shows the Raman spectra obtained from analyzing a 10Ni-1Cu/CNT catalyst made using the ST method during an acid wash (AW) step and after having being used in different cycles of TCD using 100 vol. % $CH_4$ at 600° C.

FIGS. 5A-5D are graphs showing temperature profiled oxidation (TPO) profiles of different catalyst systems synthesized via the ST method before reaction ("fresh") and after reaction ("spent") using TCD under (a) 30 vol %. $CH_4$ in $N_2$ and (b) 100 vol. % $CH_4$ at 600° C., wherein FIG. 5A shows results for a 5Ni-0.5Cu/CNT catalyst system, FIG. 5B shows results for a 10Ni-1Cu/CNT catalyst system, FIG. 5C shows results for a 20Ni-2Cu/CNT catalyst system, and FIG. 5D shows results for a 40Ni-4Cu/CNT catalyst system.

(FIG. 6A), and average carbon deposition rate $H_2$ production during the first 20 min for 5Ni-0.5Cu/CNT, 10Ni-1Cu/CNT, 20Ni-2Cu/CNT, and 40Ni-4Cu/CNT catalyst systems prepared by the ST method (FIG. 6B), wherein all catalyst systems were tested at 600° C. using a methane composition flow rate of 30 $cm^3$/min with 30 vol % $CH_4$, as well as flow rates of 30, 60, and 120 $cm^3$/min with 100 vol. % $CH_4$.

FIGS. 7A-7B show results obtained from analyzing TCD performance of different catalyst systems synthesized using the ST method and used in TCD at 100 vol. % $CH_4$ at 600° C. with different flow rates, wherein FIG. 7A shows the $CH_4$ conversion percentage and FIG. 7B shows the carbon deposition rate.

(FIGS. 29A-29D) and 700° C. FIG. 29N is the histogram representing the change in elemental distribution between spent at 600° C. and 700° C.

(FIGS. 30A-30D) and 700° C. (FIGS. 30E-30H) using a methane composition flow rate of 30 $cm^3$/min with 30 vol. % $CH_4$ in $N_2$; FIG. 30I is a histogram representing the change in elemental distribution between spent at 600° C. and 700° C.

FIGS. 31A-31D show TPO plots of spent catalyst systems retrieved after reaction, wherein FIG. 31A shows the catalyst systems NiCux/CNT (wherein x=0, 0.6, 1, 2, 5, 10, and 15) at reaction of 600° C.; FIG. 31B shows the results for a Ni/CNT catalyst system; FIG. 31C shows the results for a NiCu1/CNT catalyst system; and FIG. 31D shows results for a NiCu15/CNT at different reaction temperatures (600° C., 650° C. and 700° C.) respectively.

(FIGS. 32A-32F) and at 700° C. (FIGS. 32G and 32H) using a methane composition flow rate of 30 $cm^3$/min with 30 vol % $CH_4$ in $N_2$.

(FIG. 35A); a Ni/CNT catalyst system using TCD at different reaction temperatures; a NiCu1/CNT catalyst system using TCD at different reaction temperatures; and a NiCu15/CNT catalyst system using TCD at different temperatures using a methane composition flow rate of 30 $cm^3$/min with 30 vol % $CH_4$ in $N_2$, wherein the spectra were collected using a 10 mW laser at a 532 nm excitation wavelength (with the exception of Ni/CNT run at >600° C., all the other catalyst system run at 700° C. with a CNT support exhibited results wherein >80% of the mass of the catalyst system was composed of carbon co-product generated during TCD).

DETAILED DESCRIPTION

I. Overview of Terms

Figure 1A:
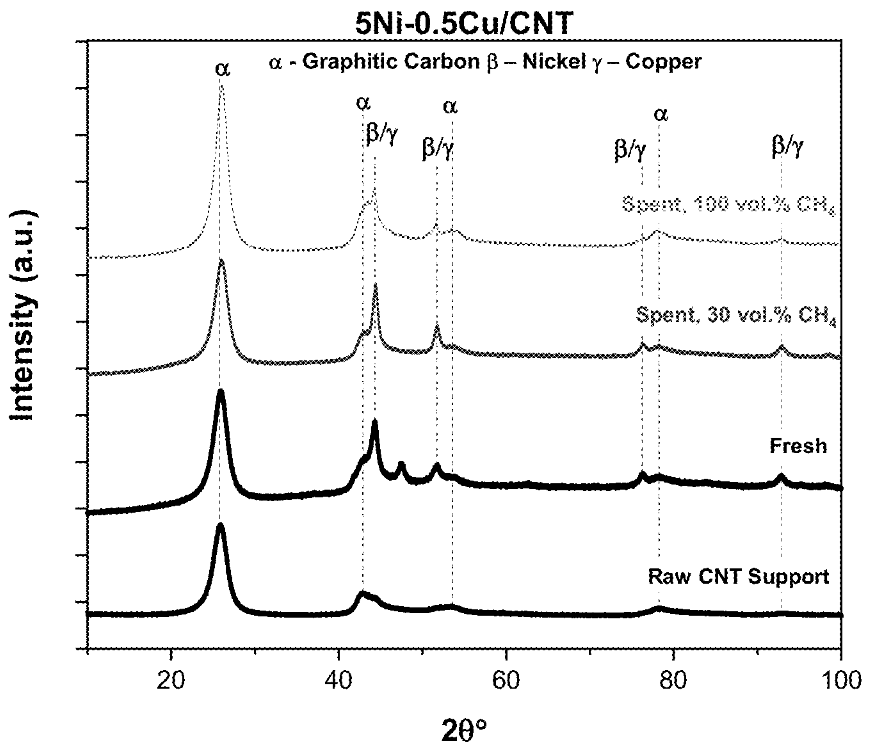
Figure 1B:
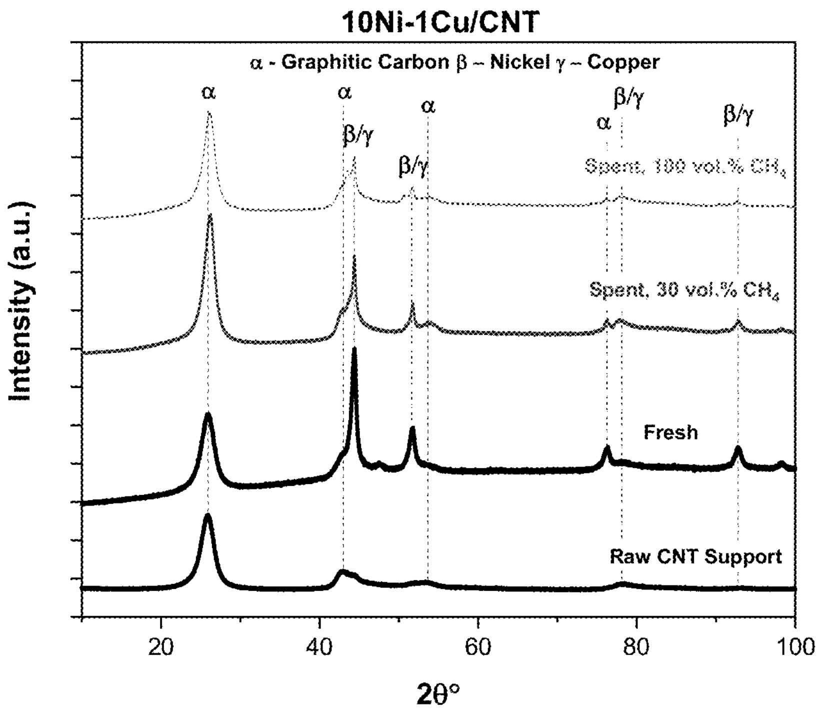
Figure 1C:
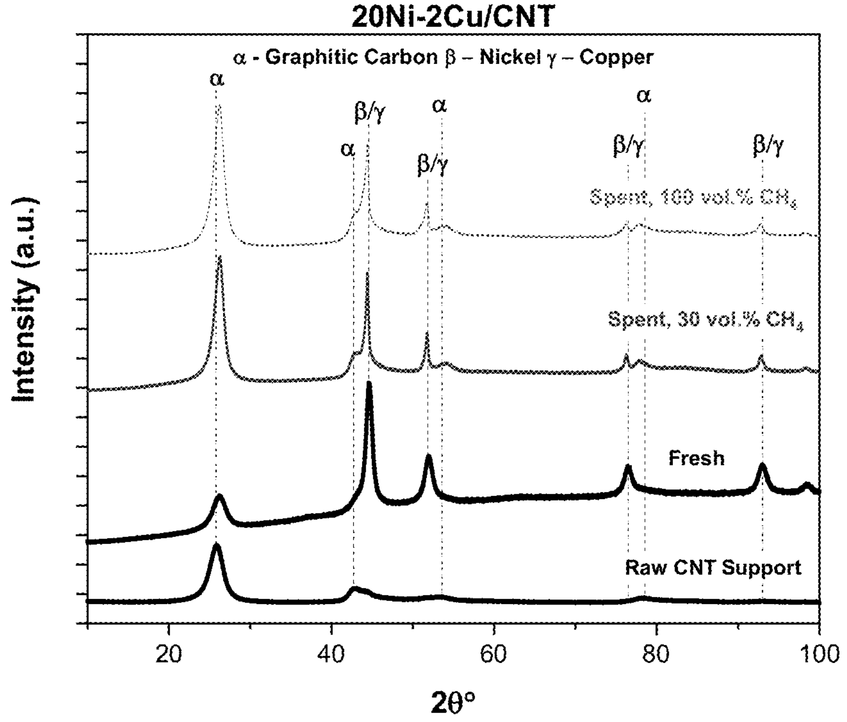
Figure 1D:
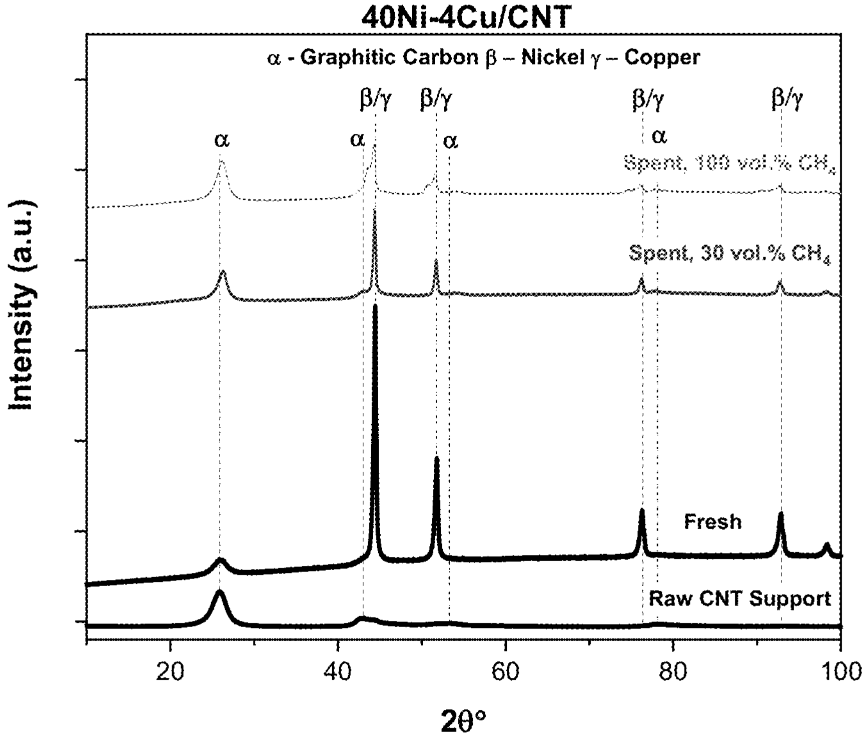

The following explanations of terms and abbreviations are provided to better describe the present disclosure and to guide those of ordinary skill in the art in the practice of the present disclosure. As used herein, "comprising" means "including" and the singular forms "a" or "an" or "the" include plural references unless the context clearly dictates otherwise. The term "or" refers to a single element of stated alternative elements or a combination of two or more elements, unless the context clearly indicates otherwise.

Unless explained otherwise, all technical and scientific terms used herein have the same meaning as commonly understood to one of ordinary skill in the art to which this disclosure belongs. Although methods and materials similar or equivalent to those described herein can be used in the practice or testing of the present disclosure, suitable methods and materials are described below. The materials, methods, and examples are illustrative only and not intended to be limiting. Other features of the disclosure are apparent from the following detailed description and the claims.

The disclosure of numerical ranges should be understood as referring to each discrete point within the range, inclusive of endpoints, unless otherwise noted. Unless otherwise indicated, all numbers expressing quantities of components, molecular weights, percentages, temperatures, times, and so forth, as used in the specification or claims are to be understood as being modified by the term "about." Accordingly, unless otherwise implicitly or explicitly indicated, or unless the context is properly understood by a person of ordinary skill in the art to have a more definitive construction, the numerical parameters set forth are approximations that may depend on the desired properties sought and/or limits of detection under standard test conditions/methods as known to those of ordinary skill in the art. When directly and explicitly distinguishing aspects from discussed prior art, the embodiment numbers are not approximates unless the word "about" is recited.

Also, the following description is exemplary in nature and is not intended to limit the scope, applicability, or configuration of the present disclosure. Various changes to the described embodiment may be made in the function and arrangement of the elements described herein without departing from the scope of the preset disclosure. Further, descriptions and disclosures provided in association with one particular embodiment are not limited to that embodiment and may be applied to any embodiment disclosed. Further, the terms "coupled" and "associated" generally mean fluidly, electrically, and/or physically (e.g., mechanically or chemically) coupled or linked and does not exclude the presence of intermediate elements between the coupled or associated items absent specific contrary language.

Although the operations of exemplary aspects of the disclosed method and/or system aspects may be described in a particular, sequential order for convenient presentation, it should be understood that disclosed aspects of the disclosure can encompass an order of operations other than the particular, sequential order disclosed, unless the context dictates otherwise. For example, operations described sequentially may in some cases be rearranged or performed concurrently. Further, descriptions and disclosures provided in association with one particular embodiment are not limited to that embodiment and may be applied to any disclosed embodiment.

To facilitate review of the various aspects of the disclosure, the following explanations of specific terms are provided.

Carbon co-product: A solid carbonaceous product produced by thermocatalytic decomposition (TCD) of methane ($CH_4$) using a method according to the present disclosure.

$CH_4$ conversion rate: $CH_4$ conversion, $X_{CH_4}$, is calculated based on the amount of $CH_4$ reacted in a method according to the present disclosure and can be calculated using Equation (1):

$$X_{CH_4}(t)/\% = \frac{F_{In}\cdot[CH_4]_{in} - F_{Out}\cdot[CH_4]_{Out}}{F_{In}[CH_4]_{In}}\cdot 100 \quad (1)$$

where $F_{In}$ is the flow rate of the feed gas before reaction starts; $[CH_4]_{In}$ is the concentration of $CH_4$ in the feed gas; $F_{out}$ is the flow rate of the outlet gas; $[CH_4]_{Out}$ is the concentration of $CH_4$ in the outlet gas.

Carbon yield: Carbon yield, $Y_C(t)$, is calculated as the accumulated weight of carbon produced per mass of the catalyst based on the $CH_4$ conversion.

Carbon deposition rate: Carbon deposition rate is calculated as the accumulated weight of carbon produced per mass of the catalyst based on the $CH_4$ conversion over a specific time period.

Carbon nanotube (CNT): Carbon nanotubes are cylindrical structures made of carbon atoms. Carbon nanotubes typically have diameters measured in nanometers. As used herein, this term includes single-wall CNT (SWCNT), double-wall CNT (DWCNT), multi-wall CNT (MWCNT), and other forms of CNTs.

Carbon Nanomaterial: A carbon-based material having at least one dimension on the nanometer scale in size (e.g., from 1 nm to 1000 nm). Carbon nanomaterials can include, but are not limited to, nanoparticles, fullerenes, carbon filaments, carbon nanotubes (CNTs), carbon nanofibers (CNFs), and various graphene-based materials.

$CO_x$-Free: A method as described herein that does not produce measurable amounts of carbon dioxide (wherein x=2), carbon monoxide (wherein x=1), or related compounds as by-products. In some aspects, the processes and methods disclosed herein are $CO_x$-free, $CO_2$-free, or both. In a further aspect, $CO_x$-free and $CO_2$-free processes are environmentally-sound as they do not release excess greenhouse gases into the atmosphere.

Nominal Amount: An amount of a metal (e.g., Cu or Ni) typically present in an alloy catalyst disclosed herein. In some aspects, the nominal amount of a metal in an alloy catalyst may be different from a measured amount of that alloy catalyst, but typically not by an amount that deleteriously affects the properties of the alloy catalyst. The mass ratio values of the present disclosure are based on nominal amounts, unless otherwise indicated.

Sequential impregnation: A process in which different metal species are applied to a support material (e.g., a surface of the support material) in a sequential order. The process comprises sequentially depositing one or more layers of a first metal species onto the support material followed by depositing one or more layers of a second metal species. As used herein, sequential impregnation is different from a solvothermal method (ST).

$I_D/I_G$ ratio: The ratio of the intensity of the D band ($I_D$) (1340 $cm^{-1}$) to the intensity of the G band ($I_G$) (1580 $cm^{-1}$) as determined using Raman spectroscopy.

$I_{G'}/I_G$ ratio: The ratio of the intensity of the G' band ($I_{G'}$) (2700 $cm^{-1}$) to the intensity of the G band ($I_G$) (1580 $cm^{-1}$) as determined using Raman spectroscopy.

II. Introduction

Thermocatalytic decomposition (TCD) of methane ($CH_4$) produces hydrogen ($H_2$) and forms solid carbon as by-product. TCD offers a path to generating $H_2$ without incurring the production of $CO_2$. Thus, it converts a fossil fuel (methane) into $H_2$ that could be employed without increasing emissions of greenhouse gases. Catalyst systems have been explored for TCD reactions; however, catalyst system deactivation is still one of the challenges for methane TCD as conventional catalyst systems often exhibit deactivation at temperatures desirable for optimal yields in TCD (e.g., temperatures above 600° C.). For example, conventional nickel-based catalyst systems suffer catalyst system deactivation due to plugging of active sites with undesirable graphitic carbon. While bimetallic catalyst systems like NiPd have been used for TCD, the expensive nature of the Pd component prohibits their use in commercial/large-scale operations. Also, conventional TCD methods have not been able to produce by-products suitable for other applications, such as carbon-based by-products that might be used as materials for methods other than the TCD process.

The present disclosure is directed to a method using a tailored catalyst system for TCD that enables continuous production of $CO_2$-free $H_2$ and further produces a carbon co-product with tunable properties. The catalyst system used in the disclosed methods comprises Ni—Cu bimetallic catalyst that is specially designed to have suitable Ni:Cu ratios that provide enhanced TCD yields at high temperatures. The disclosed method further provides the ability to harness the catalyst system and operational parameters for controlling the generation and morphology of a carbon co-product that is produced during TCD and that can be isolated. In addition, the method described herein utilize controlled metal particle sizes and/or operating temperatures to influence TCD yields and/or properties of the carbon co-product.

In particular aspects of the present disclosure, relationships between catalyst system deactivation and metal particle sintering, increased Ni:Cu ratio, and/or choice of operating temperature are described and can be used to improve the output of the method (e.g., increasing H2 and/or carbon co-product yields and/or controlling/tuning the morphology and/or identity of the carbon co-product). For example, a monometallic Ni/CNT catalyst system quickly deactivates at operating temperatures >550° C.; however, the inventors of the present disclosure determined that increasing the amount of Cu addition in the Ni catalyst systems results in increasing catalyst system stability. Additionally, catalyst system stability at increased operating temperatures (e.g., >650° C.) is facilitated by Ni catalyst systems with Cu loadings described herein.

Also, as described herein the carbon co-product quality can be tuned by selecting particular Ni:Cu ratios and/or operating temperatures. The carbon co-product is mainly composed of multiwalled carbon nanotube (MWCNTs). The present inventors have determined how to control parameters like Cu addition amounts and operational temperatures to positively impact carbon co-product quality and catalyst system stability.

III. Method of Using the Catalyst System

Disclosed herein is a method for using a catalyst system to convert a methane composition to produce $H_2$ and a carbon co-product, wherein operational parameters and/or the catalyst system composition is used to tune product yields and/or carbon co-product morphology/quality. The method comprises contacting a methane composition with a catalyst system at a reaction temperature as described herein to produce $H_2$ and a carbon co-product. In some aspects, the catalyst system comprises an alloy catalyst and a support. In further aspects, the methane composition is converted to $H_2$ at a particular $CH_4$ conversion rate, and in such aspects a carbon co-product is made. In particular aspects, the catalyst system comprises a Ni—Cu alloy catalyst comprising Ni, Cu and a support, wherein the Ni and Cu are present at a Ni:Cu mass ratio that is controlled so as to improve product yields and/or carbon co-product morphology/quality. In yet additional aspects, the reaction temperature may range from 500° C. to 700° C.

In some aspects, the catalyst system comprises a bimetallic catalyst. In certain aspects, the catalyst system comprises Ni and Cu. In yet additional aspects, the catalyst system further comprises a support. In particular aspects, the Ni and Cu are present in amounts that provide a Ni:Cu mass ratio ranging from greater than zero to 25, such as greater than zero to 24.5, or greater than zero to 20, or greater than zero to 15, or greater than zero to 10, or greater than zero to 6, or greater than zero to less than 5, or greater than zero to 4.5, or greater than zero to 2, or greater than zero to 1, or 0.01 to 1, or 0.05 to 1, or 0.1 to 1, or 0.2 to 1, or 0.3 to 1, or 0.4 to 1, or 0.5 to 1. In one aspect, the Ni and Cu are present in amounts that provide a Ni:Cu mass ratio of 2:3 (Ni:Cu). In an independent embodiment, the Ni and Cu are not present in amounts that provide a Ni:Cu mass ratio of 5 (or 5:1, Ni:Cu), 10 (or 10:1, Ni:Cu), or 15 (or 15:1, Ni:Cu).

In exemplary aspects, the Ni and Cu are present in amounts that provide a Ni:Cu mass ratio ranging from greater than zero to 2, such as from 0.01 to 1, or 0.1 to 0.15, or 0.2 to 0.3, or 0.6 to 0.7. In certain aspects, the Ni and Cu are present in amounts that provide a Ni:Cu mass ratio ranging from 0.1 to 2.

A total metal weight loading may range from greater than 0 wt. % to 95 wt. %, such as greater than 0 wt. % to 90 wt. %, or greater than 0 wt. % to 80 wt. %, or greater than 0 wt. % to 70 wt. %, or greater than 0 wt. % to 60 wt. %.

In some aspects, the Ni and Cu are present at a Ni:Cu mass ratio of 2 and the total metal weight loading may range from 1 wt. % to 60 wt. %, with representative amounts including, but not limited to, 1.5 wt. %, 3 wt. %, 7.5 wt. %, 15 wt. %, 16.5 wt. %, 18 wt. %, 24 wt. %, 30 wt. %, 45 wt. %, or 60 wt. %. In certain aspects, the Ni and Cu are present as 1 wt. % Ni and 0.5 wt. % Cu, 2 wt. % Ni and 1 wt. % Cu, 5 wt. % Ni and 2.5 wt. % Cu, 10 wt. % Ni and 5 wt. % Cu, 11 wt. % Ni and 5.5 wt. % Cu, 12 wt. % Ni and 6 wt. % Cu, 16 wt. % Ni and 8 wt. % Cu, 20 wt. % Ni and 10 wt. % Cu, 30 wt. % Ni and 15 wt. % Cu, 40 wt. % Ni and 20 wt. % Cu. In one aspect, the Ni and Cu are present as 10 wt. % Ni and 5 wt. % Cu.

In some aspects, the Ni and Cu are present at a Ni:Cu mass ratio of 1 and a total metal weight loading may range from 1 wt. % to 60 wt. %, with representative amounts including, but not limited to, 2 wt. %, 10 wt. %, 20 wt. %, 30 wt. %, 40 wt. %, 50 wt. %, or 60 wt. %. In certain aspects, the Ni and Cu are present as 1 wt. % Ni and 1 wt. % Cu, 5 wt. % Ni and 5 wt. % Cu, 10 wt. % Ni and 10 wt. % Cu, 15 wt. % Ni and 15 wt. % Cu, 20 wt. % Ni and 20 wt. % Cu, 25 wt. % Ni and 25 wt. % Cu, 30 wt. % Ni and 30 wt. % Cu. In one aspect, the Ni and Cu are present as 10 wt. % Ni and 10 wt. % Cu.

In some aspects, the Ni and Cu are present at a Ni:Cu mass ratio of 0.67 and a total metal weight loading may range from 1 wt. % to 60 wt. %, with representative amounts including, but not limited to, 2.5 wt. %, 5 wt. %, 7.5 wt. %, 10 wt. %, 12.5 wt. %, 15 wt. %, 17.5 wt. %, 20 wt. %, 22.5 wt. %, 25 wt. %, 30 wt. %, 40 wt. %, 50 wt. %, or 60 wt. %. In certain aspects, the Ni and Cu are present as 1 wt. % Ni and 1.5 wt. % Cu, 2 wt. % Ni and 3 wt. % Cu, 3 wt. % Ni and 4.5 wt. % Cu, 4 wt. % Ni and 6 wt. % Cu, 5 wt. % Ni and 7.5 wt. % Cu, 6 wt. % Ni and 9 wt. % Cu, 7 wt. % Ni and 10.5 wt. % Cu, 8 wt. % Ni and 12 wt. % Cu, 9 wt. % Ni and 13.5 wt. % Cu, 10 wt. % Ni and 15 wt. % Cu, 12 wt. % Ni and 18 wt. % Cu, 16 wt. % Ni and 24 wt. % Cu, 20 wt. % Ni and 30 wt. % Cu, 24 wt. % Ni and 36 wt. % Cu. In one aspect, the Ni and Cu are present as 10 wt. % Ni and 15 wt. % Cu.

In an independent aspect, the Ni and Cu are present in amounts that provide a Ni:Cu mass ratio of 10 and a total metal weight loading may range from 1 wt. % to 60 wt. %, such as 5.5 wt. %, 11 wt. %, 22 wt. %, or 44 wt. %. In certain aspects, the Ni and Cu are present as 5 wt. % Ni and 0.5 wt. % Cu, 10 wt. % Ni and 1 wt. % Cu, 20 wt. % Ni and 2 wt. % Cu, or 40 wt. % Ni and 4 wt. % Cu. In one aspect, the Ni and Cu are present as 10 wt. % Ni and 1 wt. % Cu.

In an independent aspect, the Ni and Cu are present in amounts that provide a Ni:Cu mass ratio of 5. A total metal weight loading may range from 1 wt. % to 60 wt. %, such as 1.2 wt. %, 6 wt. %, 12 wt. %, 18 wt. %, 24 wt. %, 30 wt. %, 36 wt. %, 42 wt. %, 48 wt. %, 54 wt. %, 60 wt. %. In certain aspects, the Ni and Cu are present as 1 wt. % Ni and 0.2 wt. % Cu, 5 wt. % Ni and 1 wt. % Cu, 10 wt. % Ni and 2 wt. % Cu, 15 wt. % Ni and 3 wt. % Cu, 20 wt. % Ni and 4 wt. % Cu, 25 wt. % Ni and 5 wt. % Cu, 30 wt. % Ni and 6 wt. % Cu, 35 wt. % Ni and 7 wt. % Cu, 40 wt. % Ni and 8 wt. % Cu, 45 wt. % Ni and 9 wt. % Cu, 50 wt. % Ni and 10 wt. % Cu. In one aspect, the Ni and Cu are present as 10 wt. % Ni and 2 wt. % Cu.

In some aspects, the Ni of the Ni—Cu alloy catalyst is provided by using a nickel-containing precursor, such as $Ni(NO_3)_2 \cdot 6H_2O$, $Ni(NO_3)_2 \cdot 6H_2O$, $NiCl_2$, $NiCl_2 \cdot 6H_2O$, $NiBr_2$, $NiF_2$, $NiBr_2 \cdot xH_2O$, $NiBr_2 \cdot 3H_2O$. In certain aspects, the nickel-containing precursor is $Ni(NO_3)_2 \cdot 6H_2O$. In some aspects, the Cu of the Ni—Cu alloy catalyst is provided by using a copper-containing precursor, such as $Cu(NO_3)_2 \cdot 2.5H_2O$, $CuSO_4$, $CuCl_2$, $Cu(NO_3)_2$, $Cu(NO_3)_2 \cdot 3H_2O$, CuO, $Cu(CH_3COO)_2$, $Cu_3(PO_4)_2$, $Cu(ClO_4)_2$, $CuO_2$, $Cu(hfac)_2$, $CuO_3Si$, $Cu(CO_2CH_3)$, $Cu(NH_3)_4$, $Cu(SCN)_2$, $Cu(NH_3)_4SO_4 \cdot H_2O$, $Cu(OH)_2$, $CuBr_2$. In certain aspects, the copper-containing precursor is $Cu(NO_3)_2 \cdot 2.5H_2O$.

In some aspects, the catalyst system comprises Ni—Cu alloy catalysts that comprise nanoparticles having an average particle size ranging from greater than 0 nm to 10 nm before reaction in TCD. Such catalyst system aspects can be referred to herein as "fresh" catalyst system because they have not yet been exposed to a TCD cycle. In certain aspects, a "fresh" catalyst system (as referred to herein in certain examples and/or figures) is a catalyst system that has not been heated at a reaction temperature above 450° C. In some aspects, a "spent" catalyst system is a catalyst system that has undergone at least one TCD cycle. In certain aspects, a "spent" catalyst system is a catalyst system that has been heated at a reaction temperature above 450° C.

In certain aspects, the fresh Ni—Cu alloy catalysts comprise nanoparticles having an average particle size ranging from greater than 0 nm to 10 nm, such as from 1 nm to 9 nm, or 2 nm to 9 nm, or 3 nm to 9 nm, or 4 nm to 9 nm, or 5 nm to 9 nm, or 6 nm to 9 nm, or 7 nm to 9 nm, or 7 nm to 8 nm, or 8 nm to 9 nm. In one aspect, the Ni—Cu alloy catalysts comprise nanoparticles having an average particle size ranging from 7.3 nm to 8.6 nm.

In certain aspects, the fresh catalyst system comprises Ni—Cu alloy catalysts having a Ni:Cu mass ratio ranging from greater than zero to less than 5, and such Ni—Cu alloy catalysts comprise nanoparticles having an average particle size ranging from 1 nm to 10 nm before reaction in TCD. In one aspect, the catalyst system comprises Ni—Cu alloy catalysts having a Ni:Cu mass ratio ranging from greater than zero to 2, and such Ni—Cu alloy catalysts comprise nanoparticles having an average particle size ranging from 7 nm to 9 nm.

In some aspects, the Ni—Cu alloy catalysts comprise nanoparticles that exhibit a change in average particle size after being used in a TCD process, particularly after being exposed to temperatures of 600° C., or higher. In some such aspects, the nanoparticles may exhibit a 5% to 150% average particle size increase after reaction, such as from 5% to 120%, or 6% to 110%, or 40% to 110%.

In some particular aspects, the Ni—Cu alloy catalysts comprise Ni and Cu in amounts that provide a mass ratio ranging from 0.8 to 1.2, and can exhibit a 5% to 10% average particle size increase after reaction at 600° C., or higher. In certain aspects, the Ni—Cu alloy catalysts comprises Ni and Cu in amounts that provide a mass ratio of 1, the reaction temperature is 600° C., and the nanoparticles have a size change ranging from 6% to 7% after reaction.

In some other aspects, the Ni—Cu alloy catalysts comprises Ni and Cu in amounts that provide a mass ratio ranging from 1.5 to 2.5, and can exhibit a 40% to 50% average particle size increase after reaction at 600° C., or higher. In certain aspects, the Ni—Cu alloy catalysts comprises Ni and Cu in amounts that provide a mass ratio ranging from 1.9 to 2.1, the reaction temperature is 600° C., and the nanoparticles have a size change ranging from 45% to 46% after reaction.

In yet other aspects, the Ni—Cu alloy catalysts comprises Ni and Cu in amounts that provide a mass ratio ranging from 0.5 to 0.75, and can exhibit an 80% to 120% average particle size increase after reaction at 600° C., or higher. In certain aspects, the Ni—Cu alloy catalysts comprises Ni and Cu in amounts that provide a mass ratio ranging from 0.65 to 0.7, the reaction temperature is 600° C., and the nanoparticles have a size change ranging from 95% to 110% after reaction.

In some aspects, the Ni—Cu alloy catalysts comprises Ni and Cu in amounts that provide a mass ratio ranging from 0.5 to 0.75, the nanoparticles have similar particle sizes after reacting at a reaction temperature of 550° C., 600° C., 650° C., or higher. In certain aspects, the nanoparticles can exhibit a size change of less than 30% after reacting at a reaction temperature of 550° C., 600° C., 650° C., or higher. In one aspect, the nanoparticles can exhibit a size change of less than 25% after reacting at a reaction temperature of 550° C., 600° C., 650° C., or higher.

As described herein, the catalyst system can further comprise a support. Support components for use in the catalyst system are described herein.

The methane composition used in the method described herein can be obtained from industry sources that produce methane as a by-product, such as fossil fuel-generating (coal, oil, and/or natural gas industries), and/or industries that produce food waste and/or green waste. In some aspects, the methane composition comprises $CH_4$ in an amount ranging from 1 vol % to 100 vol %, such as from 5 vol % to 90 vol %, 10 vol % to 80 vol %, 15 vol % to 70 vol %, 20 vol % to 60 vol %, 25 vol % to 50 vol %, 25 vol % to 40 vol %, or 25 vol % to 35 vol %. The methane composition can further comprise an inert gas, such as an inert gas selected from $N_2$, Ar, and the like. In certain aspects, the methane composition comprises at least 30 vol % $CH_4$ in $N_2$. In some other aspects, the methane composition comprises 100 vol % $CH_4$. The methane composition can be utilized at a suitable flow rate. In some aspects, the flow rate can range from 5 $cm^3$/min to 120 $cm^3$/min, such as 10 $cm^3$/min to 100 $cm^3$/min, or 15 $cm^3$/min to 100 $cm^3$/min, or 20 $cm^3$/min to 100 $cm^3$/min, or 30 $cm^3$/min to 100 $cm^3$/min. In some aspects, the flow rate is at least 30 $cm^3$/min. In one aspect, the methane composition comprises 30 vol % $CH_4$, which is utilized in the method at a flow rate of 30 $cm^3$/min. In further aspects, the methane composition comprises 30 vol % $CH_4$ in $N_2$, which is utilized in the method at a flow rate of 30 $cm^3$/min to maintain a constant space velocity of 9,000 $cm^3$/g/h. In certain aspects, the methane composition comprises 100 vol % $CH_4$ which is used at a flow rate ranging from 30 $cm^3$/min to 120 $cm^3$/min, such as at 30 $cm^3$/min, 60 $cm^3$/min or 120 $cm^3$/min.

In some aspects, the reaction temperature used for the disclosed method ranges from 400° C. to 900° C., such as at least 500° C. to 800° C., or 500° C. to 700° C., or 550° C. to 700° C., or 550° C. to 700° C., or 600° C. to 700° C., or 650° C. to 700° C. In certain aspects, the reaction temperature ranges from 600° C. to 650° C., or 640° C. to 660° C., or 670° C. to 700° C. In particular aspects, the reaction temperature may be 550° C., 600° C., 650° C., or 700° C. In one aspect, the reaction temperature is 600° C. or 650° C. In some aspects, a reactor, in which at least the methane composition-catalyst system contacting step is carried out, can be heated by any practical means such as, for example, an electric tube furnace.

In some aspects, the method is performed for a reaction time period ranging from greater than 0 hours to several days, such as from 1 hour to 5 days, or 1 hour to 4 days, or 1 hour to 3 days, or 1 hour to 48 hours, or 1 hour to 24 hours, or 1 hour to 20 hours, or 1 hour to 14 hours, or 1 hour to 10 hours, from 1 hour to 8 hours, from 1 hour to 7 hours, or 1 hour to 6 hours, or 1 hour to 5 hours, or 1 hour to 4 hours. In certain aspects, the method is performed for a reaction time period ranging from 3 hours to 5 hours. In one aspect, the reaction time period is 4 hours. At least certain steps of the method can be carried out in a fixed-bed reactor, a continuous flow reactor, or other suitable reactor capable of being operated under batch and/or continuous flow conductions. In some aspects, the reactor is any reactor suitable for bench-scale work and evaluation and/or for industrial-scale processes.

Catalyst systems described herein can exhibit good stability under TCD conditions, even at high temperatures (e.g., temperatures above 500° C., such as above 550° C. or above 600° C.). In some aspects, catalyst systems include selected nickel and copper amounts that provide mass ratios that facilitate catalyst stability such that the catalyst system can remain stable over multiple TCD cycles. In some aspects, the catalyst system is stable for at least 1.5 hours, such as at least 2 hours, at least 3 hours, or at least 4 hours. In some aspects, the catalyst system comprises a Ni—Cu alloy catalyst having Ni and Cu in amounts that provide a mass ratio ranging from greater than zero to less than 5, or greater than zero to 4.5 and that remain stable for at least 1.5 hours, such as at least 2 hours, at least 3 hours, or at least 4 hours when exposed to reaction temperatures of at least 500° C., such as from 500° C. to 700° C., or 550° C. to 700° C., or 550° C. to 600° C., or 600° C. to 650° C.; or 650° C. to 700° C., or 600° C. to 700° C., or 650° C. to 700° C.

In particular aspects, the catalyst system comprises a Ni—Cu alloy catalyst having Ni and Cu in amounts that provide a mass ratio ranging from greater than zero to 4.5 and that remain stable for at least 4 hours when exposed to reaction temperatures ranging from 600° C. to 650° C. In certain aspects, the Ni—Cu alloy catalyst having Ni and Cu in amounts that provide a mass ratio ranging from 0.5 to 1 and that remain stable for at least 4 hours when exposed to reaction temperatures ranging from 600° C. to 650° C.

In some other aspects, the catalyst system comprises a Ni—Cu alloy catalyst having Ni and Cu in amounts that provide a mass ratio ranging from greater than zero to 4.5 and that remain stable for at least 2 hours when exposed to reaction temperatures ranging from 660° C. to 700° C. In certain aspects, the Ni—Cu alloy catalyst having Ni and Cu in amounts that provide a mass ratio ranging from 0.5 to 1 and that remain stable for at least 2 hours when exposed to the reaction temperatures ranging from 660° C. to 700° C. In one aspect, the Ni—Cu alloy catalyst having Ni and Cu in amounts that provide a mass ratio ranging from 0.5 to 1 and that remain stable for at least 1.5 hours when exposed to reaction temperatures ranging from 690° C. to 710° C.

In some aspects, the catalyst system comprises an alloy catalyst having Ni and Cu in amounts that provide a mass ratio ranging from greater than zero to 4.5, the reaction temperature is at least 550° C., and the methane composition is converted to $H_2$ at a $CH_4$ conversion rate of at least 25% for at least 4 hours. In certain aspects, the catalyst system comprises an alloy catalyst having Ni and Cu in amounts that provide a mass ratio ranging from greater than zero to 2, the reaction temperature ranges from 550° C. to 600° C., and the methane composition is converted to $H_2$ at a $CH_4$ conversion rate of at least 25% for at least 4 hours. In one aspect, the catalyst system comprises an alloy catalyst having Ni and Cu in amounts that provide a mass ratio ranging from 0.5 to 1, the reaction temperature ranges from 550° C. to 600° C., and the methane composition is converted to $H_2$ at a $CH_4$ conversion rate of at least 25% for at least 4 hours.

In some aspects, the catalyst system comprises an alloy catalyst having Ni and Cu in amounts that provide a mass ratio ranging from greater than zero to 4.5, the reaction temperature is at least 600° C., and the methane composition is converted to $H_2$ at a $CH_4$ conversion rate of at least 25% for at least 4 hours. In certain aspects, the catalyst system comprises an alloy catalyst having Ni and Cu in amounts that provide a mass ratio ranging from greater than zero to 2, the reaction temperature ranges from 600° C. to 650° C., and the methane composition is converted to $H_2$ at a $CH_4$ conversion rate of at least 25% for at least 4 hours. In one aspect, the catalyst system comprises an alloy catalyst having Ni and Cu in amounts that provide a mass ratio ranging from 0.5 to 1, the reaction temperature ranges from 600° C. to 650° C., and the methane composition is converted to $H_2$ at a $CH_4$ conversion rate of at least 30% for at least 4 hours.

In some aspects, the catalyst system comprises an alloy catalyst having Ni and Cu in amounts that provide a mass ratio ranging from greater than zero to 4.5, the reaction temperature is at least 640° C., and the methane composition is converted to $H_2$ at a $CH_4$ conversion rate of at least 40% for at least 4 hours. In certain aspects, the catalyst system comprises an alloy catalyst having Ni and Cu in amounts that provide a mass ratio ranging from greater than zero to 2, the reaction temperature ranges from 640° C. to 690° C., and the methane composition is converted to $H_2$ at a $CH_4$ conversion rate of at least 45% for at least 4 hours. In one aspect, the catalyst system comprises an alloy catalyst having Ni and Cu in amounts that provide a mass ratio ranging from 0.5 to 1, the reaction temperature ranges from 640° C. to 660° C., and the methane composition is converted to $H_2$ at a $CH_4$ conversion rate of at least 40% for at least 4 hours.

In yet other aspects, the catalyst system comprises an alloy catalyst having Ni and Cu in amounts that provide a mass ratio ranging from greater than zero to 4.5, the reaction temperature is at least 670° C., and the methane composition is converted to $H_2$ at a $CH_4$ conversion rate of at least 10% for at least 1.5 hours. In certain aspects, the catalyst system comprises an alloy catalyst having Ni and Cu in amounts that provide a mass ratio ranging from greater than zero to 2, the reaction temperature ranges from 670° C. to 710° C., and the methane composition is converted to $H_2$ at a $CH_4$ conversion rate of at least 10% for at least 1.5 hours. In one aspect, the catalyst system comprises an alloy catalyst having Ni and Cu in amounts that provide a mass ratio ranging from 0.5 to 1, the reaction temperature ranges from 670° C. to 700° C., and the methane composition is converted to $H_2$ at a $CH_4$ conversion rate of at least 10% for at least 1.5 hours.

In some representative aspects of the disclosure, the reaction temperature is at least 500° C., the methane composition comprises $CH_4$ in an amount ranging from 10 vol % to 50 vol %, and $H_2$ is produced at a rate ranging from 0.5 g $H_2$/(g metal·h) to 15 g $H_2$/(g metal·h). In certain other aspects, the reaction temperature ranges from 550° C. to 700° C., the methane composition comprises $CH_4$ in an amount ranging from 20 vol % to 40 vol %, and the $H_2$ is produced at a rate ranging from 0.5 g $H_2$/(g metal·h) to 15 g $H_2$/(g metal·h). In one aspect, the reaction temperature is 600° C., the methane composition comprises 30 vol % $CH_4$, and the $H_2$ is produced at a rate ranges from 0.5 g $H_2$/(g metal·h) to 4 g $H_2$/(g metal·h). The any or all of the above-mentioned aspects, the catalyst may comprise Ni and Cu in amounts sufficient to provide a Ni:Cu mass ratio ranging from greater than zero to 4.5, such as 0.67, 1, 2, or 4.5 or less.

Also described herein are carbon co-products generated by the method of the present disclosure. The carbon co-products disclosed herein can be controlled in terms of morphology and yield utilizing operational parameters described herein and/or by varying metal content and/or ratios in the catalyst system. In some aspects, the carbon co-products comprise a carbon nanomaterial, such as carbon nanotubes (including single-wall CNTs, double-wall CNTs, and multi-wall CNTs). In some aspects, the carbon co-product can be controlled such that it is provided in the form of the carbon nanomaterial, or in the form of graphene or graphite. In particular aspects, operational and/or catalyst system parameters are modified to provide different forms of the carbon nanomaterial, such as to provide SWCNTs, DWCNTs, or MWCNTs. In some aspects, the carbon co-product can comprise 50% to 100% multi-wall CNT, such as from 60% to 100%, or 70 to 100%, or 80 to 100%.

In some aspects, the carbon co-product can be MWCNTs with diameters ranging from 3 nm to 40 nm, such as from 4 nm to 35 nm, or 5 nm to 30 nm, or 10 nm to 25 nm, or 15 nm to 30 nm. In certain aspects, the carbon co-product comprises MWCNTs with diameters ranging from 20 nm to 30 nm. In some particular aspects, the carbon co-product can be MWCNTs with outer diameters ranging from 3 nm to 40 nm, such as from 4 nm to 35 nm, or 5 nm to 30 nm, or 10 nm to 25 nm, or 15 nm to 30 nm. In certain aspects, the carbon co-product comprises MWCNTs with outer diameters ranging from 20 nm to 30 nm. In some such embodiments, the support and the carbon co-product can be the same material.

In some aspects, Raman spectroscopy is used to assess the morphology, diameter, and/or identity of the carbon co-product. In some such aspects, three main bands within the Raman spectrum of a sample are analyzed to determine an amount of "structured" versus "unstructured" carbon co-product. These three bands include: i) the D-band (located at wavenumbers ranging from 1300 $cm^{-1}$ to 1400 $cm^{-1}$, such as 1340 $cm^{-1}$), which is associated with defects in the graphitic lattice; ii) the G-band (located at wavenumbers ranging from 1500 $cm^{-1}$ to 1600 $cm^{-1}$, such as 1580 $cm^{-1}$), which is associated with ordered carbon; and iii) the G'-band (or 2D band) (located at wavenumbers ranging from 2600 $cm^{-1}$ to 2800 $cm^{-1}$, such as 2700 $cm^{-1}$), which is associated with interactions between stacked graphene layers and that can be used to distinguish between SWCNTs or MWCNTs. The $I_D/I_G$ ratio, as discussed herein, represents the ratio of the intensity of the D band ($I_D$) relative to the intensity of the G band ($I_G$). The $I_{G'}/I_G$ ratio, as discussed herein, represents the ratio of the intensity of the G' band ($I_{G'}$) to the intensity of the G band ($I_G$). In some aspects, the $I_D/I_G$ ratio can range from 1 to 2, such as 1.1 to 1.9, or 1.1 to 1.6; and the $I_{G'}/I_G$ ratio can range from 0.3 to 1.3, such as 0.4 to 1.2, or 0.5 to 1. In some aspects wherein the catalyst comprises Ni and Cu in an amount that provides a Ni:Cu mass ratio ranging from greater than zero to 4.5, the $I_D/I_G$ ratio can range from 1.1 to 1.81, the $I_{G'}/I_G$ ratio can range from 0.407 to 1.11. In yet other aspects, the $I_D/I_G$ ratio can range from 1.1 to 1.6, and the $I_{G'}/I_G$ ratio can range from 0.55 to 0.95.

In some particular aspects, the reaction temperature ranges from 500° C. to 700° C., such as 550° C., 600° C., 650° C., or 700° C., the catalyst comprises Ni and Cu in an amount that provides a Ni:Cu mass ratio ranging from greater than zero to 4.5, and the carbon co-product has an $I_D/I_G$ ratio ranging from 1 to 2, such as from 1.2 to 2, or 1.4 to 2, or 1.6 to 2, or 1.8 to 2; and an $I_{G'}/I_G$ ratio lower than 0.90. In one aspect, the reaction temperature is 600° C., the catalyst comprises Ni and Cu in amounts that provide a mass ratio of greater than zero to 4.5, and the carbon co-product has an $I_D/I_G$ ratio ranging from 1.5 to 2 and an $I_{G'}/I_G$ ratio of lower than 0.70.

In some aspects, the catalyst comprises Ni and Cu in a Ni to Cu mass ratio ranging from greater than zero to 1, such as from 0.1 to 0.9, or greater than 0.5 to 0.8, or greater than 0.6 to 0.7, the reaction temperature ranges from 500° C. to 700° C., such as 550° C., 600° C., 650° C., or 700° C., and the carbon co-product has an $I_D/I_G$ ratio ranging from 1 to 2 and an $I_{G'}/I_G$ ratio lower than 1.2. In one aspect, the reaction temperature is 550° C., and the carbon co-product has an $I_D/I_G$ ratio ranging from 1.7 to 1.8, and an $I_{G'}/I_G$ ratio ranging from 0.6 to 0.7. In another aspect, the reaction temperature is 600° C., and the carbon co-product has an $I_D/I_G$ ratio ranging from 1.8 to 1.9 and an $I_{G'}/I_G$ ratio ranging from 0.4 to 0.5. In yet other aspects, the reaction temperature is 650° C., and the carbon co-product has an $I_D/I_G$ ratio ranging from 1.7 to 1.8 and an $I_{G'}/I_G$ ratio ranging from 0.7 to 0.8. In another aspect, the reaction temperature is 700° C., and the carbon co-product has an $I_D/I_G$ ratio ranging from 1.0 to 1.1 and an $I_{G'}/I_G$ ratio ranging from 1.1 to 1.2.

With the method described herein, $CH_4$ conversion, $X_{CH_4}$, is calculated based on the amount of $CH_4$ reacted shown in Equation (1):

$$X_{CH_4}(t)/\% = \frac{F_{In}\cdot[CH_4]_{in} - F_{Out}\cdot[CH_4]_{Out}}{F_{In}[CH_4]_{In}}\cdot 100 \tag{2}$$

where $F_{In}$ is the flow rate of the feed gas before reaction starts, $[CH_4]_{In}$ is the concentration of $CH_4$ in the feed gas determined by GC; $F_{out}$ is the flow rate of the outlet gas; $[CH_4]_{Out}$ is the concentration of $CH_4$ in the outlet gas determined by GC.

Carbon yield, $Y_C(t)$, and the rate of deposition of carbon are calculated as the accumulated weight of carbon per mass of the catalyst based on the $CH_4$ conversion. In some aspects, the method is performed for a reaction time sufficient to provide a total carbon yield of at least 3.5 $g_{carbon}/g_{catalyst}$, or until at least 80% of the carbon present in a support used with the catalyst system (e.g., 80% of the amount of carbon present in a spent catalyst system) is equivalent to the amount of carbon co-product generated from the method. In such aspects, such an accumulation rate facilitates the ability to use the spent catalyst system as a metric to determine the amount of carbon co-product produced, rather than the starting carbon amount present in a fresh catalyst system.

In some aspects, the mole balance ranges between 95 and 100% and can be calculated using Equation 2:

$$\text{Mole Balance, \%} = \frac{F_{Out}\times\left([CH_4]_{Out} + \frac{[H_2]_{Out}}{2}\right)}{F_{In}\times[CH_4]_{In}}\times 100 \tag{2}$$

To approximately quantify the deactivation of the catalysts, first, it is assumed that the carbon accumulated with time on stream, θ, raised to a small power, viz. $C\propto\theta^{0.5}$, as postulated for catalytic cracking. Second, it is assumed that the catalyst deactivation could be represented through a poisoning factor, ϕ, that would multiply the initial rate of conversion, $X_0$:

$$X(\theta) = X_0\times\Phi(C(\theta)) \tag{3}$$

It is assumed that ϕ(C) is a decaying exponential that depended on the accumulated carbon:

$$\Phi(C) = \exp(-kC) \tag{4}$$

The $CH_4$ conversion is fit as a function of time on stream using a functional form with two coefficients, the initial conversion, $X_0$, and a deactivation rate parameter, k.

$$X(\theta) = X_0\times\exp(-k\theta^{0.5}) \tag{5}$$

The mass of carbon at any time on stream, C(θ), is estimated by integrating equation 5 multiplied by the inlet hourly mass flow rate of carbon, $C_{feed}$ and the initial, fitted conversion, $X_0$ $$C_{feed} = \frac{30\frac{cm^3}{min} \times \left(\frac{30\ vol.\%\ CH_4}{100}\right) \times 60\frac{min}{h} \times 0.987\ atm}{1000\frac{cm^3}{L} \times \left(0.0821\frac{L \cdot atm}{mol \cdot K}\right) \times 298K} \times \frac{1\ mol\ C}{1\ mol\ CH_4} \times \frac{12\ g\ C}{1\ mol\ C} = 0.262\ g_C/h \quad (6)$$

$$C(\theta) = C_f X_0 \int_0^{\theta} \exp(-k\ \theta^{0.5}) d\theta = -C_f X_\theta \frac{2e^{(-k\theta^{0.5})}(k\theta^{0.5}+1)}{k^2}\Bigg|_0^{\theta} \quad (7)$$

In some aspects, the predicted amount of carbon co-product accumulated (carbon yield) is related to the actual amount of carbon measured. The projected carbon yield extrapolated the accumulation of carbon co-product to θ=∞ normalized by the weight of catalysts:

$$\text{Projected Carbon Yield} = \frac{C(\infty)}{Cat.\ \text{Weight}} = \frac{2 \times C_f \times X_0}{Cat.\ \text{Weight} \times k^2} \quad (8)$$

wherein $C_f$ is carbon feeding rate, X0 is initial conversion, K is deactivation constant, θ is reaction time.

As confirmed with Equation 8, the disclosed method can be expected to produce high carbon yields. For example, in some aspects comprising (i) a catalyst system that comprises Ni and Cu in amounts that provide a mass ratio ranging from greater than zero to 4.5 and (ii) a reaction temperature ranging from 550° C. to 650° C., a projected carbon yield ranging from 0 g carbon/g catalyst to 6150 g carbon/g catalyst can be obtained. In yet further aspects comprising (i) a catalyst system that comprises Ni and Cu in amounts that provide a mass ratio of 0.67 and (ii) a reaction temperature of 650° C., a projected carbon yield ranging from 0 g carbon/g catalyst to 6150 g carbon/g catalyst can be obtained.

In some aspects comprising (i) a catalyst system, (ii) a reaction temperature ranging from 550° C. to 700° C., and (iii) a methane composition comprises 100 vol % $CH_4$, a carbon co-product can be produced at a carbon deposition rate ranging from 5 to 50 g carbon/(g metal·h).

In some aspects comprising (i) a catalyst system that comprises Ni and Cu in amounts that provide a mass ratio ranging from greater than zero to 4.5 and (ii) a reaction temperature ranging from 550° C. to 700° C., a carbon co-product can be produced at carbon deposition rate ranging from 1 g carbon/(g metal·h) to 4 g carbon/(g metal·h). In one aspect, the reaction temperature is 650° C., the carbon co-product can be produced at carbon deposition rate ranging from 2 g carbon/(g metal·h) to 3 g carbon/(g metal·h). In another aspect, the reaction temperature is 600° C., the carbon co-product can be produced at carbon deposition rate ranging from 1 g carbon/(g metal·h) to 2 g carbon/(g metal·h). In yet another aspect, the reaction temperature is 550° C., the carbon co-product can be produced at carbon deposition rate ranging from 1 g carbon/(g metal·h) to 2 g carbon/(g metal·h).

In some aspects comprising (i) a catalyst system that comprises Ni and Cu in amounts that provide a mass ratio ranging from greater than zero to 4.5 and (ii) a reaction temperature ranging from 550° C. to 700° C., a carbon yield of at least 5 g carbon/g catalyst after contacting the methane composition and the catalyst system for 5 hours can be obtained. In one aspect, the reaction temperature is 550° C., a carbon yield ranging from 5 g carbon/g catalyst to 7 g carbon/g catalyst after contacting the methane composition and the catalyst system for 5 hours can be obtained. In another aspect, the reaction temperature is 600° C., a carbon yield ranging from 7 g carbon/g catalyst to 10 g carbon/g catalyst after contacting the methane composition and the catalyst system for 5 hours can be obtained. In yet another aspect, the reaction temperature is 650° C., a carbon yield ranging from 10 g carbon/g catalyst to 15 g carbon/g catalyst after contacting the methane composition and the catalyst system for 5 hours can be obtained.

In some aspects, the disclosed method further comprises separating the catalyst system from the carbon co-product. In certain aspects, separating the catalyst system from the carbon co-product comprises contacting the catalyst system and the carbon co-product with an acid to produce a suspension, wherein the suspension comprises (i) the carbon co-product (in the form of a solid) and (ii) a liquid solution; and separating the carbon co-product from the liquid solution. In some aspects, the acid can be selected from nitric acid ($HNO_3$) or other suitable acids. In certain aspects, the liquid solution comprises metal salts, such as metal nitrates (e.g., as $Ni(NO_3)_2$ and/or $Cu(NO_3)_2$). In some aspects, the carbon co-product is separated from the liquid solution by using filtration.

In aspects where the carbon co-product is separated from the catalyst system, it can be reused in the method. In such aspects of the disclosure, the method can further comprise a regeneration step, which involves using the carbon co-product as the support component of the catalyst system. In some such aspects, the TCD reaction of the method can be repeated for multiple cycles, wherein one or more reaction cycle comprises separating the carbon co-product from the catalyst system. In certain aspects, repeating the reaction for multiple cycles comprises repeating the cycle for from four times to a hundred times, such as two times, three times, four times, five times, or six times.

In some aspects, the method for using the catalyst system comprises at least two reaction cycles, such as two reaction cycles, three reaction cycles, four reaction cycles, or five reaction cycles. In one aspect, the method for using the catalyst system comprises performing at least four reaction cycles. A reaction cycle typically includes (i) contacting the methane composition with the catalyst system; (ii) treating the catalyst system (after reaction with the methane) with an acid treatment; (iii) separating the carbon co-product from the liquid solution comprising the metal salts; (iv) regenerating the metal precursors by concentrating and/or crystallizing the metal salts; and (vi) combining the metal precursors with at least a portion of the isolated carbon co-product.

In some aspects, repeating the reaction for multiple cycles comprises using the carbon co-product generated from a previous reaction cycle as the support in a subsequent reaction cycle. In such aspects, steps of the disclosed method are repeated over at least two cycles, wherein the methane composition is contacted with a catalyst system comprising a Ni—Cu alloy catalyst and a support at a reaction temperature to produce $H_2$ and a carbon co-product; separating the catalyst system from the carbon co-product; regenerating the metal precursors for use in a regenerated catalyst system that is used in a subsequent cycle; isolating the carbon co-product; contacting the methane composition with the regenerated catalyst system to produce $H_2$ and additional amounts of a carbon co-product, wherein the support used with the regenerated catalyst system is the carbon co-product generated and isolated from the previous reaction cycle. In further aspects, repeating the reaction for multiple cycles comprises repeating the cycle for at least two times, such as two times, three times, four times, five times, or six times.

The carbon co-product may be mixed with the spent catalyst which comprises metal nanoparticles. In some aspects, the carbon co-product oxidizes at a temperature of at least 300° C. in the presence of metal nanoparticles. In certain aspects, the carbon co-product is CNT, and the carbon co-product oxidizes at a temperature of from 300° C. to 500° C. In one aspect, the carbon co-product is CNT, and the carbon co-product oxidizes at a temperature of from 400° C. to 450° C.

IV. Method of Making Catalysts

Also disclosed herein is a method for making the catalyst system described herein. In some aspects, the method can comprise a sequential impregnation (SI) technique, a solvothermal method (ST) technique, an incipient wetness (IW) technique, or a co-impregnation (CI) technique. In particular aspects, the method comprises an SI technique.

Disclosed herein are methods to make a catalyst system by sequential impregnation, in which substances are applied to a support material or surface of the support material in a sequential order. The process comprises deposition of different layers of the substances onto the support material. Each layer is applied one after another in a sequential order.

In some aspects, the method comprises i) contacting a solution containing a first metal with a support material to impregnate the support material with the first metal, thereby forming an impregnated support; ii) heating the impregnated support using a ramping temperature protocol to provide a pre-catalyst system; (iii) contacting the pre-catalyst system with a second metal to form a bimetallic impregnated support; and (iv) heating the bimetallic impregnated support using the ramping temperature protocol to provide the catalyst system. In some aspects, the method can further comprise performing a preliminary heating step before performing the ramping temperature protocol.

In some aspects, the support material may be a non-carbonaceous support, such as a silica support. In an independent embodiment, the support material and/or the catalyst system does not comprise alumina. In some other aspects, the support material is a carbonaceous support. In certain aspects, the support material comprises a carbon material, such as a carbon nanomaterial (e.g., single-wall CNT, double-wall CNT, multi-wall CNT, and the like). In one aspect, the support material comprises multi-wall CNTs. The support material may be generated carbon co-product from one or more previous reaction cycles.

The support may be treated with acid to functionalize its surface. In some aspects, the support is treated with an acid to generate an acid-washed support prior to combing the acid-washed support with the alloy catalyst. In certain aspects, the acid comprises nitric acid ($HNO_3$). In some aspects, the support is carbon co-product generated from previous reactions, and the acid-washed support is acid-washed generated carbon co-product. In certain aspects, the support is CNT, and the acid-washed support is acid-washed CNT. In one aspect, the support is CNT, the acid is nitric acid ($HNO_3$), and the acid-washed support is an acid-washed CNT (HCNT).

In some aspects, the ramping temperature protocol comprises increasing a temperature to which the impregnated support is exposed by 2° C./min to 10° C. per minute, such as from 3° C. per minute to 9° C. per minute, or 4° C. per minute to 8° C. per minute, or 4° C. per minute to 7° C. per minute, or 4° C. per minute to 6° C. per minute. In certain aspects, the temperature is increased by 5° C. per minute.

In some aspects, the final temperature of the ramping temperature protocol ranges from 300° C. to 400° C., such as from 310° C. to 390° C., or 320° C. to 380° C., or 330° C. to 370° C., or 340° C. to 360° C. In certain aspects, the final temperature ranges from 345° C. to 355° C. In one aspect, the final temperature is 350° C.

In some aspects, the first metal and the second metal are Ni and Cu. In one aspect, the first metal is Ni, the second metal is Cu. In another aspect, the first metal is Cu, and second metal is Ni.

In further aspects, a preliminary heating step is performed before performing the ramping temperature protocol. In such aspects, the preliminary heating step comprises heating the impregnated support at a temperature ranging from 130° C. to 200° C. for a time period ranging from 6 hours to 10 hours. In some aspects, the temperature in the preliminary step ranges from 100° C. to 200° C., such as from 110° C. to 170° C., from 120° C. to 160° C., from 120° C. to 150° C., and from 130° C. to 150° C. In certain aspects, the temperature ranges from 130° C. to 150° C. In one aspect, the temperature is 140° C.

In some aspects, the time in the preliminary step ranges from 6 hours to 10 hours, such as from 7 hours to 10 hours, from 7 hours to 9 hours. In certain aspects, the time ranges from 7.5 hours to 8.5 hours. In one aspect, the time is 8 hours. In certain aspects, the temperature in the preliminary step is 140° C., and the time in the preliminary step is 8 hours.

In some independent aspects, the catalyst system is prepared by ST deposition. In this process, catalyst precursors are dissolved in a solvent to react and form the catalyst. In certain aspects, the catalyst system comprises Ni and Cu, and the Ni and Cu precursors are dissolved in a solvent to form a solution, the support material is added to the solution to create a mixture, and the mixture is heated and dried to create the catalyst system.

In some independent aspects, the catalyst system is prepared by IW impregnation. In certain aspects, the catalyst system comprises Ni and Cu, and the catalyst synthesized by incipient wetness impregnation (IW) may be prepared by slowly adding a concentrated aqueous solution of Ni and Cu to the support material to just wet the support and create a slurry. Then, the slurry may be dried and heated to create the catalyst system.

In some independent aspects, the catalyst system is prepared by wet CI. In certain aspects, the catalyst system comprises Ni and Cu, and the catalyst synthesized by wet CI were prepared by mixing an aqueous solution containing Ni and Cu with the support material to create a mixture. The mixture may be dried and heated to create the catalyst system.

V. Overview of Several Aspects

Disclosed herein are aspects of a method, comprising: contacting a methane composition with a catalyst system at a reaction temperature ranging from 500° C. to 700° C. to produce $H_2$ and a carbon co-product; wherein the catalyst system comprises (i) a Ni—Cu alloy catalyst comprising Ni and Cu, and (ii) a support, wherein the Ni and Cu are present at a Ni:Cu mass ratio ranging from greater than zero to 4.5.

In any or all of the above aspects, the method further comprises separating the catalyst system from the carbon co-product.

In any or all of the above aspects, separating the catalyst system from the carbon co-product comprises: contacting the catalyst system and the carbon co-product with an acid to produce a suspension comprising (i) the carbon co-product and (ii) a liquid solution; and separating the carbon co-product from the liquid solution.

In any or all of the above aspects, the carbon co-product is used as the support in the Ni—Cu alloy catalyst.

In any or all of the above aspects, the carbon co-product is treated with an acid prior to combining the carbon co-product with the Ni and the Cu.

In any or all of the above aspects, the reaction temperature is 600° C., and the carbon co-product has an $I_D/I_G$ ratio ranging from 1 to 2, and/or an $I_G/I_G$ ratio lower than 0.70.

In any or all of the above aspects, the reaction temperature ranges from 550° C. to 700° C., the methane composition comprises 30 vol % $CH_4$, and the $H_2$ is produced at a rate ranging from 0.5 to 15 g $H_2$/(g metal·h).

In any or all of the above aspects, the reaction temperature ranges from 550° C. to 700° C., and the carbon co-product is produced at carbon deposition rate ranging from 1 to 4 g carbon/(g metal·h).

In any or all of the above aspects, the reaction temperature ranges from 600° C. to 650° C., and the methane composition is converted to $H_2$ at a $CH_4$ conversion rate of at least 25% for at least 4 hours.

In any or all of the above aspects, the reaction temperature ranges from 670° C. to 700° C., and the methane composition is converted to $H_2$ at a $CH_4$ conversion rate of at least 10% for at least 1.5 hours.

In any or all of the above aspects, the Ni—Cu alloy catalyst comprises nanoparticles having an average particle size ranging from greater than 0 nm to 10 nm before the Ni—Cu alloy catalyst is contacted with the methane composition.

In any or all of the above aspects, the nanoparticles exhibit a particle size change after being contacted with the methane composition at a reaction temperature of 600° C., and the Ni—Cu alloy catalyst comprises nanoparticles that exhibit a size change ranging from 40% to 110% after reaction.

In any or all of the above aspects, the Ni and Cu are present at a Ni:Cu mass ratio ranging from greater than zero to 2.

In any or all of the above aspects, the Ni and Cu are present at a Ni:Cu mass ratio ranging from or 0.6 to 0.7.

In any or all of the above aspects, the Ni and Cu are present at a Ni:Cu mass ratio ranging from 0.1 to 2; and the reaction temperature ranges from 550° C. to 700° C.

Also disclosed are aspects of a method, comprising: contacting a methane composition with a catalyst system at a reaction temperature ranging from 600° C. to 650° C. to produce $H_2$ and a carbon nanotube; wherein the catalyst system comprises (i) a Ni—Cu alloy catalyst comprising Ni and Cu, and (ii) a carbonaceous support, wherein the Ni and Cu are present at a Ni:Cu mass ratio ranging from 0.6 to 0.7.

Also disclosed are aspects of a method for making a catalyst system, comprising: i) contacting a solution comprising a first metal with a support material to impregnate the support material with the first metal, thereby forming an impregnated support; ii) heating the impregnated support using a ramping temperature protocol to provide a pre-catalyst system, wherein the ramping temperature protocol comprises increasing a temperature to which the impregnated support is exposed by 5° C. per minute until a final temperature of 350° C. is reached; iii) contacting the pre-catalyst system with a second metal to form a bimetallic impregnated support; and (iv) heating the bimetallic impregnated support using the ramping temperature protocol to provide the catalyst system; wherein the first metal and the second metal are different from each other and independently are selected from Ni and Cu and wherein the first metal and the second metal provide a Ni:Cu mass ratio ranging from greater than zero to 4.5.

In any or all of the above aspects, the method further comprises performing a preliminary heating step before performing the ramping temperature protocol, wherein the preliminary heating step comprises heating the impregnated support at a temperature ranging from 130° C. to 200° C. for a time period ranging from 6 hours to 10 hours.

VI. Examples

Example 1

Materials and Catalyst Synthesis

Nickel nitrate hexahydrate ($Ni(NO_3)_2 \cdot 6H_2O$), copper nitrate hemi-pentahydrate ($Cu(NO_3)_2 \cdot 2.5H_2O$), acetone and concentrated $HNO_3$ were purchased from Sigma Aldrich (St. Louis, MO). Multiwalled CNTs with outer diameter 20-30 nm were purchased from Cheap Tubes (catalog number 030104) (Grafton, VT).

Preparation of Ni—Cu/CNT Catalyst Systems Via the Solvothermal (ST) Method

A series of Ni—Cu/CNT catalyst systems were prepared with different total metal weight loadings (nominally 5.5 wt. %, 11 wt. %, 22 wt. %, and 44 wt. %) following the ST method. The mass ratio between Ni and Cu was kept constant at 10. In the typical ST synthesis of a 10 wt. % Ni-1 wt. % Cu on CNT [10Ni-1Cu/CNT (ST)], 0.347 g of $Ni(NO_3)_2 \cdot 6H_2O$ and 0.0154 g of $Cu(NO_3)_2 \cdot 2.5H_2O$ first were dissolved in 60 mL acetone and sonicated for 30 min. As-received CNT (0.626 g) was added to the acetone solution and sonicated for additional 30 min. The mixture was then transferred to a 100 mL Teflon-lined Parr reactor, sealed, and stirred for 30 min. The Parr reactor was heated to 120° C. for 1 hour and maintained at this temperature for 12 hours under static conditions. After cooling to room temperature, the solution was retrieved from the Parr reactor, placed in a glass container, and allowed to evaporate overnight at room temperature and atmospheric pressure in a hood. The dry solids were placed in a furnace with stagnant air at 80° C. overnight. The dry solids then were crushed and sieved (>100 mesh) and stored in a glass vial.

Preparation of Ni—Cu/CNT Catalyst System Via Incipient Wetness (IW) Impregnation A series of Ni—Cu/CNT catalyst systems were prepared with different total metal weight loadings (11 wt. %, 22 wt. %, and 44 wt. %) following the IW impregnation method. The mass ratio between Ni and Cu was kept constant at 10. In the typical IW synthesis of a 10 wt. % Ni-1 wt. % Cu on CNT [10Ni-1Cu/CNT (IW)], an aqueous solution (0.635 mL) of $Ni(NO_3)_2 \cdot 6H_2O$ (0.595 g) and $Cu(NO_3)_2 \cdot 2.5H_2O$ (0.0439 g) was slowly added to as-received CNT (1.068 g) using the amount of liquid that was previously determined to just wet the support (0.595 mL/g). Then, the slurry was dried in a furnace under stagnant air at 80° C. overnight. Once dry, the solids were heated in air at 140° C. for 8 hours followed by heating a 500 mg aliquot in flowing $N_2$ (30 $cm^3$/min) at 350° C. for 3 hours. The temperature ramp rate was 5° C./min. The solids were cooled to room temperature and stored in a glass vial.

Example 2

The catalyst systems were characterized before reaction (fresh) and after reaction (spent) to determine their stability and to determine relationships between activity, stability, and surface properties. Fresh catalyst systems (500 mg) were reduced at 400° C. for 4 hours under 30 $cm^3$/min of 5 vol. % $H_2$ in $N_2$ followed by heating to reaction temperature (typically 600° C.) in 30 $cm^3$/min $N_2$. The samples were cooled to room temperature and then passivated by flowing (30 $cm^3$/min) of 1.0 vol. % $O_2$ in $N_2$ overnight. The spent catalyst systems were characterized as retrieved from the TCD reactor.

Nitrogen ($N_2$) physisorption at 77 K by the fresh and spent catalyst systems was measured using a Quadrasorb EVO/SI Gas Sorption System from Quantachrome Instruments. Samples were degassed at 150° C. under vacuum for 12 hours. Surface areas were determined using the five-point Brunauer-Emmett-Teller method from the adsorption data in the relative pressure range of 0.05-0.3. Metal loadings (Table 1) were determined by inductively coupled plasma optical emission spectrometry.

TABLE 1

Characterization of fresh catalyst systems via Inductively coupled plasma atomic emission spectroscopy (ICP-AES) and Brunauer-Emmett-Teller of fresh reduced catalyst systems.

| Catalyst systems | ICP-AOES Metal weight loading, wt. % Ni | ICP-AOES Metal weight loading, wt. % Cu | ICP-AOES Ni:Cu (mol/mol) | BET, $m^2/g$ Fresh | BET, $m^2/g$ Spent |
|---|---|---|---|---|---|
| 5Ni—0.5Cu/CNT (ST) | 5.37 | 0.48 | 11.2 | 141 | 200 |
| 10Ni—1Cu/CNT (ST) | 8.96 | 0.86 | 10.4 | 147 | 194 |
| 20Ni—2Cu/CNT (ST) | 21.7 | 1.85 | 11.7 | 112 | 147 |
| 40Ni—4Cu/CNT (ST) | 39.2 | 3.71 | 10.6 | 95.0 | 121 |
| 10Ni—1Cu/CNT (IW) | 8.39 | 1.00 | 8.39 | N.D. | N.D. |
| 20Ni—2Cu/CNT (IW) | 21.8 | 2.32 | 9.40 | N.D. | N.D. |
| 40Ni—4Cu/CNT (IW) | 39.6 | 4.28 | 9.25 | N.D. | N.D. |

Figure 2:
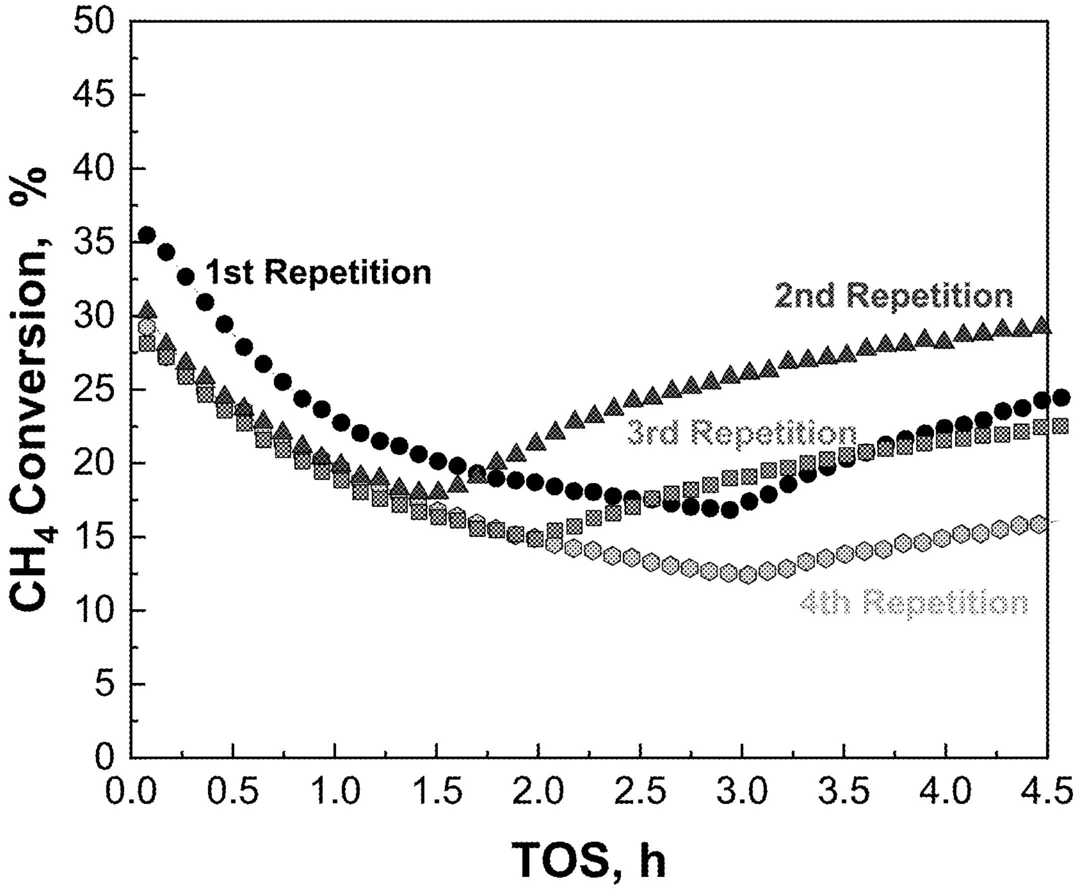
FIG. 2 shows reproducibility of $CH_4$ TCD performance for a 10Ni—Cu/CNT catalyst system synthesized by a solvothermal method (ST) and evaluated using 100 vol. % $CH_4$ at 600° C.
Figure 3A:
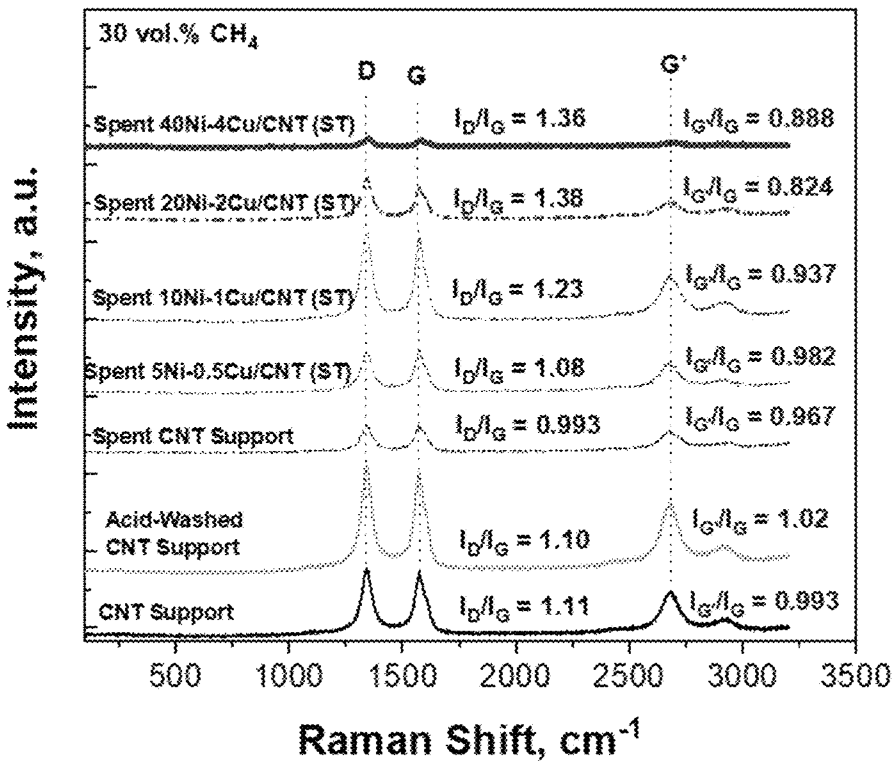
Figure 3B:
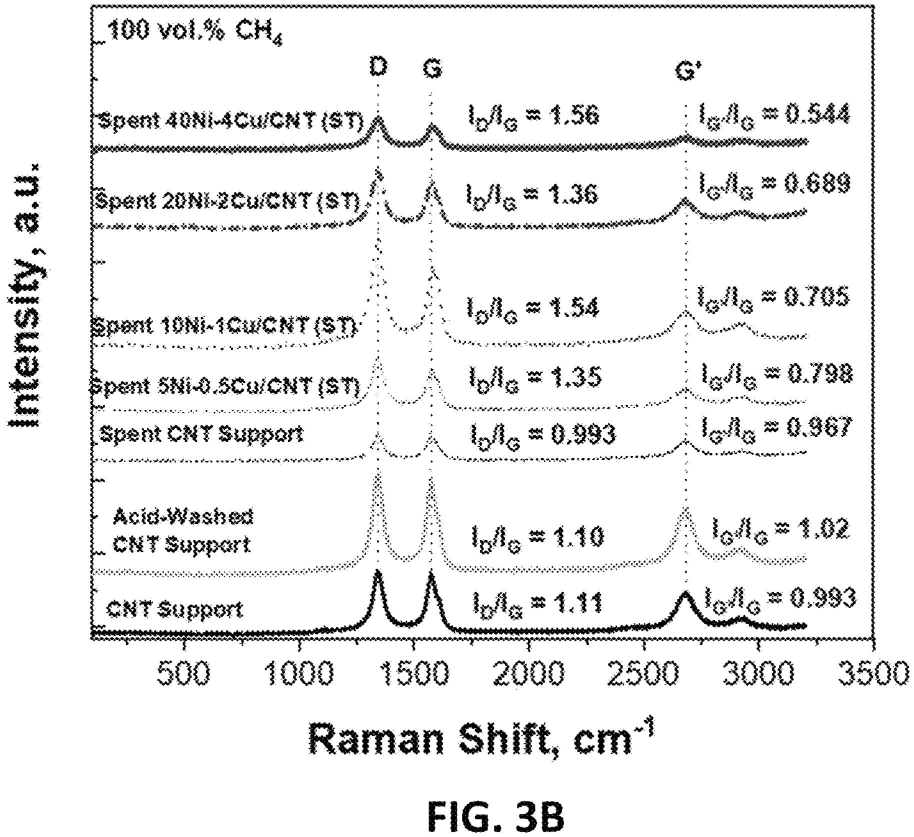
Figure 3C:
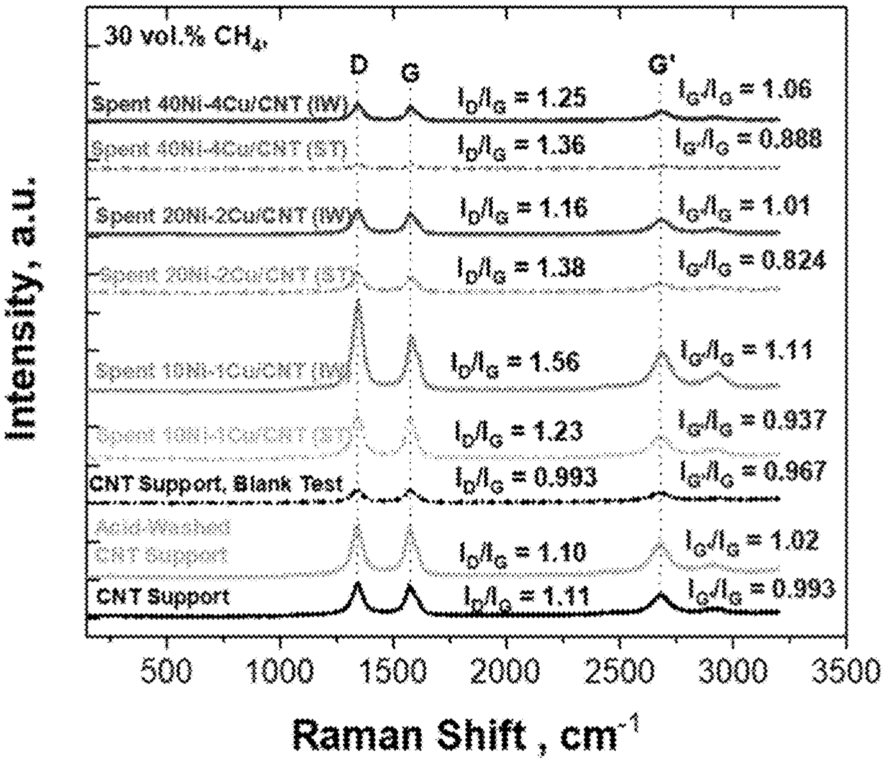
Figure 3D:
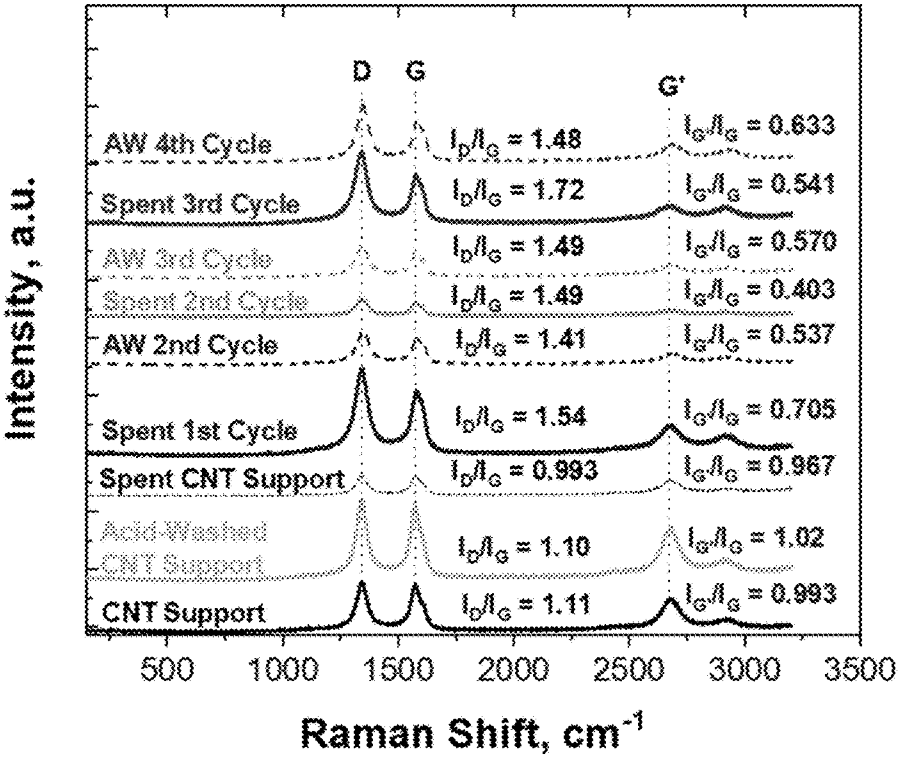
Figure 4A:
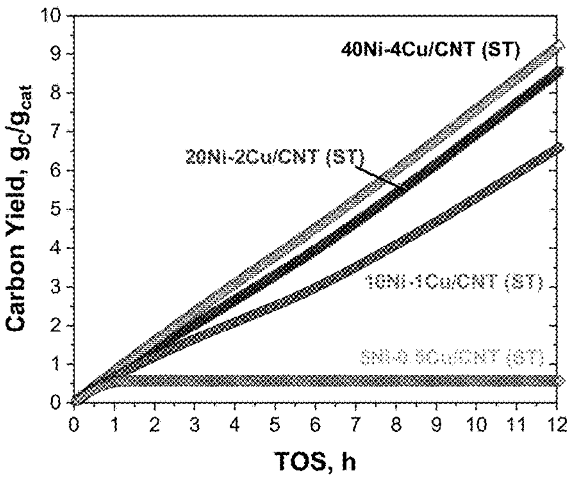
FIGS. 4A-4D are graphs showing carbon yield normalized by mass of catalyst and mass of metal of catalyst system synthesized via the solvothermal method (ST) and incipient wetness (IW) methods, wherein the catalyst systems were evaluated using a methane composition flow rate of 30 $cm^3$/min with 30 vol % $CH_4$ in $N_2$ at 600° C.
Figure 4B:
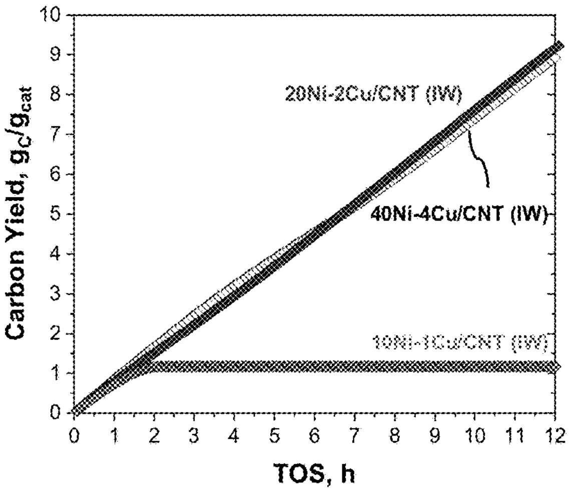
Figure 4C:
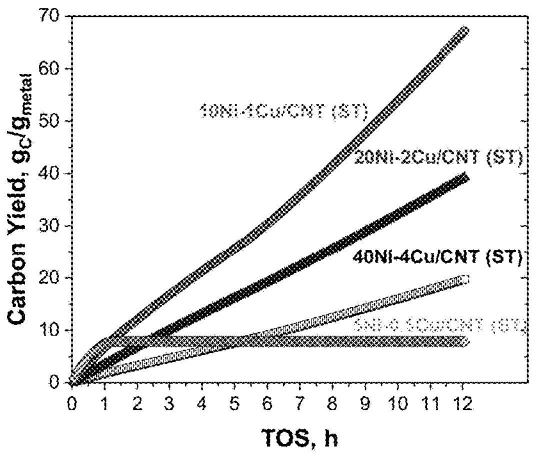
Figure 4D:
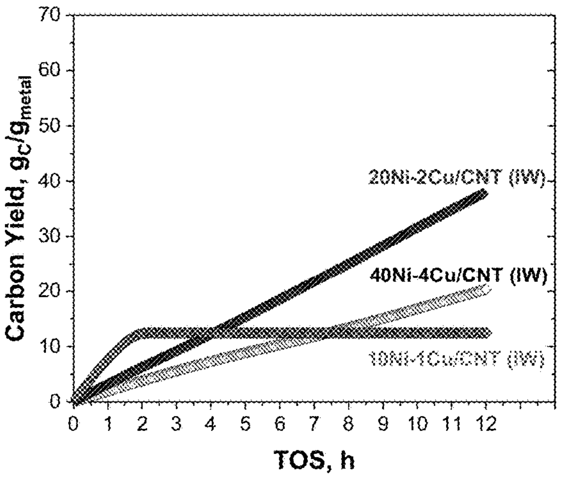
Figure 5A:
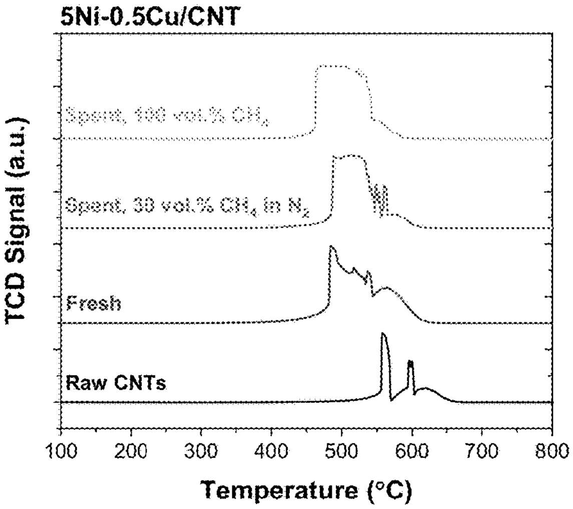
Figure 5B:
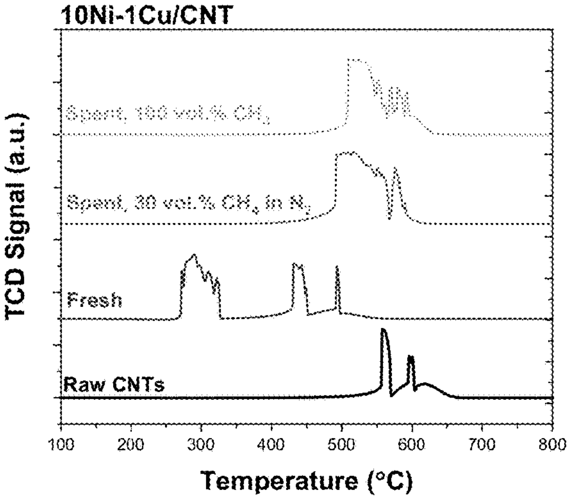
Figure 5C:
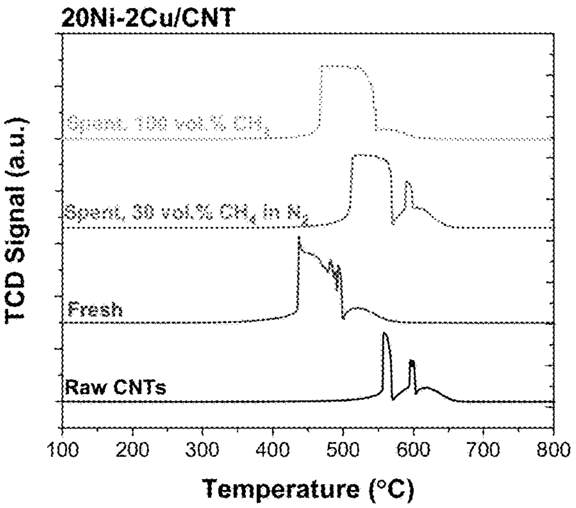
Figure 5D:
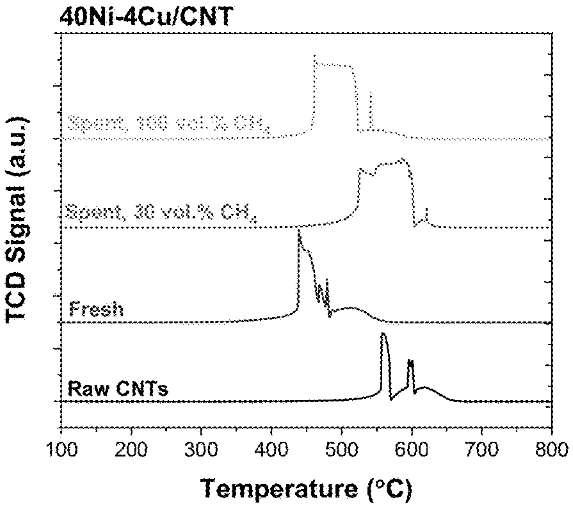

X-ray diffraction (XRD) patterns were collected using a Rigaku SmartLab SE Bragg-Brentano diffractometer, equipped with a fixed Cu anode operated at 40 kV and 44 mA and a D/Tex Ultra 250 one-dimensional detector. Patterns were collected with a variable divergence slit between 2°<2θ<100° at intervals of 0.01°. The composition, lattice parameters, and crystallite sizes of the crystalline components were determined by Rietveld fitting between 30°<2θ<100° using Topas v6 (Bruker AXS) as discussed elsewhere. Because of the presence of Ni—Cu alloys containing a range of compositions, it is acknowledged that this method could underestimate the crystallite size. The compositions of the metallic phases (Table 2) were estimated from their refined cubic lattice parameters by linear interpolation between Ni (a=3.5238 Å) and Cu (a=3.615 Å). The XRD patterns are shown in FIGS. 1 and 2. The Raman patterns are shown in FIG. 3.

TABLE 2

Characterization of fresh reduced and spent catalyst systems via X-Ray diffraction (XRD) and Raman spectroscopy. The XRD patterns are shown in FIGS. 1 and 2. The Raman patterns are shown in FIG. 3.

| Catalyst systems | XRD fresh reduced: Ni-rich alloy wt. % (%) | Ni:Cu (mol/mol) | Crystallite size (nm) | XRD fresh reduced: Cu-rich alloy wt. % (%) | Ni:Cu (mol/mol) | Crystallite size (nm) | XRD spent at 30 vol. % $CH_4$ in $N_2$ and 600° C.: Ni-rich alloy wt. % (%) | Ni:Cu (mol/mol) | Crystallite size (nm) | Raman spent at 30 vol. % $CH_4$ in $N_2$ and 600° C. $I_D/I_G$ | $I_{G'}/I_G$ |
|---|---|---|---|---|---|---|---|---|---|---|---|
| 5Ni—0.5Cu/CNT (ST) | 100 | ∞ | 11.4 | — | — | — | 100 | 90.2 | 11.8 | 1.08 | 0.982 |
| 10Ni—1Cu/CNT (ST) | 100 | 24.3 | 11.0 | — | — | — | 100 | 17.6 | 9.40 | 1.23 | 0.937 |
| 20Ni—2Cu/CNT (ST) | 81 | 44.6 | 18.8 | 19 | 2.35 | 15.6 | 100 | 24.3 | 23.7 | 1.38 | 0.824 |
| 40Ni—4Cu/CNT (ST) | 76 | 25.8 | 26.9 | 24 | 3.54 | 15.7 | 100 | 13.5 | 29.2 | 1.36 | 0.888 |
| 10Ni—1Cu/CNT (IW) | 100 | 69.2 | 9.31 | — | — | — | 100 | 44.6 | 14.5 | 1.56 | 1.11 |
| 20Ni—2Cu/CNT (IW) | 100 | 20.71 | 7.91 | — | — | — | 100 | 37.0 | 11.9 | 1.16 | 1.01 |
| 40Ni—4Cu/CNT (IW) | 100 | 27.5 | 7.9 | — | — | — | 100 | 303 | 9.6 | 1.25 | 1.06 |

A Micromeritics AutoChem 2920 instrument was used to conduct temperature programmed oxidation (TPO). Samples (ca. 50 mg) were first loaded and pretreated at 120° C. for 120 min under helium, and then heated to 800° C. at a ramp rate of 5° C.·min$^{-1}$ in 5 vol. % $O_2$ in helium flowing at 30 cm$^3$/min.

Raman spectra were recorded on a Renishaw InVia Raman microscope with excitation from a 10 mW laser (532 nm) Each spectrum was averaged over three scans to characterize the solid carbon co-produced by TCD of $CH_4$.

Morphology of solid carbon co-products, metal particle size, and element distribution before and after reaction were determined using a FEI Titan 80-300 high-resolution transmission electron microscope operated at 300 kV. The microscope was equipped with a CEOS GmbH double-hexapole aberration corrector for the probe-forming lens, and an energy-dispersive X-ray spectroscopy detector. Metal particle size and composition distributions were calculated from the images by sampling an average of 100 particles.

A JEOL 7001F field emission gun scanning electron microscope (SEM) equipped with a dual Bruker X-Flash|60 EDS detector was also used to assess the morphology of the carbon co-product at 2 kV accelerating voltage. Imaging and X-ray spectroscopy detection were performed in high vacuum mode at 15 kV accelerating voltage.

A Fourier transform infrared (FTIR) spectrometer (Bruker Vertex 70) was used to obtain the infrared absorption spectra of samples embedded in potassium bromide (KBr) pellets. KBr pellets are prepared by mixing and grinding 0.3 mg of sample with 300 mg KBr, using a mortar and pestle. Then, the mixture was compressed for 3 min (10,000 lb/in$^2$) using a hydraulic press and a 12 mm diameter die. Each FTIR result was obtained by accumulating 128 scans with a resolution of 2 cm$^{-1}$.

Example 3

In this example, a fixed-bed, continuous-flow, vertical stainless-steel reactor was used for the TCD reaction at ambient pressure. As-synthesized catalyst systems (0.2 g, density ≈0.33 g/cm$^3$) were loaded between two plugs of quartz wool. $N_2$ gas was used as a carrier gas and as an internal standard for product analysis (on-line gas chromatography). Prior to each test, the 0.2 g catalyst system samples were reduced in situ at 400° C. for 4 hours under 70 cm$^3$/min 10 vol. % $H_2$ in $N_2$ at a ramp rate of 3° C./min. Subsequently, the reactor was heated to the reaction temperature (e.g., 550-700° C.) under 70 cm$^3$/min of $N_2$. Before reaction, the $H_2$ had been completely purged from the system (monitored by on-line gas chromatograph). Then, the feed was switched to 30 cm$^3$/min of 30 vol. % $CH_4$ in $N_2$ to maintain a constant space velocity of 9,000 cm$^3$/g/h (≈3000 h$^{-1}$ at the assumed density of the bed). The outlet gas flow rate was measured by a digital flow meter (DryCal). Composition of the outlet gas was analyzed by a two-channel Inficon Micro GC Fusion equipped with molecular sieve 5A and PLOT U columns and a TCD detector. When the test concluded, the reactor system was cooled to room temperature under 30 cm$^3$/min of $N_2$, and the spent catalyst systems (containing solid carbon co-product) were retrieved from the reactor for analysis. Hydrogen was the only gaseous reaction product; $CO_2$ and carbon monoxide were not detected.

Conversion of the $CH_4$, carbon yield, and the rate of deposition of carbon were monitored as a function of time-on-stream (TOS). Typically, the reactions were run for over 14 hours to make sure it achieved a minimum total carbon yield of at least 3.56 $g_{carbon}/g_{catalyst}$ (e.g., ≈80% of the carbon in the spent catalyst systems was freshly accumulated carbon co-product), which typically took between 7 and 8 hours for the 10Ni-1Cu/CNT catalyst systems (see FIGS. 4A-4D). That accumulation made sure the spent catalyst system characterization was representative of the carbon co-product instead of the starting carbon support. Mass balances closed within 95% to 100%.

After retrieving the spent catalyst system from the reactor, they were crushed and sieved to >100 mesh. Crushed solids were mixed with a solution of 5 M $HNO_3$ (in deionized water) using a volume of acid solution-to-crushed solid mass of 50. In a typical treatment, 5 g of spent catalyst systems were treated using 250 mL of solution in a 500 mL round-bottomed flask. The flask was submerged in an oil bath connected to a condenser cooled to 5° C. The top of the condenser was connected to house $N_2$ at atmospheric pressure to mitigate the loss of solution. The oil bath was heated to 120° C. and maintained at that temperature for 24 hours. The suspension was cooled to room temperature and then sieved using 100, 200, and 480 mesh sieves to size select and retain the agglomerates. Each trance was rinsed with deionized water until the pH of the water passing through the carbon was 5.5-6. The collected solution was initially black because of the presence of small carbon particles that were not collected by the mesh. Once the carbon particles settled, the color of the solution became slightly green because of the presence of dissolved Cu. The solids collected by the mesh were placed in a drying oven under stagnant air at 80° C. for 12 hours. The dry solids then were cooled to room temperature, weighed, and stored in a glass vial. The total mass of metal originally present in the 5 g of spent catalysts was 122 mg (e.g., 1.11 g fresh catalyst system with 11 wt. % metal). The dry collected solids lost 250 to 450 mg during the acid wash step, suggesting that between 90.8.5% and 94.9% of the carbon co-product were recovered (=(5,000 mg−122 mg−450 mg)/(5,000 mg−122 mg)).

Example 4

Figure 6A:
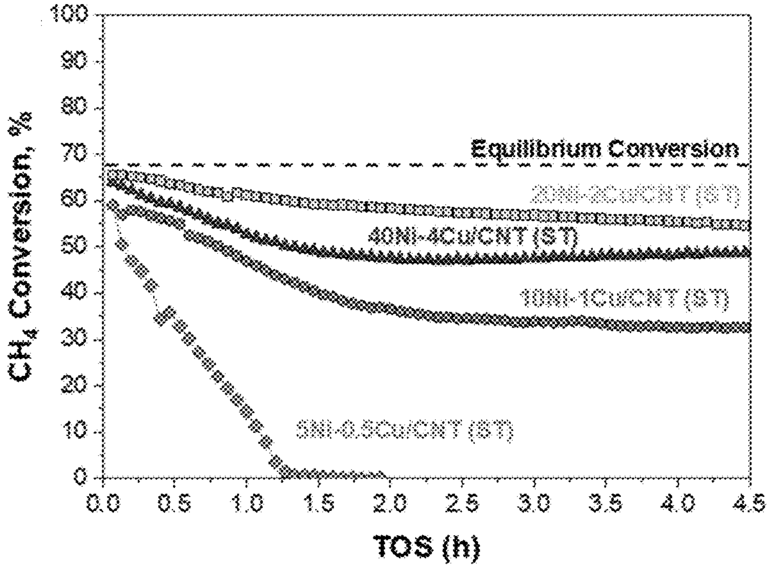
FIGS. 6A-6B show results for $CH_4$ conversions as a function of time-on-stream (TOS) using a methane composition flow rate of 30 $cm^3$/min with 30 vol % $CH_4$ in $N_2$ at 600° C.

In this example, a series of Ni—Cu catalyst systems prepared via the ST technique, with an eightfold range of metal loadings but a constant Ni:Cu weight ratio of 10:1, was tested at 600° C. under 30 cm$^3$/min of 30 vol. % $CH_4$ in $N_2$ and 30-120 cm$^3$/min of 100 vol. % to study the effects of $CH_4$ concentration and $CH_4$ residence time on catalyst system performance. The results, $CH_4$ conversion, carbon deposition rate, and $H_2$ production rate, are summarized in FIGS. 6A-6B. The catalyst system performance as a function of TOS for the 100 vol. % run can be found in FIGS. 7A-7B.

Figure 8:
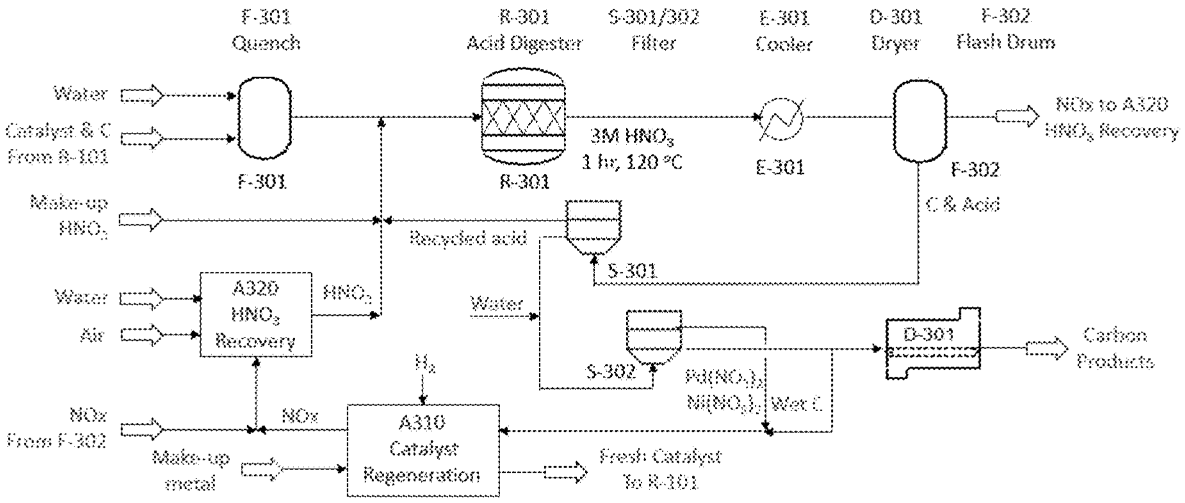
FIG. 8 shows an exemplary process configuration of an acid wash and carbon recovery zone.
Figure 9A:
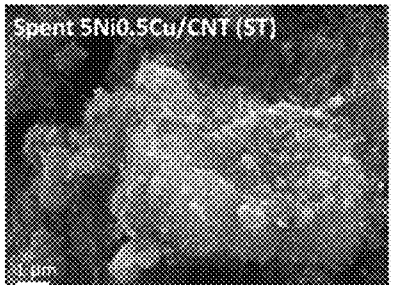
FIGS. 9A-9L show scanning electron microscopy (SEM) images (FIGS. 9A-9H) and metal particle size analysis (FIGS. 9I-9L) of catalyst system synthesized by the ST method after being used in TCD under 30 vol. % $CH_4$ in $N_2$ at 600° C.
Figure 9B:
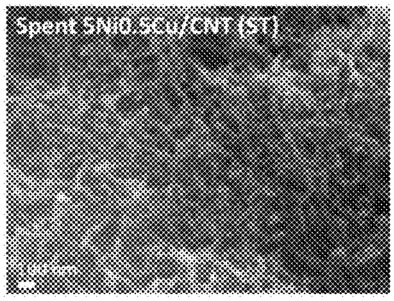
Figure 9C:
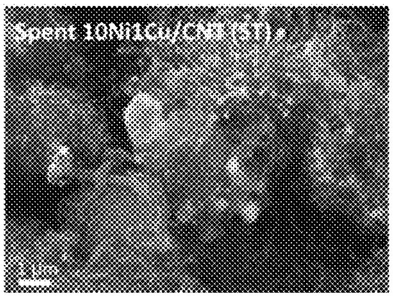
Figure 9D:
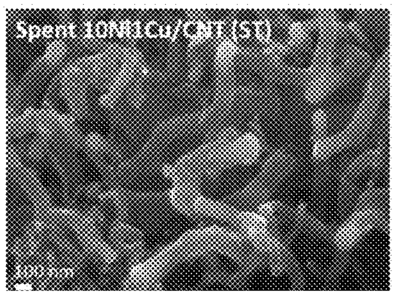
Figure 9E:
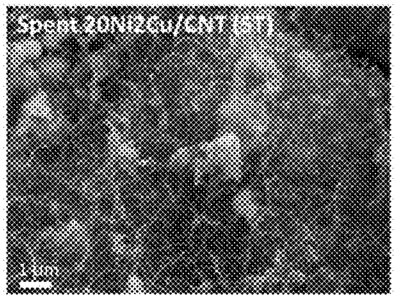
Figure 9F:
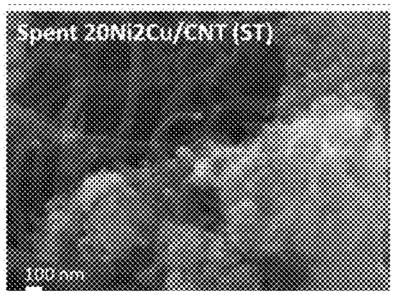
Figure 9G:
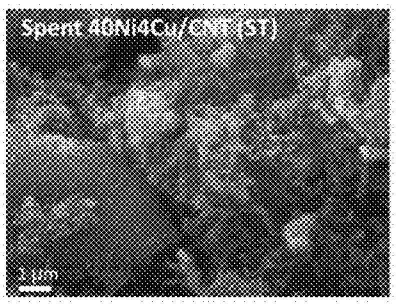
Figure 9H:
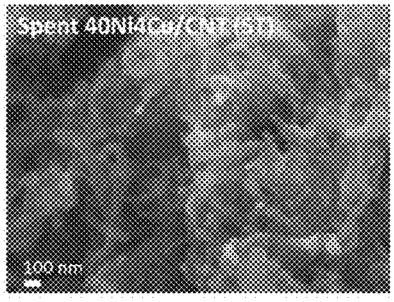
Figure 9I:
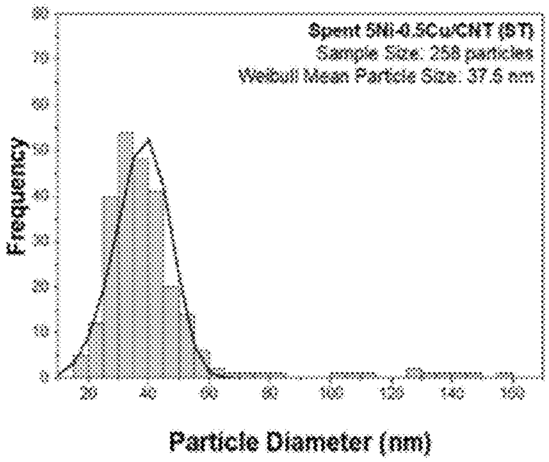
Figure 9J:
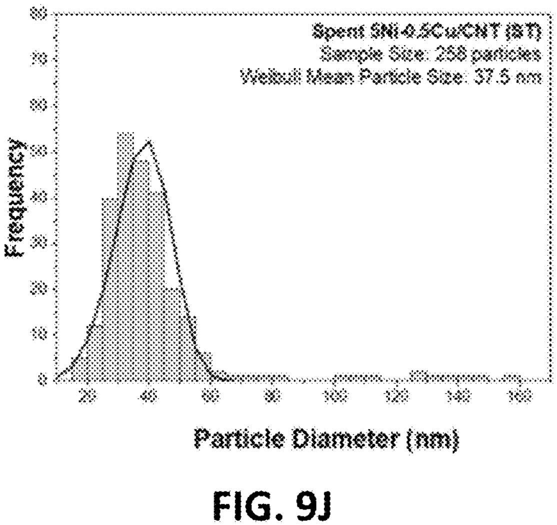
Figure 9K:
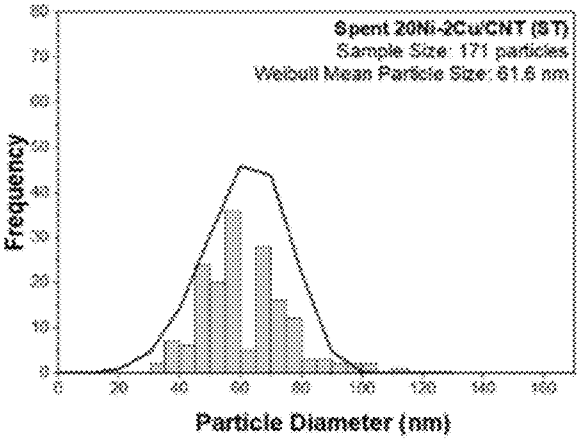
Figure 9L:
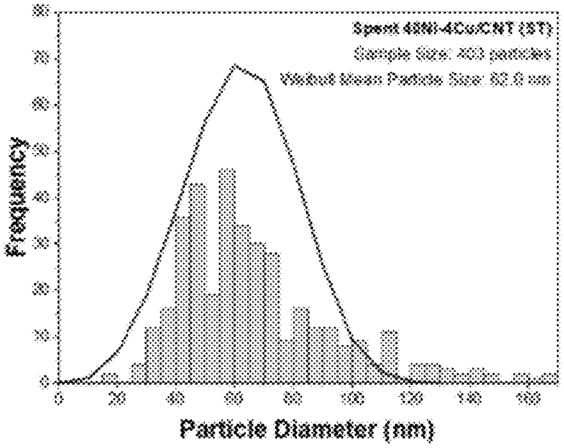

Among catalyst systems tested under the same reaction conditions, there is a <20% variation in the average initial $CH_4$ conversion during the initial 20 min of TOS irrespective of total metal loading (FIG. 6A) when operating with a 30 vol % $CH_4$ feed composition, indicating that the catalytic system is not operating under a kinetically limited regime. The thermodynamic equilibrium conversion of $CH_4$ was calculated as a function of temperature (FIG. 8) for the 30 vol. % $CH_4$ in the $N_2$ stream and is similar to the conversion experimentally obtained, confirming that the system is operating at near equilibrium. However, the catalyst system stability (e.g., longevity) is greatly affected by the metal weight loading even if the catalyst systems have similar Ni:Cu compositions (Table 1). For example, the 5Ni-0.5Cu/CNT deactivated within the first hour of reaction; however, the other ST catalyst systems remain active for the whole duration of the experiment even when having the same Ni:Cu compositions. If the catalyst system deactivation only depended on catalyst system composition, a proportional catalyst system deactivation between the low metal loading catalyst system and high metal loading catalyst systems would have been expected (e.g., 10Ni-1Cu and 20Ni-2Cu catalyst systems would have taken two and four times longer, respectively, to deactivate than 5Ni-0.5Cu); however, trend was not observed that suggesting that the deactivation in this instance is possibly controlled by another parameter such as metal particle size or location of the metal particles (e.g., macropores vs. micropores). The 10Ni-1Cu (ST) formulation had similar activity and longevity than the 20Ni-2Cu and 40Ni-4Cu (ST) formulations resulting in similar carbon yields normalized by the mass of catalyst (e.g., $g_C/g_{CAT}$); however, the 10Ni-1Cu (ST) formulation had the highest carbon yield normalized by the mass of metal (e.g., $g_C/g_{metal}$) because of the lower metal loading and similar stability than the 20Ni-2Cu and 40Ni-4Cu (ST) formulations. Hence, the 10Ni-1Cu (ST) formulation was selected for the cycling experiments and as the catalyst system for the TEA.

Table 2 summarizes the XRD analysis of the fresh and spent catalyst systems and reveals that there was a difference in metal crystallite size between the fresh and spent catalyst systems. The ST catalyst systems with more stable TCD performances (20Ni-2Cu and 40Ni-4Cu) had the largest crystallite sizes (18.8 and 26.9 nm, respectively) while the less stable catalyst systems (5Ni-0.5Cu and 10Ni-1Cu) had a smaller crystallite sizes (11.4 and 11 nm, respectively) for the fresh catalyst systems. A change was observed in the crystallite site and Ni:Cu compositions during the reaction experiment. After reaction, the most stable ST catalyst systems (20Ni-2Cu and 40Ni-4Cu) had larger metal crystallite sizes (23.7 and 29.2 nm, respectively) compared to the less stable catalyst systems (5Ni-0.5Cu and 10Ni-1Cu) that had a smaller crystallite size (11.8 and 9.4 nm, respectively). A decrease was observed in the Ni:Cu ratio (e.g., loss of Ni) of the metal crystallites for the all the spent catalyst system regardless of the metal loading, suggesting that Ni is being selectively lost during the reaction. The metal particle size distribution was evaluated via SEM images shown in FIGS. 9A-9L and a similar trend in metal particle size as the one identified via XRD was observed; that is, the average metal particle size increase with metal loading. In this example, the decrease in particle size is speculated to be the main reason for catalyst system deactivation; however, a change in Ni:Cu composition might also affect the TCD longevity. In this example, Cu-rich metal particles are not active for TCD under the reaction conditions and a Ni-rich particle is needed to perform TCD.

Figure 10A:
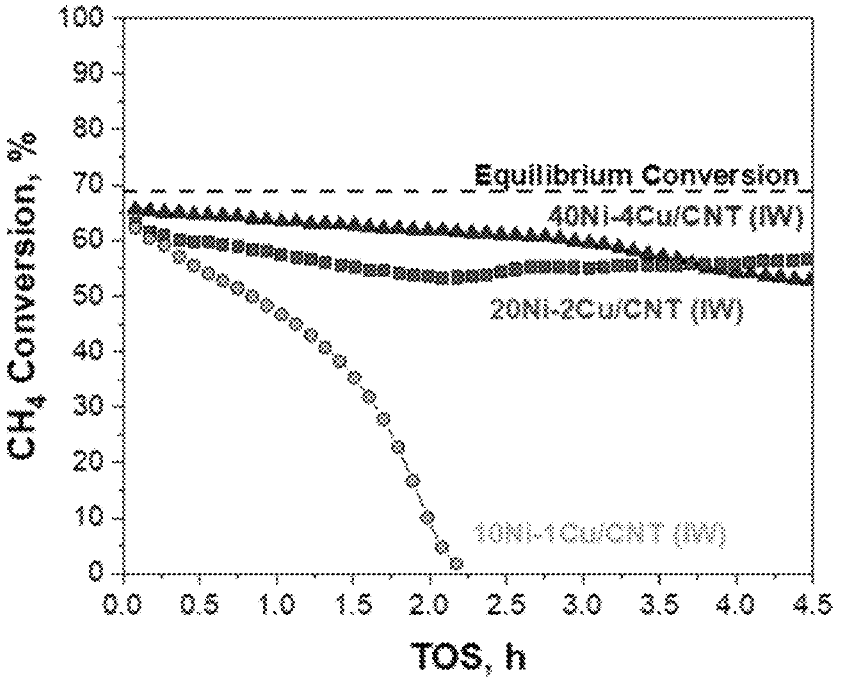
FIGS. 10A-10B show results for $CH_4$ conversions as a function of TOS (FIG. 10A) and carbon deposition rate and $H_2$ production (FIG. 10B) for the following catalyst systems that were prepared by the IW method: 10Ni-1Cu/CNT, 20Ni-2Cu/CNT, and 40Ni-4Cu/CNT, and wherein all catalyst systems were evaluated at 600° C. using a methane composition flow rate of 30 $cm^3$/min with 30 vol % $CH_4$ in $N_2$.
Figure 10B:
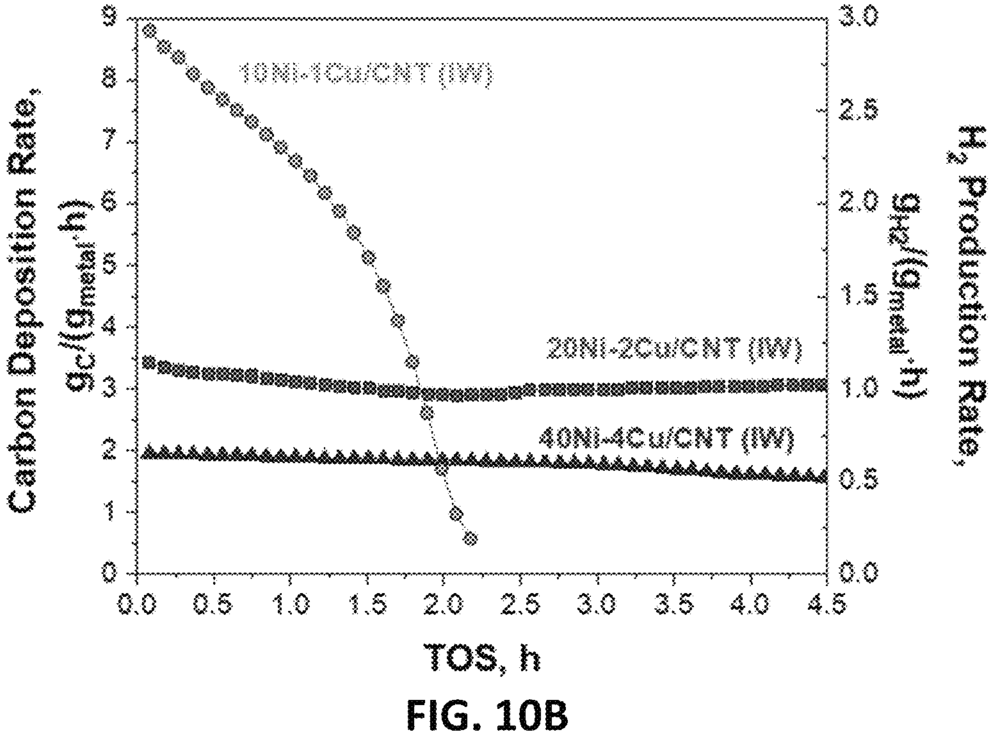
Figure 11A:
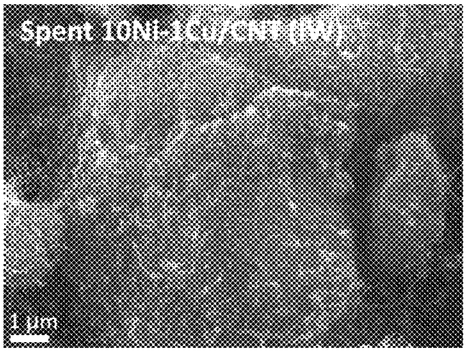
FIGS. 11A-11L show SEM images (FIGS. 11A-111) and metal particle size histograms (FIGS. 11J-11L) of the following catalyst systems, which were made using the IW method: 10Ni-1Cu/CNT, 20Ni-2Cu/CNT, and 40Ni-4Cu; wherein all catalyst systems were evaluated under 30 vol. % $CH_4$ in $N_2$ at 600° C.
Figure 11B:
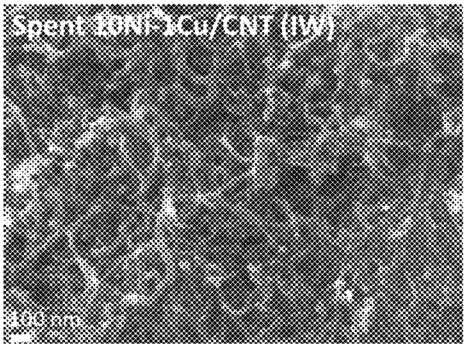
Figure 11C:
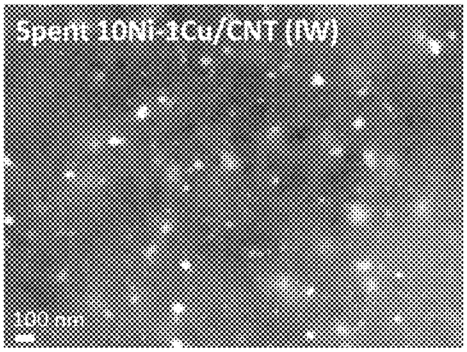
Figure 11D:
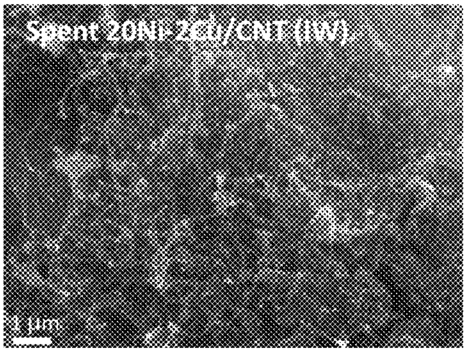
Figure 11E:
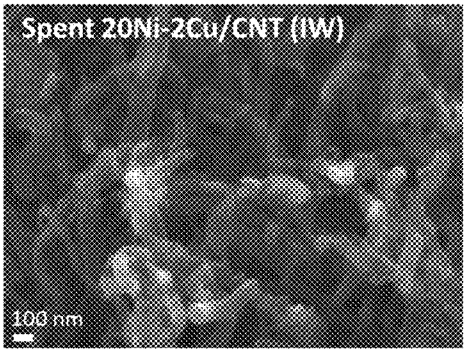
Figure 11F:
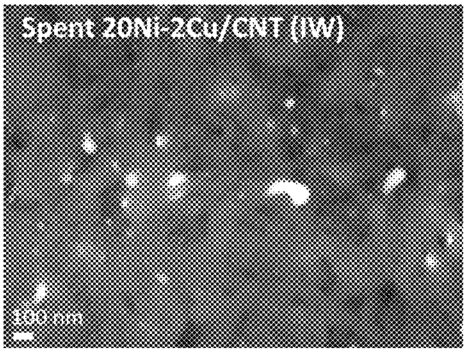
Figure 11G:
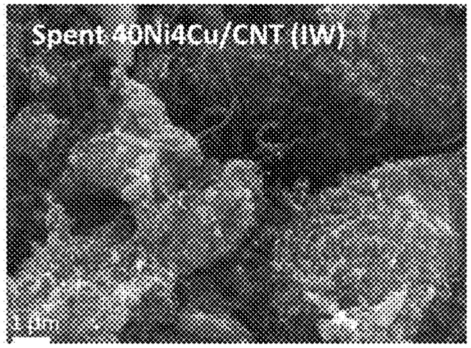
Figure 11J:
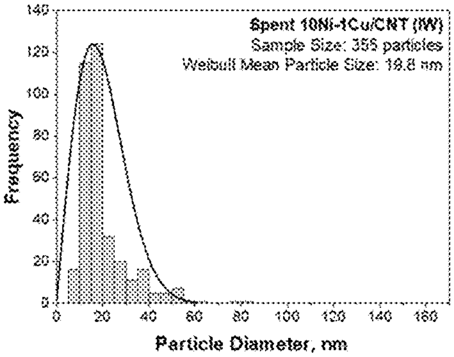
Figure 11H:
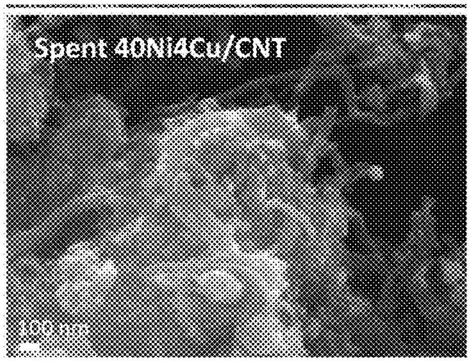
Figure 11K:
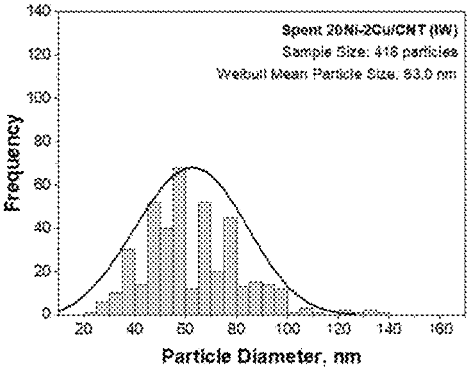
Figure 11I:
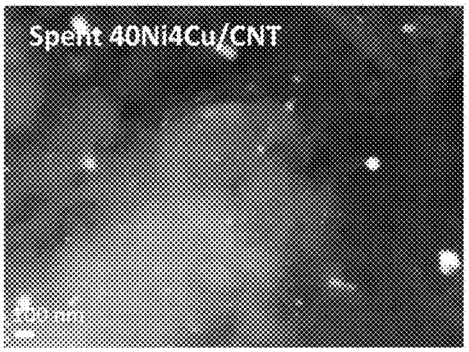
Figure 11L:
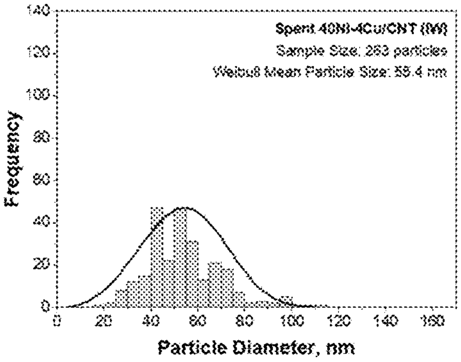

Hence, in this example, a continuous loss of Ni from the active metal particle during reaction might form Ni deficient particles and cause catalyst system deactivation. The particle size effect on catalyst systems synthesized via IW was explored by changing the metal weight loading (and a constant Ni:Cu to Cu mass ratio of 10). As shown in FIGS. 10A and 10B, 10Ni-1Cu/CNT (IW) deactivated within 2 hours; however, increasing the total nominal metal loading to 22 wt. % and 44 wt. % improved the TCD activity and stability (e.g., longevity) similar to the TCD performances observed with the ST catalyst systems.

The fresh and spent catalyst systems via XRD was evaluated and it was observed that the average crystallite sizes (e.g., particle size) of the IW catalyst system were consistently smaller for the fresh (7.9 nm-9.31 nm) and spent catalyst systems (9.60 nm-14.5 nm) compared to those obtained via ST (Table 2). In this example, the smaller crystallite size was associated with faster catalytic deactivation. The metal particle size of the spent catalyst systems was evaluated via SEM and it was observed that the 10Ni-1Cu/CNT (IW) was primarily composed of <20 nm particles (FIGS. 11A-11L). However, the 20Ni-2Cu/CNT (IW) and 40Ni-4Cu/CNT (IW) catalyst systems were predominantly composed of >55 nm particles and were stable for the TCD reaction. Hence, the difference in performance in this example between the 10Ni-1Cu/CNT formulation synthesized via IW and ST is caused mainly by the difference in metal particle size; that is, IW yielded a smaller crystallite than ST and resulted in a faster catalyst system deactivation. The 20Ni-2Cu and 40Ni-4Cu IW and ST catalyst system formulations had similar performance because they had similar particle size distribution (predominantly composed of metal particles >55 nm and exhibited no deactivation. While the Ni:Cu molar ratio was similar for all the IW and ST fresh catalyst systems (9.25 and 12.7, respectively), the spent stable (20Ni-2Cu and 40Ni-2Cu) IW catalyst systems had higher Ni:Cu ratios (37.0 and 303, respectively) than the ST catalyst systems (24.3 and 13.5, respectively). In this example, the result reinforces how the crystallite and particle size determine the activity and longevity of the catalyst systems.

Example 5

Figure 6B:
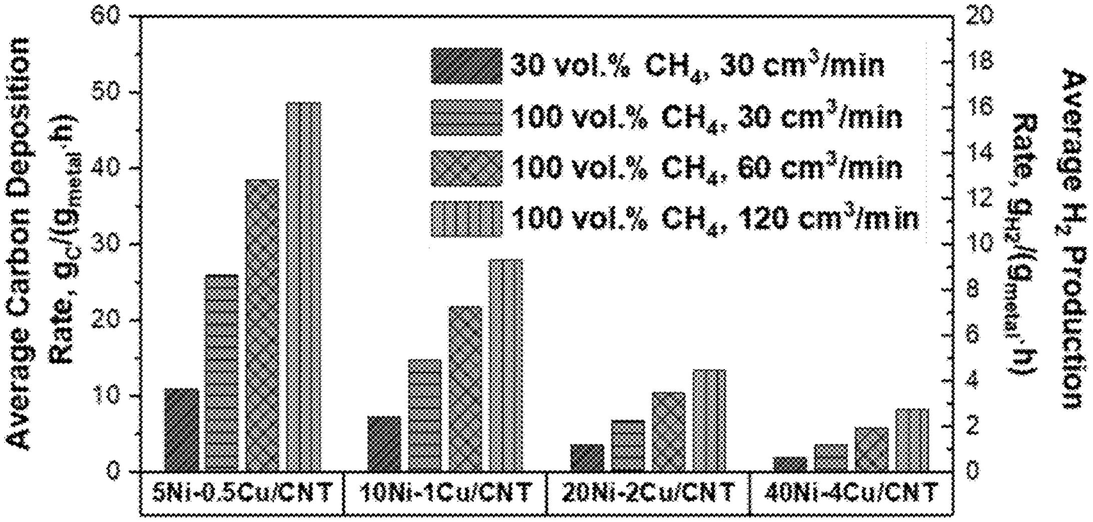
Figure 7A:
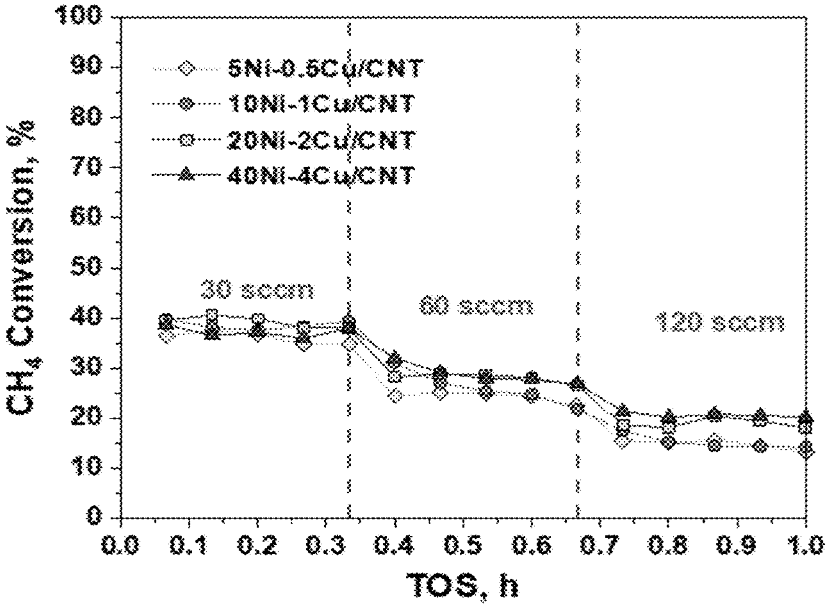
Figure 7B:
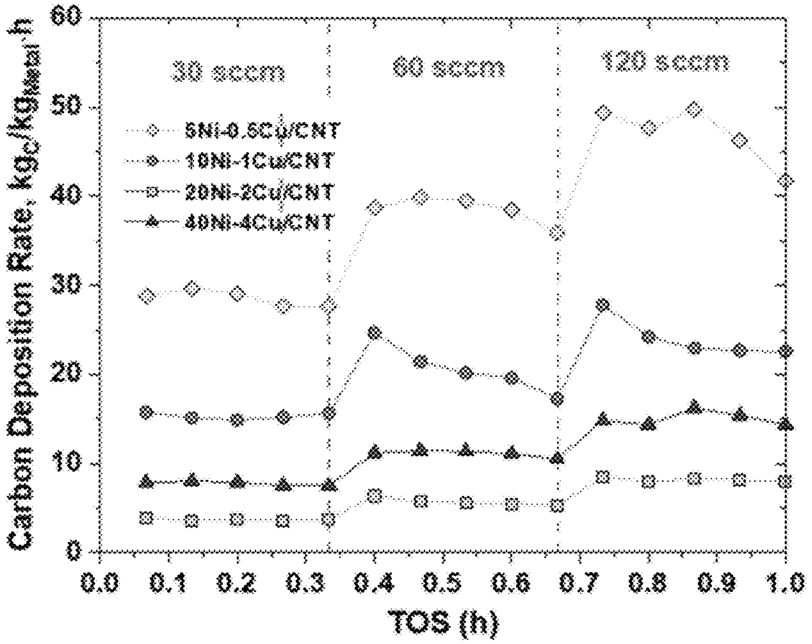

In this example, the TCD performance (at a constant Ni:Cu ratio and temperature) was also evaluated by changing $CH_4$ composition and space velocity (FIG. 6B). It was observed that the carbon deposition rate and $H_2$ production nearly doubled by changing the $CH_4$ composition from 30 to 100 vol. % $CH_4$ for all the Ni—Cu catalyst system tested. Additionally, the TCD performance further doubled by increasing the space velocity from 30 to 120 $cm^3$/min. At 60 and 120 $cm^3$/min, it started to show an increase in conversion with metal weight loading (FIGS. 7A-7B), suggesting that the system was not operating under mass transport and/or equilibrium limitations under high space velocities. In this example, these results illustrate how the TCD activity and stability can be improved by nearly one order of magnitude by controlling feed and catalyst system compositions.

Example 6

Figure 12A:
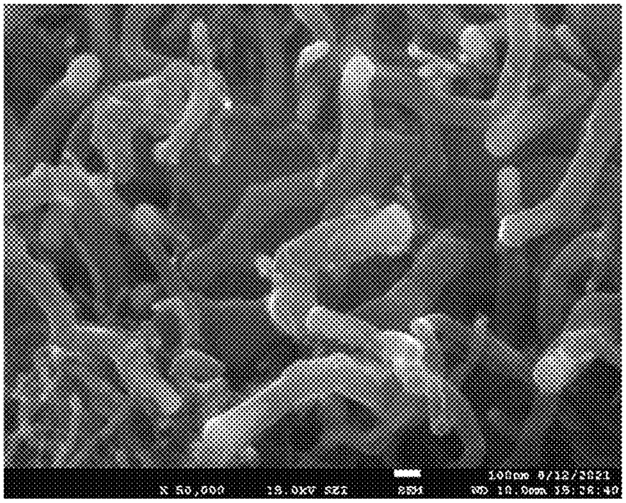
FIGS. 12A-12B are images showing elemental mapping of a 10Ni-1Cu/CNT catalyst system synthesized using the ST method after reaction under 30 vol. % $CH_4$ in $N_2$ at 600° C.; the Ni:Cu composition of the different analyzed particles can be found in Table 4 provided herein.
Figure 12B:
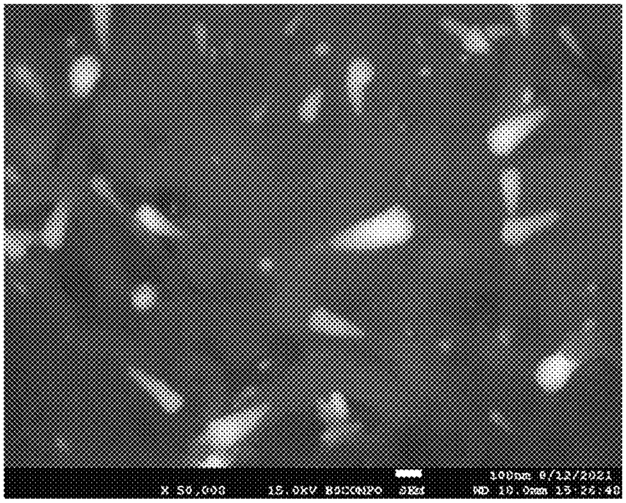
Figure 13A:
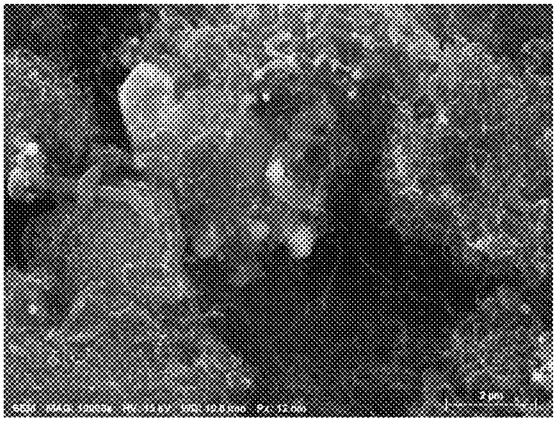
FIGS. 13A-13D are images showing elemental mapping of 10Ni-1Cu/CNT synthesized by the solvothermal method after reaction under 30 vol. % $CH_4$ in $N_2$ at 600° C. The Ni:Cu composition of the different analyzes particles can be found in Table 3.
Figure 13B:
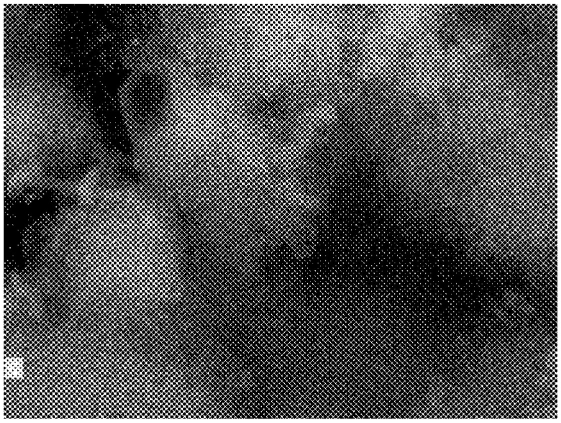
Figure 13C:
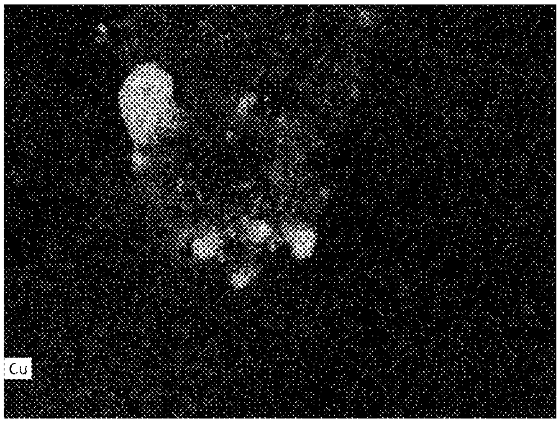
Figure 13D:
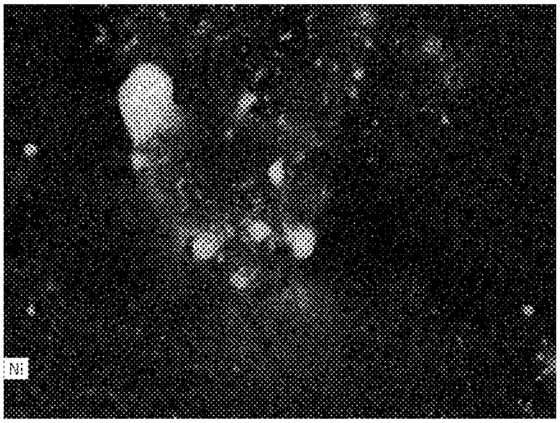

In this example, the spent catalyst systems were analyzed via XRD, TPO, SEM, and Raman spectroscopy to characterize the property and morphologies of the carbon co-product. The XRD analysis (FIGS. 1A-1D) show that metallic features (440 and 52°) decrease after reaction with 30 vol. % $CH_4$ feed while the graphitic carbon features (260 and 43°) increase, qualitatively showing that carbon was deposited during reaction. The decrease of metal features and increase in graphitic carbon features was more pronounced when operating with 100 vol % $CH_4$, which is consistent with the higher carbon deposition rates discussed in the previous section. TPO of the spent catalyst systems revealed that the graphitic carbon was indeed graphitic as the oxidation temperature was >400° C. (see FIGS. 5A-5D). Shifts were observed in oxidation temperatures of ≈50° C. between the different samples; it was speculated that they were caused by exotherms associated with the different carbon loadings and variation in the position of the internal thermocouple. The SEM analysis revealed that the spent ST catalyst systems were composed of CNTs regardless of the catalyst system composition (see FIGS. 9A-9H). In this example, the diameters of the imaged CNTs are >100 nm and suggest that the Ni—Cu metal particles responsible for their growth had similar size. The presence of the >100 nm metal particles at the tip of the CNT was verified using backscattering SEM imaging (FIGS. 12A and 12B).

FIGS. 13A-13D are images showing elemental mapping of 10Ni-1Cu/CNT synthesized by the solvothermal method after reaction under 30 vol. % $CH_4$ in $N_2$ at 600° C. The Ni:Cu composition of the different analyzes particles can be found in Table 3.

TABLE 3

Elemental composition of metal particles present in 10Ni—1Cu/CNT synthesized by the solvothermal (ST) method after reaction in 30 vol. % $CH_4$ in $N_2$ at 600° C.

| | wt. % | | | |
|---|---|---|---|---|
| Spectrum | C | Ni | Cu | Ni/Cu (mol/mol) |
| Object 1 | 86.4 | 13.4 | 0.00 | Pure Ni |
| Object 2 | 59.5 | 30.3 | 9.67 | 3.39 |
| Object 3 | 88.1 | 9.70 | 1.44 | 7.27 |
| Object 4 | 83.2 | 13.8 | 3.08 | 4.84 |
| Object 5 | 79.8 | 18.7 | 1.55 | 13.0 |
| Object 6 | 74.0 | 19.8 | 6.11 | 3.51 |
| Object 7 | 74.6 | 19.1 | 6.09 | 3.39 |
| Object 8 | 71.3 | 21.2 | 7.27 | 3.16 |
| Object 9 | 89.0 | 9.01 | 1.56 | 6.27 |
| Object 10 | 78.9 | 15.2 | 5.74 | 2.87 |
| Object 11 | 90.5 | 7.96 | 0.91 | 9.45 |
| Object 12 | 88.9 | 9.56 | 1.51 | 6.87 |
| Object 13 | 89.2 | 10.6 | 0.21 | 53.6 |
| Object 14 | 88.8 | 9.53 | 1.68 | 6.12 |
| Object 15 | 89.4 | 10.6 | 0.00 | Pure Ni |
| Object 16 | 86.0 | 13.6 | 0.23 | 63.0 |

As shown in FIGS. 9A-9L, the metal particle size analysis of the spent catalyst system revealed that the particle size distribution and average for the stable catalyst systems is larger than those non active for both ST and IW catalyst systems, which further confirms the relationship between metal particle size and catalyst system activity. For example, both the 5Ni-0.5Cu/CNT (ST) and 10Ni-1Cu/CNT (IW) had an average metal particle average smaller than 40 nm and both deactivated within 2 hours. However, upon increasing the nominal metal loading above 11 and 22 wt. % metal for the ST and IW catalyst system respectively, the average crystallite size increased to up to 62 nm and resulted in a stable performance. When using the highest nominal weight loadings evaluated, catalyst systems prepared using both the ST and IW methods had nearly identical particle size distribution and explains the similarities in TCD performance. It was speculated that the difference in the average crystallite size observed between the XRD, and the metal particles observed via SEM analysis suggest there was broad metal particle size distribution present at the catalyst systems, that was supported by backscattering imaging as it revealed the presence of smaller metal (<50 nm) nanoparticles associated with smaller CNTs. In this example, elemental mapping of the spent materials revealed that Ni and Cu were well alloyed in all the particles; however, the Ni:Cu composition varies from pure Ni to a Ni:Cu ratio of 3.16 (Table 4). The presence of Ni-rich and Ni-deficient particles explains the changes in Ni:Cu ratio from the crystallite overserved via XRD (Table 2); that is, Ni is migrating from the crystallite (e.g., Ni loss) to form separate Ni-rich particles.

TABLE 4

Characterization of 10Ni—1Cu/CNT catalyst system synthesized via the ST method after each cycle. The fraction of carbon co-product was calculated using a carbon yield of 5 $g_{carbon}/g_{cat}$. The catalyst systems were tested under 100 vol. % $CH_4$ at 600° C. (spent). The spent catalyst systems were acid-washed (AW) after reaction to remove metals. A portion of the AW solids carbon co-product was then used as a support to resynthesize a new catalyst system batch with the same composition via the ST method.

| Catalyst systems | Cycle | Fraction of carbon co-product, % | BET, $m^2/g$ | Raman analysis $I_D/I_G$ | Raman analysis $I_{G'}/I_G$ |
|---|---|---|---|---|---|
| MWCNT Support | 0 | 0 | 161 | 1.11 | 0.993 |
| AW MWCNT Support | 0 | 0 | 187 | 1.10 | 1.02 |
| Fresh (ST) | 1 | 0 | 147 | 1.10 | 0.999 |
| Spent (ST) | 1 | 80 | 194 | 1.54 | 0.705 |
| AW Second Cycle | 2 | 81.8 | 173 | 1.41 | 0.537 |
| Spent Second Cycle | 2 | 94.6 | 137 | 1.49 | 0.403 |
| AW Third Cycle | 3 | 96.7 | 140 | 1.49 | 0.570 |
| Spent Third Cycle | 3 | 97.2 | 195 | 1.72 | 0.541 |
| AW Fourth Cycle | 4 | 99.4 | 185 | 1.48 | 0.633 |

Figure 14A:
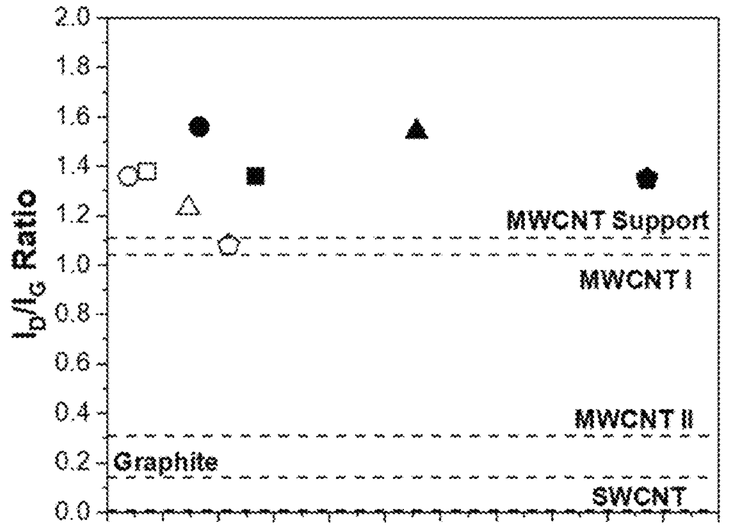
FIGS. 14A-14B are graphs showing comparisons of $I_D/I_G$ ratios (FIG. 14A) and $I_G$/IG ratios (FIG. 14B) derived from using Raman spectroscopy, wherein the results are graphed as a function of the carbon deposition rate for the different Ni—Cu catalyst systems synthesized via the ST method, wherein TCD was performed at 600° C. under 30 vol. % $CH_4$ in $N_2$ (wherein ⌂ is 5Ni-0.5Cu-CNT, Δ is 10 Ni-1Cu-CNT, □ is 20 Ni-2Cu-CNT, and ○ is 40Ni-4Cu/CNT) and 100 vol. % $CH_4$ (wherein ⬟ is 5Ni-0.5Cu-CNT, ▲ is 10 Ni-1Cu-CNT, ■ is 20 Ni-2Cu-CNT, and ● is 40Ni-4Cu/CNT).
Figure 14B:
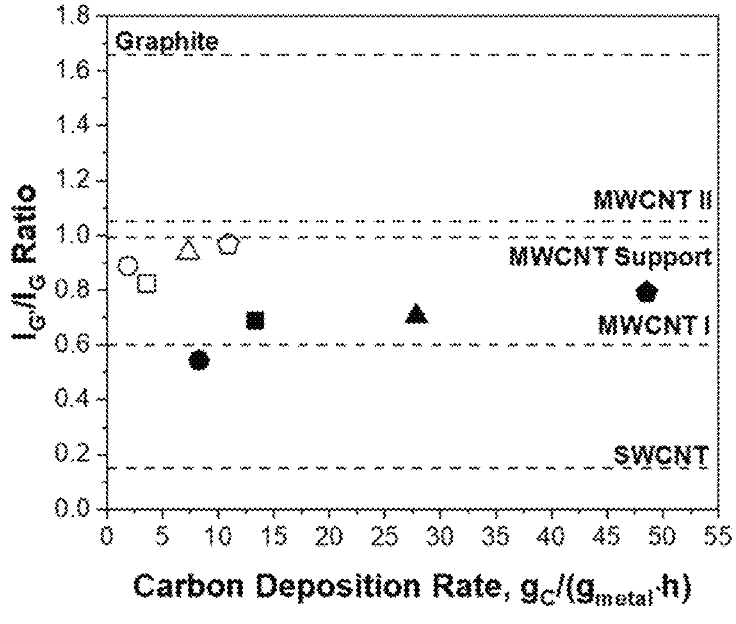

In this example, the quality of the carbon co-product can be assessed using Raman spectroscopy by monitoring the D-band, G-band, and G'-band. FIGS. 14A-14B reveal there was a small effect of metal weight loading and feed composition on the $I_D/I_G$ ratio (associated with the presence of defects) and $I_{G'}/I_G$ ratio (associated with the number of walls). The Raman spectra can be found in FIG. 3.

FIGS. 14A-14B are comparison of a) $I_D/I_G$ (FIG. 14A) and b) $I_{G'}/I_G$ ratios (FIG. 14B) derived from Raman spectroscopy as a function of the carbon deposition rate for the for the different of Ni—Cu catalyst system synthesized via the ST method where ⬠ is 5Ni-0.5Cu-CNT, Δ is 10 Ni-1Cu-CNT, □ is 20 Ni-2Cu-CNT, and ○ is 40Ni-4Cu/CNT. The reactions conditions were 600° C. under 30 vol. % $CH_4$ in $N_2$ (hollow symbols) and 100 vol. % $CH_4$ (solid symbols) The Raman spectra can be found in FIG. 3.

FIGS. 14A-14B compare the $I_D/I_G$ and $I_{G'}/I_G$ ratios of the spent catalyst systems against literature values for different MWCNT (MWCNTI and MWCNTII), SWCNT and graphite using the same Raman excitation wavelength of 532 nm. FIGS. 14A-14B also show that in this example, $I_D/I_G$ and $I_{G'}/I_G$ ratios of the produced carbon co-product is consistent with literature reported values for MWCNT and remain similar regardless of the catalyst system composition, carbon deposition rate, and feed composition. For example, 5Ni-0.5Cu/CNT catalyst system had similar $I_D$:$I_G$ and $I_{G'}$:$I_G$ ratios to that of the MWCNT support due to its fast deactivation (e.g., low carbon deposition). There were an increase in the $I_D/I_G$ ratio (from 1.0 to >1.23) and a decrease in the $I_{G'}/I_G$ ratio (from 0.982 to <0.937) of the stable catalyst systems consistent with the growth of MWCNTs with higher defect densities. The most stable catalyst systems (20Ni-2Cu/CNT and 40Ni-4Cu/CNT) had higher $I_D/I_G$ ratios (1.38 and 1.36, respectively) and lower $I_{G'}/I_G$ ratios (0.824 and 0.888, respectively), it was speculated that the ratio changes could be correlated to multiple factors that will affect the properties of the MWCN such as 1) metal particle size (and associated MWCNT diameter, number of walls, and defect density) and 2) changes in Ni:Cu molar ratios. Increasing the $CH_4$ concentration on the feed (from 30 vol.

% to 100 vol. %) resulted in an increase of the $I_D/I_G$ ratio and decrease of the $I_{G'}/I_G$ ratio for all the catalyst systems consistent with the formation of CNTs with higher defect densities and higher wall numbers. For example, 40Ni-4Cu/CNT showed an increase of $I_D/I_G$ ratio from 1.36 to 1.56 and a decrease in the $I_{G'}/I_G$ ratio from 1.56 to 0.544. These changes in $I_D/I_G$ and $I_{G'}/I_G$ ratios are caused by the higher carbon deposition rate observed during operation under 100 vol. % $CH_4$ (compared to 30 vol. % $CH_4$), resulting in the formation of MWCNTs with higher defect densities.

Raman spectroscopy was performed on the spent catalyst systems synthesized by IW and observed similar trends to that of the ST catalyst systems (FIG. 3 and Table 2). In this example, even though the compositions and performance of the catalyst systems synthesized by both methods was nearly identical, the $I_D/I_G$ and $I_{G'}/I_G$ ratios of the IW catalyst systems were slightly more favorable (e.g., lower $I_D/I_G$ ratio and higher $I_{G'}/I_G$ ratio) than with the ST catalyst systems. In this example, XRD analysis of the spent catalyst systems revealed that the crystallite sites of the IW system (Table 2) were consistently smaller than that of the ST catalyst systems. FIGS. 11A-11L show the SEM images of spent 20Ni-2Cu and 40Ni-4Cu synthesized via IW and reveal that they also are composed of large (>50 nm) Ni—Cu particles and CNTs as well as smaller (<20 nm) metal particles and CNTs. In this example, the results showed that the differences in $I_D/I_G$ and $I_{G'}/I_G$ ratios as well as TCD performance can be associated with changes in metal particle size (and distribution). Hence, in this example, the results showed that the main carbon co-products formed during $CH_4$ TCD are MWCNTs and that metal particle size, their composition, and the growth rate (e.g., carbon deposition rate) control the MWCNT properties and catalyst system longevity.

Example 7

Figure 15:
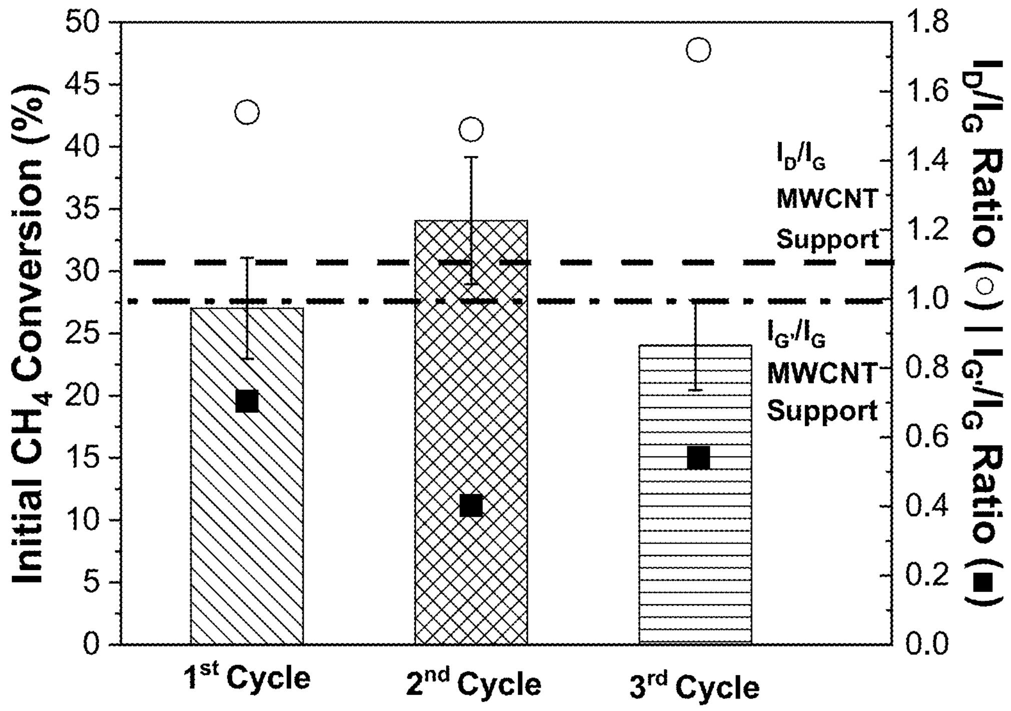
FIG. 15 is a bar graph showing the initial $CH_4$ conversion, $I_D/I_G$, and $I_G/I_G$ ratios of a 10Ni-1Cu/CNT catalyst system synthesized by the ST method after three successive acid-wash and recycled TCD cycles, wherein the catalyst systems were tested at 600° C. using a methane composition flow rate 120 $cm^3$/min with 100 vol. % $CH_4$.

The 10Ni-1Cu/CNT formulation was used to demonstrate the MWCNT harvesting and catalyst system regeneration cycle as it had the highest carbon deposition rate, carbon yield, and longevity out of all the ST and IW catalyst systems evaluated by this example. The reactivity tests were performed using a larger catalyst bed (800 mg) to generate a sufficient quantity of spent catalyst system (3.5-4.0 g) to permit harvesting and regenerating cycles and product characterization. The reproducibility of the experimental performance is shown in FIG. 2. The initial deactivation observed with the larger reactor is caused by the endothermicity of the reaction and heat transfer as temperature decreased of nearly 30° C. That is, the catalyst bed temperature decreased during reaction, which lowered the catalytic activity and equilibrium conversion. In this example, overcompensating for the temperature loss was not a viable mitigation strategy as this catalyst system composition remains stable for TCD only at temperatures less than 600° C. Increasing the reaction temperature closer to 650° C. causes catalyst system deactivation. FIG. 15 depicts the $CH_4$ conversion and changes in $I_D/I_G$ and $I_{G'}/I_G$ ratios under 100 vol. % $CH_4$ as a function of cycles for three different cycles and shows that the conversions were similar (within reproducibility error) for all the tests. The conversion as a function of TOS can be found in FIG. 2.

The effect of cycling (specially the acid wash step) on carbon quality and presence of metal was evaluated. As shown in FIG. 2, the metallic features (44 and 52°) decrease after reaction and disappear after the acid-wash treatment for all the cycles evaluated. TPO profiles of the samples revealed that the oxidation temperature remained >500° C. regardless of the cycling step, indicating that the MWCNT products were not substantially modified during the recycle. In this example, the concentration of metal was <50 ppm (ICP detection limit) compared to the 11 wt. % and 3.7 wt. % (11,000 and 3,700 ppm), respectively, of metal before and after reaction respectively, suggesting that >99% of the metal was removed from the spent catalyst system. The collected acid wash solution (≈750 mL) was analyzed via ICP which revealed that >95% (240 ppm) of the metal in the spent catalyst system was in the solution. Hence, in this example, these results show that the acid wash is a feasible method to remove metals from the carbon product.

Figure 16A:
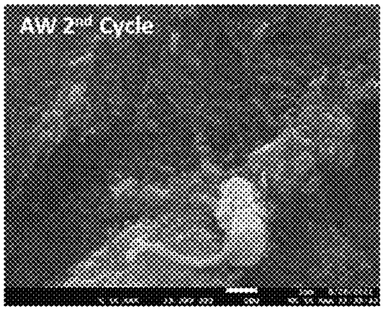
FIGS. 16A-16P show SEM images of a 10Ni-1Cu/CNT catalyst system after the second and fourth AW cycles (FIGS. 16A-16J) and elemental mapping images (FIGS. 16K-16P) of a 10Ni-1Cu/CNT catalyst system after the second and fourth AW cycles, wherein no Ni and Cu were detected.
Figure 16B:
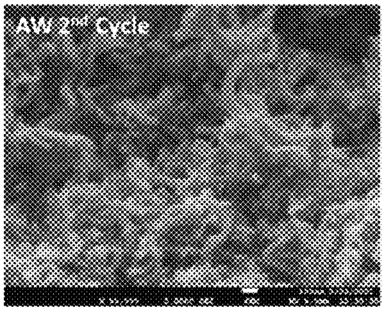
Figure 16C:
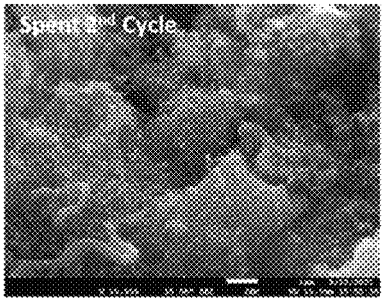
Figure 16D:
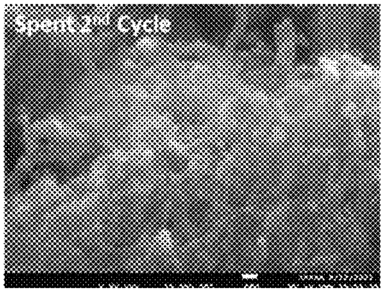
Figure 16E:
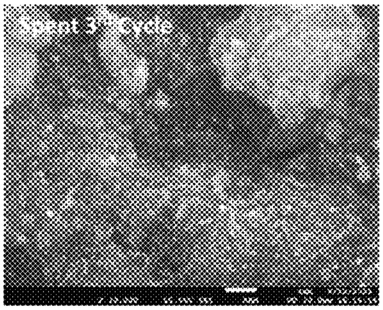
Figure 16F:
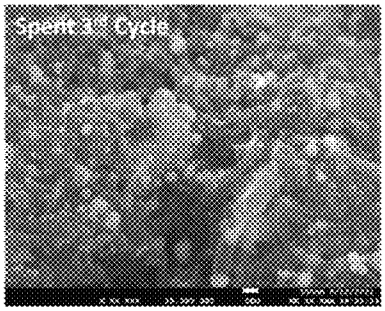
Figure 16G:
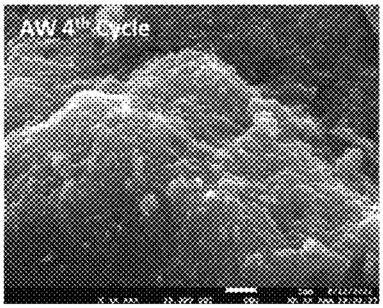
Figure 16H:
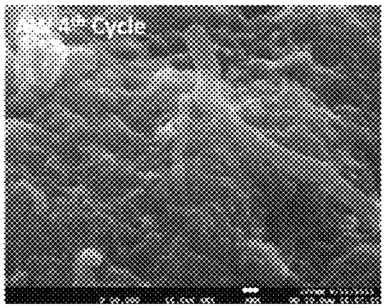
Figure 16I:
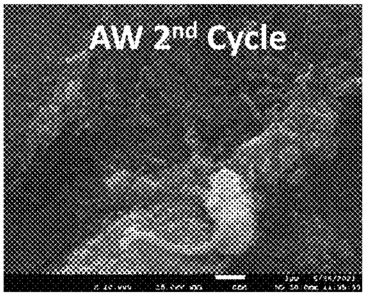
Figure 16J:
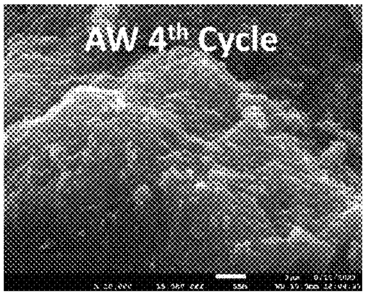
Figure 16K:
Figure 16L:
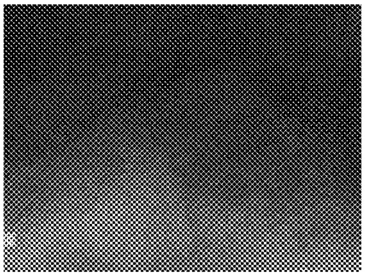
Figure 16M:
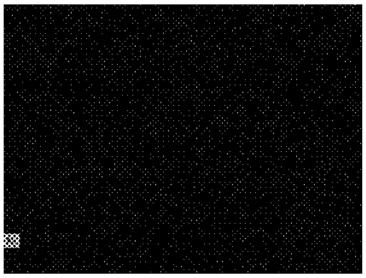
Figure 16N:
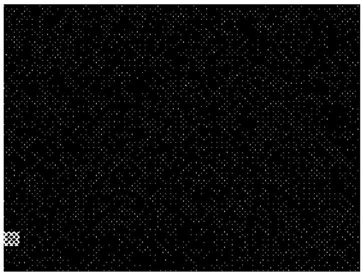
Figure 16O:
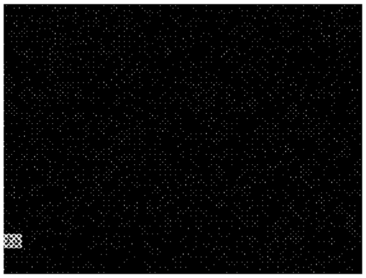
Figure 16P:
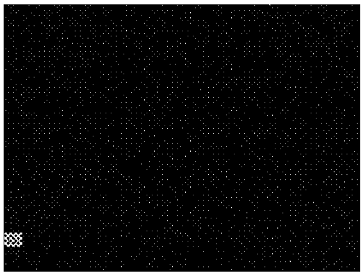
Figure 17A:
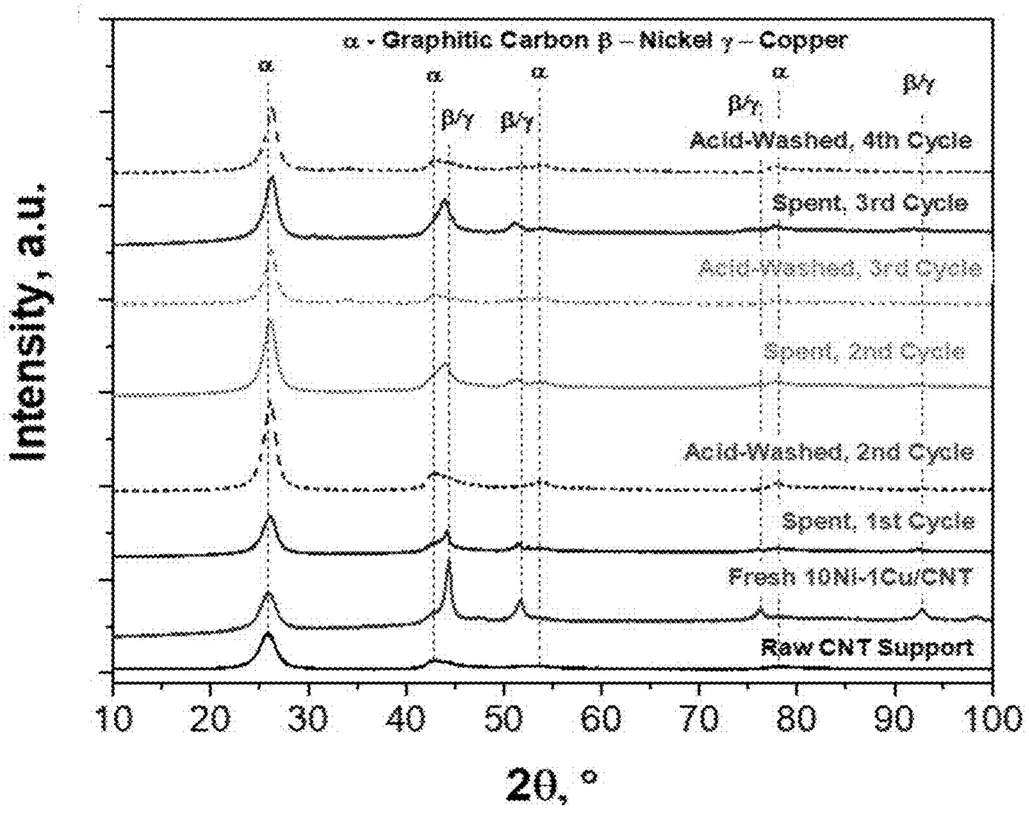
FIGS. 17A-17E show XRD (FIG. 17A), TPO (FIG. 17B), and Fourier transform infrared spectroscopy (FTIR) spectra (FIGS. 17C-17E) of a 10Ni-1Cu/CNT catalyst system synthesized by the ST method at different TCD cycles, wherein the catalyst systems were tested under 100 vol. % $CH_4$ at 600° C. and the spent catalyst systems were washed in acid after reaction to remove metals and a portion of the acid-washed solids (the carbon co-product) was used as the support material so as to resynthesize a new catalyst system batch with the same composition via the ST method.
Figure 17B:
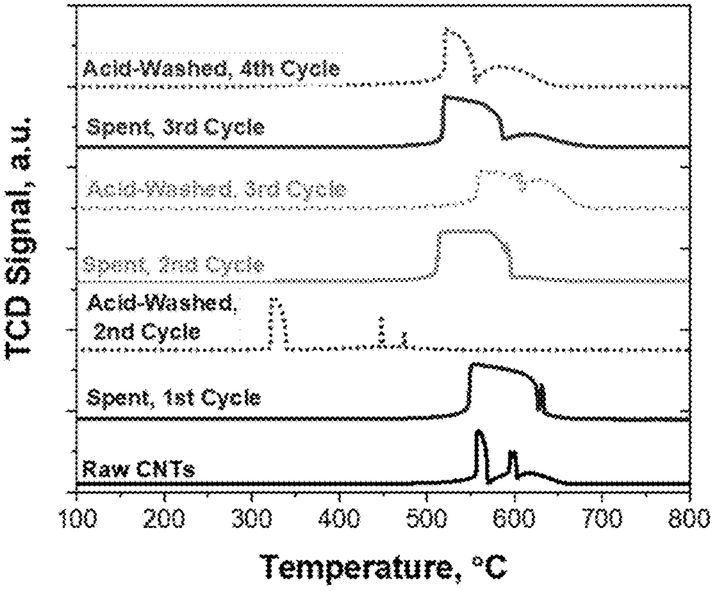
Figure 17C:
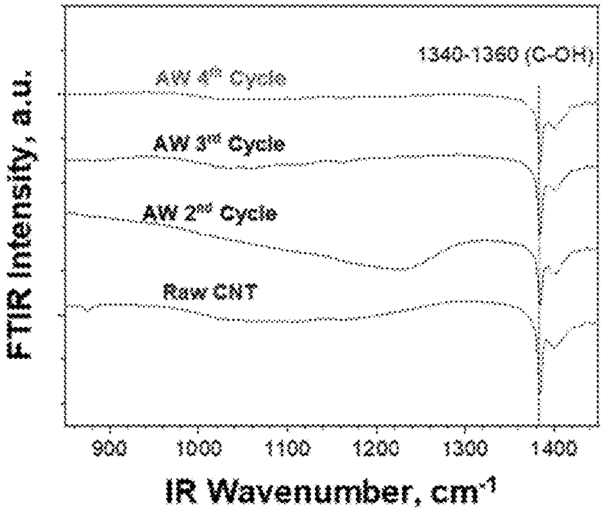
Figure 17D:
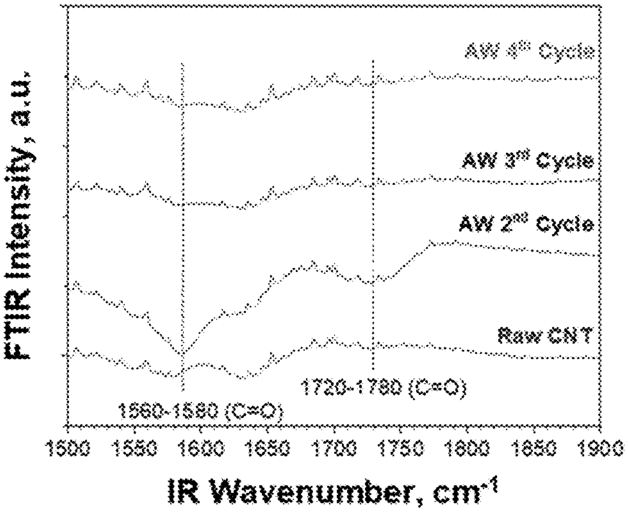
Figure 17E:
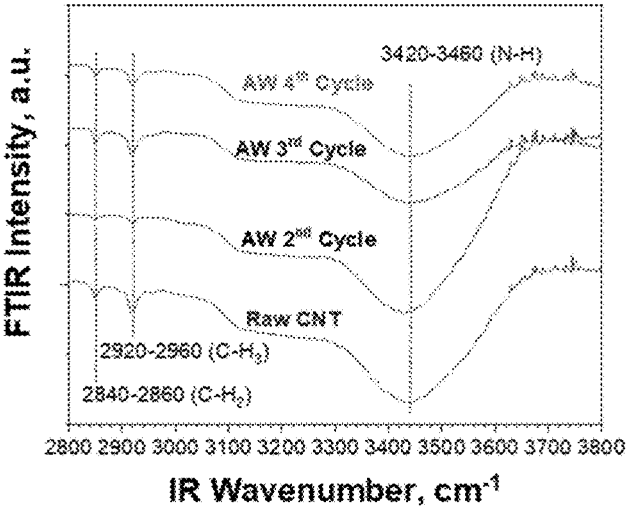

Raman spectroscopy showed small changes in the carbon co-product MWCNT as a function of cycling (see FIGS. 14A-14B). Compared to the $I_D/I_G$ and $I_{G'}/I_G$ ratios of the MWCNT support (1.2 and 1.0, respectively), the carbon co-product had a higher $I_D/I_G$ ratio (>1.41) and smaller $I_{G'}/I_G$ (<0.705), which is consistent with the formation of MWCNT. Small changes in the ratios during the different cycles was observed, which could be attributed to the sample handling. FIG. 3 shows that the $I_D/I_G$ and $I_{G'}/I_G$ ratios were not affected by the acid wash step, suggesting that the MWCNT harvesting and purification method (e.g., acid wash) and the catalyst system regeneration cycle does not affect the quality of the MWCNT generated. SEM analysis of selected samples during the cycling reveal that the all the cycles generated CNTs and they remained intact during the acid-wash step (FIGS. 16A-16P), which is consistent with the Raman spectroscopy results. Elemental mapping show that Ni and Cu were successfully removed from the acid-washed samples as already depicted by ICP (FIGS. 16A-16P). SEM imaging revealed that the carbon co-product is forming large clusters of CNTs, which appear to get more tightly packed with each cycle. In this example, this may be caused by the repeated growth of CNT co-product inside the pore structure of the catalyst support. That is, new metal particles were deposited inside the catalyst system pore structure with each cycle, which caused the continuous growth of CNT inside a constrained space. Additionally, the reaction was done in a packed-bed reactor (with fixed catalyst bed volume), which might force the CNT growth inside the catalyst system void volume (e.g., void sections between the CNT clusters and particles) as opposed to the expansion of the catalyst bed (as it would expect in a fluidized-bed reactor). However, it did not affect the surface area of the product as it kept similar as a function of the cycles suggesting that the microporous structure remained similar (Table 4).

FTIR measurements were performed on the acid-washed MWCNT co-products generated after each cycle and compared it to the commercial (raw) MWCNT material used as a support. As shown in FIGS. 17A-17E, the features of the MWCNT generated in this example are similar to the commercial MWCNT and consistent with previous acid-washed MWCNT. Given the carbon yields obtained in this example of >5 $g_{carbon}/g_{cat}$ (FIGS. 4 and 5), the fraction of carbon co-product in the acid-wash sample was >80% after the first acid-wash step (Table 5). By the end of the cycling experiment (the fourth acid wash), the fraction of carbon co-product in the final sample was >99%, suggesting that the sample from the fourth acid wash was representative of the reaction co-product. Hence, in this example, the results demonstrated that the carbon co-product synthesized by TCD has similar properties to that of commercial MWCNT that has a selling price between $700 and $10,000/kg. The XRD patterns are shown in FIGS. 1A-1D and 2. The Raman patterns are shown in FIG. 3.

TABLE 5

Characterization of spent catalyst systems run under 100 vol. % CH4 at 600° C. via X-Ray diffraction (XRD) and Raman spectroscopy. The XRD patterns are shown in FIGS. 1A-1D and 2. The Raman patterns are shown in FIG. 3.

| Catalyst systems | XRD-derived results: Ni-rich alloy wt. % (%) | Ni:Cu (mol/mol) | Crystallite size (nm) | Cu-rich alloy wt. % (%) | Ni:Cu (mol/mol) | Crystallite size (nm) | Raman-derived results $I_D/I_G$ | $I_G/I_G$ |
|---|---|---|---|---|---|---|---|---|
| 5Ni—0.5Cu/CNT (ST) | 100 | 40.5 | 11.2 | — | — | — | 1.35 | 0.798 |
| 10Ni—1Cu/CNT (ST) | 79 | 10.4 | 10.7 | 21 | 0.299 | 12.2 | 1.54 | 0.705 |
| 20Ni—2Cu/CNT (ST) | 100 | 13.3 | 15.0 | — | — | — | 1.36 | 0.689 |
| 40Ni—4Cu/CNT (ST) | 63 | 6.54 | 18.0 | 37[a] | 0.485[a] | 9.60[a] | 1.56 | 0.544 |

Example 8

To assess the commercial viability of the TCD process, Aspen Plus V10 was used to develop a process model of the process for the production of carbon co-product and $CO_2$-free $H_2$ and then conducted a preliminary techno-economic analysis (TEA).

In the preliminary TEA analysis, In the main reaction system and in the TCD reaction, natural gas (NG) was converted into $H_2$ and carbon co-product on heterogeneous catalyst systems (i.e., 10Ni-1 Pd/CNT and 10Ni-1Cu/CNT) at 600° C., 2.5 bar. The gas-phase product was compressed and subjected to pressure swing absorption (PSA) to separate $H_2$ from unconverted natural gas. Part of the off-gas from PSA, which mainly is unconverted NG, is recycled back to the main reactor, while the remainder is used to supply the heat required in the TCD reactor and other unit operations. The solid-phase product from the main reactor is sent to the acid wash and carbon recovery section where the metal catalyst is dissolved in concentrated $HNO_3$ solution at 120° C. Carbon co-product then was separated from the solution by filtration and dried. The metal nitrate solutions ($Ni(NO_3)_2/Pd(NO_3)_2$ or $Ni(NO_3)_2/Cu(NO_3)_2$) solution along with part of the carbon co-product from the acid wash section were sent to the catalyst system regeneration section to generate fresh catalyst system by impregnation, calcination, and reduction. A small amount of $H_2$ produced in the main reactor was used for catalyst system reduction. Considerable amounts of nitrogen oxides were generated during acid wash and calcination, which was mixed with air, compressed and sent to the $HNO_3$ recovery unit to be converted into $HNO_3$ by water absorption at 11 bar—a technology developed as a part of the Ostwald process.

Figure 18:
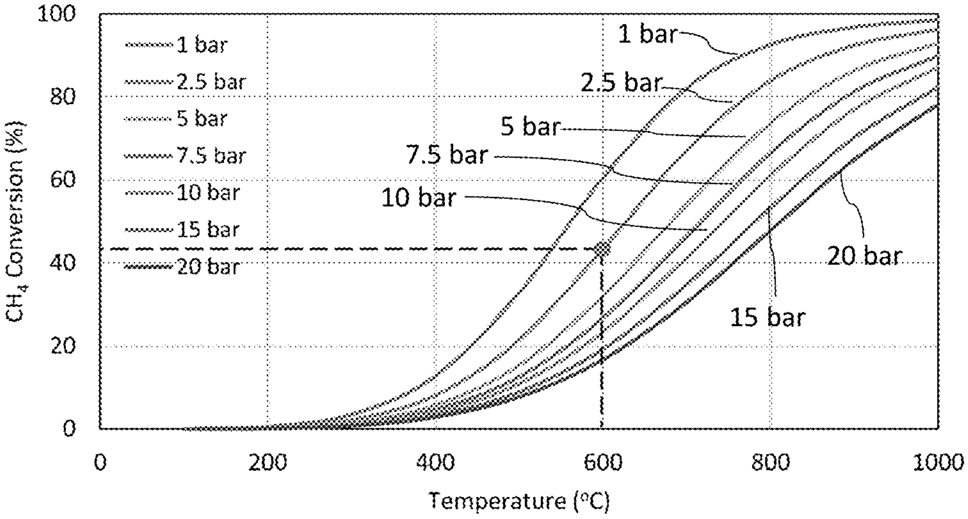
FIG. 18 shows equilibrium $CH_4$ TCD conversion as a function of pressure and temperature.

In this analysis, the single-pass NG conversion in the TCD reactor was assumed to be 43% based on reaction equilibrium calculated by minimizing Gibbs free energy, as shown in FIG. 18. It was assumed that the carbon yield obtained in the fixed-bed reactor of >3.5 $g_C/g_{cat}$ with 10Ni-1Cu/CNT (FIGS. 4 and 5) can be similarly accomplished in a fluidized-bed reactor. Based on the above assumptions, the material and energy balances were computed using Aspen Plus V10. The capital costs of the main TCD reactor, PSA unit, and catalyst system regeneration section were estimated based on the data available in the open literature, while for the remaining standard equipment, it was estimated using the database available in Aspen Process Economic Analyzer V10.

To demonstrate a distributed hydrogen refueling system, a TEA was conducted for large (100,000 $kg_{H_2}$/day for centralized $H_2$ generation) and small (1,500 $kg_{H_2}$/day) scales of operation. The proposed TCD process was compared with conventional SMR, traditional pyrolysis, and electrolysis. Because SMR is a mature technology (e.g., the process design and techno-economic performance are well documented in the open literature) instead of developing a process model, the variable and capital costs of the SMR process reported in the literature were directly used with minor adjustment to match the economic assumptions.

The $CO_2$ emitted from the TCD process are 85% lower than that from the conventional SMR process (1.67 and 9.6-11.5 $kg_{CO_2}/kg_{H_2}$, respectively), 45% lower than that of the SMR+CCS process (2.98 $kg_{CO_2}/kg_{H_2}$), and 61% lower than emissions from the conventional pyrolysis process. Emissions of $CO_2$ were not zero because part of the NG was used to supply the heat required by the endothermic TCD reaction; however, it could be reduced to near zero by using $H_2$ as the heat source but at the expense of higher operating expenses (e.g., higher NG consumption per kilogram $H_2$ produced). Electricity consumption for the TCD process was up to five times higher than for the SMR process even with on-site electricity generation from waste heat. This was primarily due to the large pressure difference required in the $H_2$ purification unit. A relatively large compressor was needed between the reactor and the PSA unit because the reactor must be operated at relatively low pressure due to the equilibrium constraints shown in FIG. 18. However, the electricity consumption of the TCD process was 18 times lower than that of electrolysis (3.13 and 55.5 kWh/kg $H_2$, respectively) and has a 24% higher energy efficiency. These results suggests that TCD is a more energy efficient and less energy demanding process than electrolysis for $H_2$ production.

For the proposed $CH_4$ TCD process, four cases were evaluated for two catalyst system compositions (Ni—Pd and Ni—Cu) and two different metal losses to account for the metal unrecovered for the carbon co-product. Cases NiPd0.1L and NiCu0.1L assumed a metal loss of 0.1% at the acid wash section. Case NiPd5L and NiCu5L assumed a metal loss of 5%. The disclosed method has the potential to produce $H_2$ economically at both small and large scales, provided sufficient value can be obtained from the carbon co-product (e.g., MWCNT). The MCSP and $MH_2SP$ can be significantly reduced when replacing the expensive Ni—Pd catalyst with the cheaper Ni—Cu catalyst. Both MCSP and $MH_2SP$ are sensitive to the metal loss rate if using the expensive Ni—Pd catalyst due to the high cost of Pd.

Compared to SMR and SMR+CCS, the method described herein represents a more environmentally friendly approach for $H_2$ production from NG as it has lower overall $CO_2$ emissions relative to SMR and SMR+CCS, by 85% and 45%, respectively. The proposed technology has the potential to produce $H_2$ economically at both small and large scales, provided sufficient value can be obtained from the carbon co-product.

Examples 1-8 shows that the cyclic $CH_4$ TCD process to produce $H_2$ with low-to-zero $CO_2$ emission and recoverable carbon nanomaterials using CNT-supported Ni—Cu alloy catalysts were explored in this example. In this example, the stability of the Ni—Cu catalyst systems depends on the metal particle size, which can be tuned with metal weight loading and catalyst system synthesis methods. In this example, the catalyst systems with an average metal particle size >45 nm show stable TCD performance regardless of the overall metal loading and synthesis method, either ST or IW. In this example, process performance (e.g., carbon deposition rate and $H_2$ production rate) was improved by nearly on order of magnitude by optimizing reaction conditions and catalyst system composition. In this example, characterization of the carbon co-product via SEM, Raman, and FTIR analyses revealed that the properties of the generated carbon co-product is representative of MWCNTs. In this example, the properties of the MWCNTs did not change substantially with catalyst system composition or catalyst system synthesis method. In this example, the catalyst system cycling process was demonstrated by harvesting the carbon co-product and resynthesizing the catalyst systems for four different cycles and the resynthesized catalyst system performance remained similar as well as the properties of the MWCNT generated after each cycle. In this example, characterization of the carbon co-product at spent catalyst systems and after acid washing for four different cycles showed that the properties of the produced MWCNTs do not change as a function of cycle and is similar to that of commercially available MWCNTs.

Example 9

Materials and Catalyst System Synthesis

Nickel nitrate hexahydrate ($Ni(NO_3)_2 \cdot 6H_2O$), copper nitrate hemi-pentahydrate ($Cu(NO_3)_2 \cdot 2.5H_2O$), acetone and concentrated nitric acid ($HNO_3$) were purchased from Sigma Aldrich. Multiwalled CNTs with outer diameter 20-30 nm were provided by Cheap Tubes (www.cheaptubes.com, catalog number 030104).

Preparation of NiCux/CNT Catalyst Systems Via the Solvothermal (ST) Method

A series of NiCux/CNT catalyst systems were prepared, where x represents the targeted weight loading of Cu, following the solvothermal (ST) method. The Ni loading was kept constant at approximately 10 wt % and the Cu wt % loading was varied to target a loading of 0 to 15 wt %. In the typical ST synthesis of a 10 wt % Ni-1 wt % Cu on CNT (NiCu1/CNT (ST)), 0.347 g of $Ni(NO_3)_2 \cdot 6H_2O$ and 0.0154 g of $Cu(NO_3)_2 \cdot 2.5H_2O$ were first dissolved in 60 mL acetone and sonicated for 30 min. As-received CNT (0.626 g) was added to the acetone solution and sonicated for additional 30 min. The mixture was then transferred into a 100 mL Teflon-lined Parr reactor, sealed, and stirred for 30 min. The Parr reactor was heated to 120° C. and maintained at this temperature for 12 hours under static condition. After cooling to room temperature, the solution was retrieved from the Parr reactor, placed in a glass container, and allowed to evaporate overnight at room temperature and atmospheric pressure in a hood. The dry solids were placed in a furnace with stagnant air at 80° C. overnight. The dry solids were then crushed and sieved (100 mesh) and stored in a glass vial.

Preparation of Acid-Treated CNT (HCNT) as Support Material

The CNT was acid treated to functionalize its surface and allow for a better distribution of the metal during impregnation. In a typical acid treatment, 3 g of as-received CNT was suspended in 150 mL 10 M $HNO_3$ solution and sonicated for 30 min. The solution was then placed in a reflux apparatus heated with an oil bath set at 100° C. for 14 hours. Once the system cooled to room temperature, the solution was filtered to recover the solid, which was washed with copious distilled water until the pH of the filtrate was around 7. The acid-washed products were dried at 60° C. in a furnace with stagnant air for 12 hours. The dried, acid-washed CNT (HCNT) were cooled and stored in a glass vial.

Preparation of Catalyst System Via Co-Impregnation (CI) and Sequential Impregnation (SI)

The catalyst system synthesized by co-impregnation were prepared by mixing a 46 mL aqueous solution containing Ni(NO3)2·6H2O (0.7331 g) and Cu(NO3)2·2.5H2O (0.0570 g) with 1.3 g HCNT. The mixture was sonicated for 30 min and stirred for 2 hours at room temperature. Then, the solvent was allowed to evaporate at ambient conditions in a ventilated hood. Once dry, the solids were heat treated: first dried in air at 140° C. for 8 hours and then 1.72 g were heated to 350° C. at a ramp rate of 5° C./min in a N2 and held at 350° C. for 3 hours. Once cooled to room temperature, the treated solids were stored in a capped glass vial. The catalyst system synthesized by this method are denoted as NiCu1/HCNT (CI).

The sequential-impregnated catalyst systems followed the same protocol as the co-impregnated catalyst systems (0.771 g $Ni(NO_3)_2 \cdot 6H_2O$, 0.0570 g $Cu(NO_3)_2 \cdot 2.5H_2O$), but only impregnating one metal at the time and heat treating after each impregnation. The catalyst system was first impregnated with Ni followed by Cu impregnation and is denoted as $Cu_1Ni$/HCNT (SI).

Preparation of Incipient Wetness Catalyst Systems NiCu1/HCNT(IW)

The catalyst system synthesized by incipient wetness impregnation (IW) were prepared by slowly adding a concentrated aqueous solution of $Ni(NO_3)_2 \cdot 6H_2O$ (0.595 g) and $Cu(NO_3)_2 \cdot 2.5H_2O$ (0.0439 g) to HCNT (1.068 g) using the amount of liquid that was previously determined to just wet the support (0.595 mL/g). Then, the slurry was dried in a furnace under stagnant air at 80° C. overnight. Once dry, the solids were then heated in air at 140° C. for 8 hours followed by heating 500 mg in flowing $N_2$ (30 $cm^3$/min) of at 350° C. for 3 hours. The temperature ramp rate was 5° C./min. Once cooled to room temperature, the solids were stored in a capped glass vial. The nominally 10 wt % Ni and 1 wt % Cu catalyst system prepared by IW is denoted as NiCu1/HCNT (IW).

Example 10

The catalyst systems were characterized before (fresh) and after reaction (spent) to determine their stability and to devise relationships between activity, stability, and surface properties. The 500 mg of fresh catalyst systems were reduced at 400° C. for 4 hours under 30 $cm^3$/min of 5 vol % $H_2$ in $N_2$ followed by heating to reaction temperature (typically 600° C.) in 30 $cm^3$/min $N_2$. After cooling to room temperature, the samples were passivated by flowing (30 $cm^3$/min) 1 vol % $O_2$ in $N_2$ overnight. The spent catalyst systems were characterized as retrieved from the TCD reactor.

Nitrogen (N2) physisorption of the fresh and spent catalyst systems was conducted on a Quadrasorb EVO/SI Gas Sorption System from Quantachrome Instruments at 77 K. Samples were degassed at 150° C. under vacuum for 12 hours. Surface areas were determined using the 5-point Brunauer-Emmett-Teller (BET) method from the adsorption data in the relative pressure range of 0.05-0.3. Metal loadings were determined by inductively coupled plasma optical emission spectrometry (ICP-OES).

XRD patterns were collected using a Rigaku SmartLab SE Bragg-Brentano diffractometer, equipped with a fixed Cu anode operated at 40 kV and 44 mA and a D/Tex Ultra 250 1-dimensional detector. Patterns were collected with a variable divergence slit between 2 and 1000 (20) at intervals of 0.01°. The composition present, lattice parameters, and crystallite sizes of the crystalline components were determined by Rietveld fitting between 30 and 1000 (20) using Topas v6 (Bruker AXS) as discussed elsewhere. Because of the presence of NiCu alloys containing a range of compositions, it is possible that this method could underestimate the crystallite size. The compositions of the metallic phases were estimated from their refined cubic lattice parameters by linear interpolation between Ni (a=3.5238 Å) and Cu (a=3.615 Å).

A Micromeritics AutoChem 2920 instrument was used to conduct temperature programmed oxidation (TPO). The samples were first loaded and pretreated at 120° C. for 120 min under He, and then heated to 800° C. at a ramp rate of 5° C./min under 5 vol % $O_2$ in He.

Raman spectra were recorded on a Renishaw InVia Raman microscope with a 532 nm excitation wavelength at 10 mW laser power. Each spectrum was averaged over three scans to characterize the solid carbon co-produced by $CH_4$ TCD.

A FEI Titan 80-300 High-resolution transmission electron microscope (HRTEM) microscope operated at 300 kV and equipped with a CEOS GmbH double-hexapole aberration corrector for the probe-forming lens, energy-dispersive X-ray (EDX) spectroscopy detector was used to determine the morphology of solid carbon co-products, metal particle size, and element distribution before and after reaction. Metal particle size and composition distributions were calculated from HRTEM images by sampling an average of 100 particles.

Figure 19A:
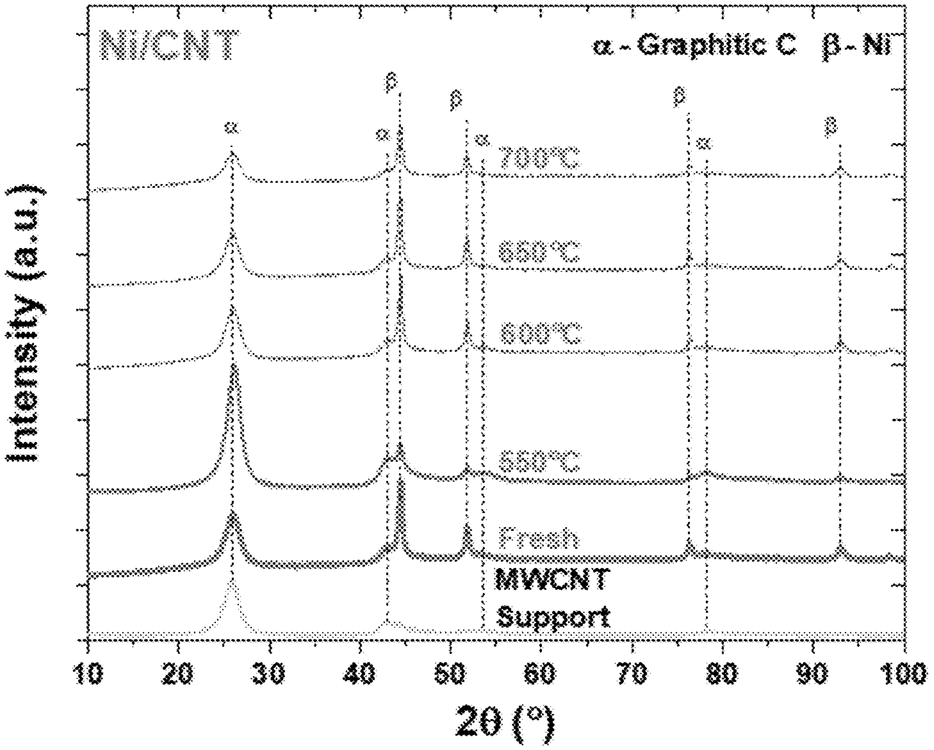
FIGS. 19A-19C show XRD patterns of a Ni/CNT system (FIG. 19A), a NiCu1/CNT catalyst system (FIG. 19B), and a NiCu15/CNT catalyst system (FIG. 19C) prepared by ST synthesis, wherein the catalyst systems were evaluated using different reaction temperatures for TCD using a methane composition flow rate of 30 $cm^3$/min with 30 vol % $CH_4$ in $N_2$.
Figure 19B:
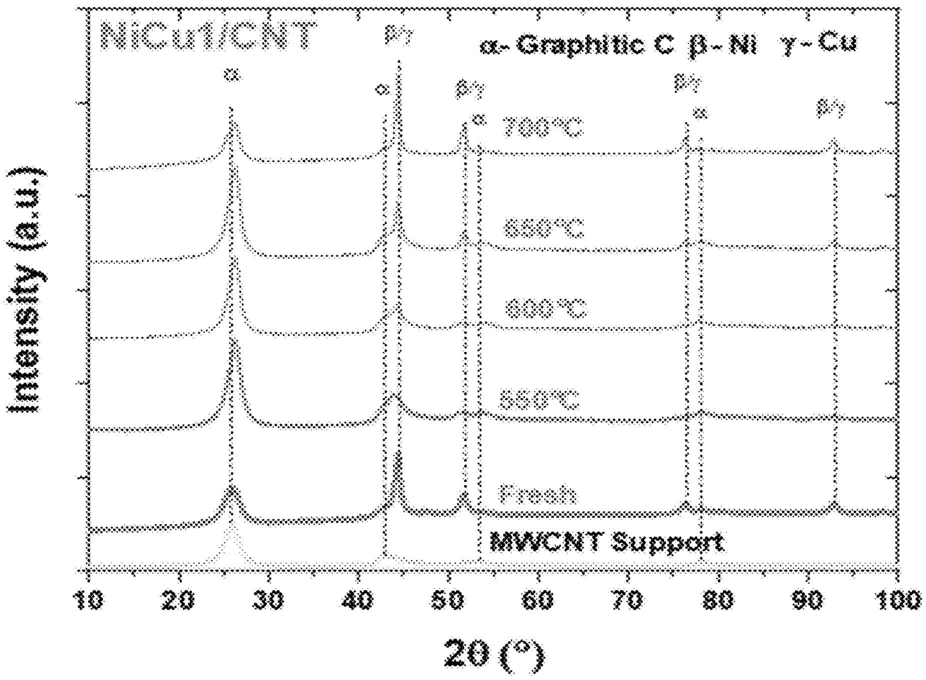
Figure 19C:
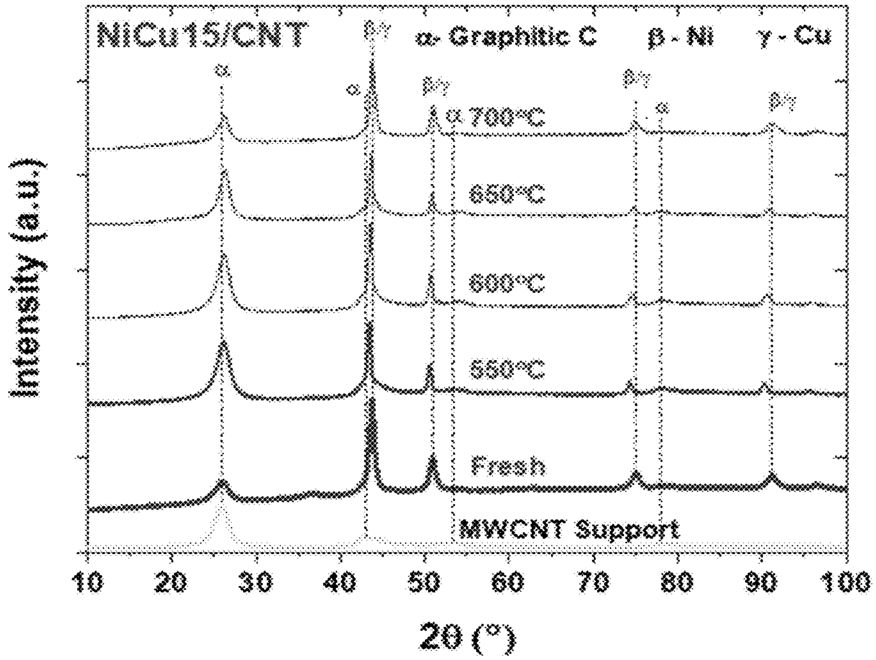

FIGS. 19A-19C show XRD patterns of a) Ni/CNT, b) NiCu1/CNT, and c) NiCu15 prepared by solvothermal synthesis at different reaction temperature under 30 $cm^3$/min 30 vol. % $CH_4$ in $N_2$.

Example 11

A fixed-bed, continuous-flow, vertical stainless-steel reactor was used for $CH_4$ TCD reaction at ambient pressure. As-synthesized catalyst systems (0.2 g, assumed density=0.33 g/$cm^3$) were loaded between two plugs of quartz wool. $N_2$ gas was used as a carrier gas and an internal standard for product analysis using on-line gas chromatography (GC). Prior to each test, the 0.2 g catalyst system samples were reduced in situ at 400° C. for 4 hours under 70 $cm^3$/min 10 vol % $H_2$ in $N_2$ at a ramp rate of 3° C./min. Subsequently, the reactor was heated to the reaction temperature (e.g., 550 to 700° C.) under 70 $cm^3$/min of $N_2$. Before reaction, the $H_2$ had been completely purged from the system (monitored by on-line GC). Then, the feed was switched to 30 $cm^3$/min of 30 vol % $CH_4$ in $N_2$ to maintain a constant space velocity of 9,000 $cm^3$/g/h (≈3000 $h^{-1}$ at the assumed density of the bed). The outlet gas flow rate was measured by a digital flow meter (DryCal). Composition of the outlet gas was analyzed by a four-channel Agilent Micro GC equipped with Molecular Sieve 5A, PLOT U, alumina, and OV-1 columns and a TCD detector for each column. When the test concluded, the reactor system was cooled to room temperature under 30 $cm^3$/min of $N_2$, and the spent catalyst systems (containing solid carbon co-product) were retrieved from the reactor for analysis. $H_2$ was the only gaseous reaction product, $CO_2$ and CO were not detected.

$CH_4$ conversion, $X_{CH_4}$, Carbon yield $Y_C$(t), and the rate of deposition of carbon were calculated as described herein.

Example 12

TABLE 6

Physiochemical properties of different support CNTs and solvothermal catalyst systems (which used raw CNTs as support). Fresh catalyst systems were reduced at 400° C. for 4 hours.

| Catalyst systems Fresh reduced (Solvothermal) | Metal loading (wt %) [a] Ni | Metal loading (wt %) [a] Cu | BET surface area ($m^2 \cdot g^{-1}$) |
|---|---|---|---|
| Raw CNT | — | — | 161 |
| HCNT | — | — | 187 |
| Ni/CNT | 8.80 | — | 133 |
| NiCu0.6/CNT | 8.91 | 0.45 | 140 |
| NiCu1/CNT | 8.96 | 0.86 | 147 |
| NiCu2/CNT | 10.42 | 1.87 | 142 |
| NiCu5/CNT | 8.99 | 5.25 | 137 |
| NiCu10/CNT | 9.66 | 8.74 | 128 |
| NiCu15/CNT | 10.38 | 13.89 | 154 |

[a] Results derived from ICP

Figure 20:
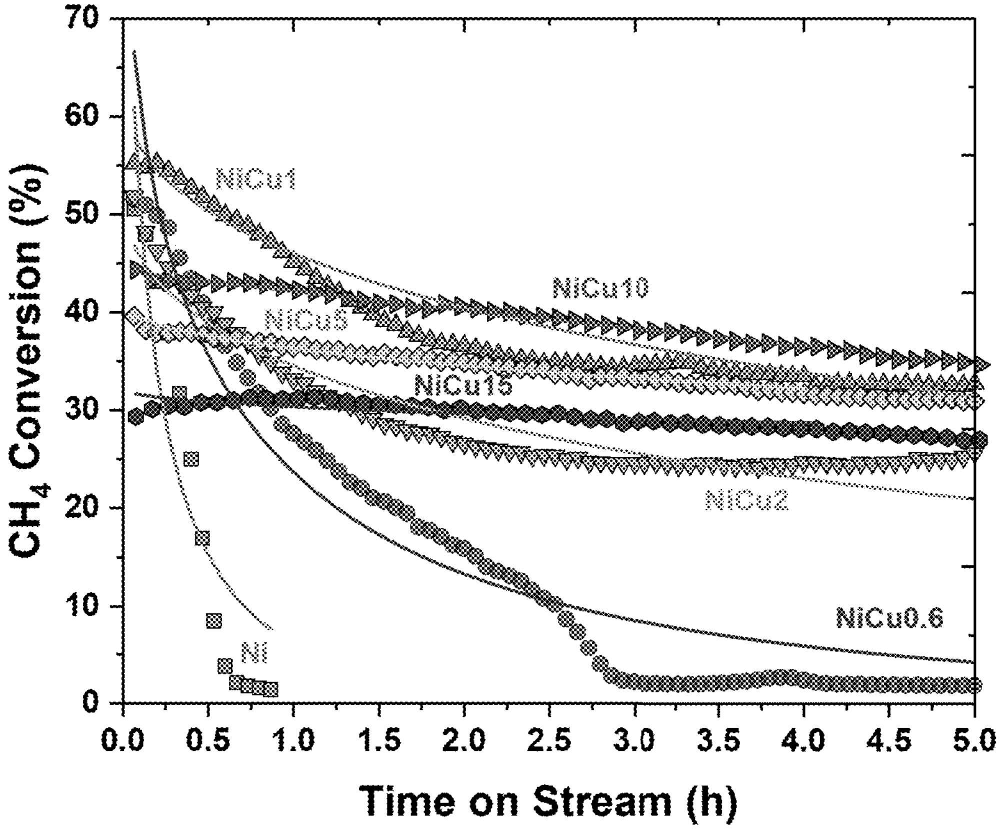
FIG. 20 is a graph showing $CH_4$ conversion yields at different TOS values using catalyst systems of a NiCux/CNT catalyst system (wherein x=0, 0.6, 1, 2, 5, 10, 15) prepared using an ST method and used in TCD at a reaction temperature of 600° C. using a methane composition flow rate of 30 $cm^3$/min with 30 vol % $CH_4$ in $N_2$ (the background activity of the CNT support was <0.2% $CH_4$ conversion).
Figure 21A:
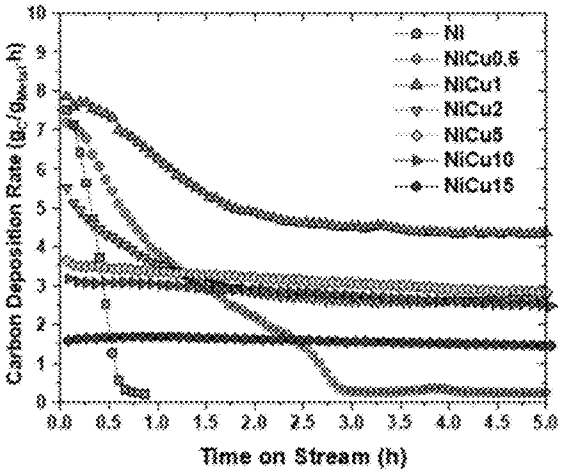
FIGS. 21A-21D show activity of a NiCux/CNT catalyst system (wherein x=0, 0.6, 1, 2, 5, 10, 15) synthesized by an ST method (FIGS. 21A and 21B) and a NiCu1/CNT catalyst system prepared by different synthesis methods (IW, co-impregnation (CI), sequential-impregnation (SI)) (FIGS. 21C and 21D) as a function of TOS using TCD at a reaction temperature of 600° C. using a methane composition flow rate of 30 $cm^3$/min with 30 vol % $CH_4$ in $N_2$ (GHSV≈3000 $h^{-1}$ and wherein the background activity of the raw CNT was <0.2% $CH_4$ conversion).
Figure 21B:
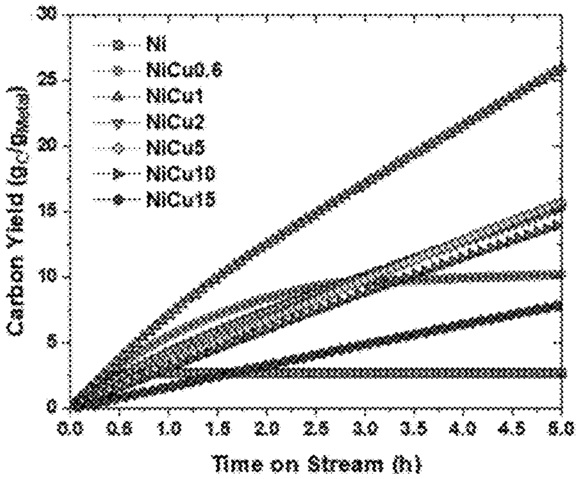
Figure 21C:
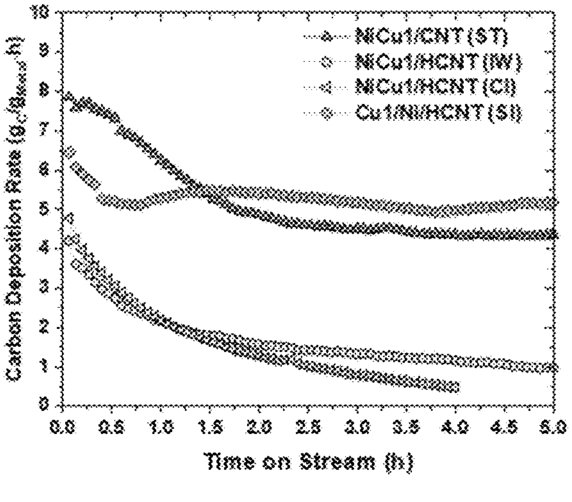
Figure 21D:
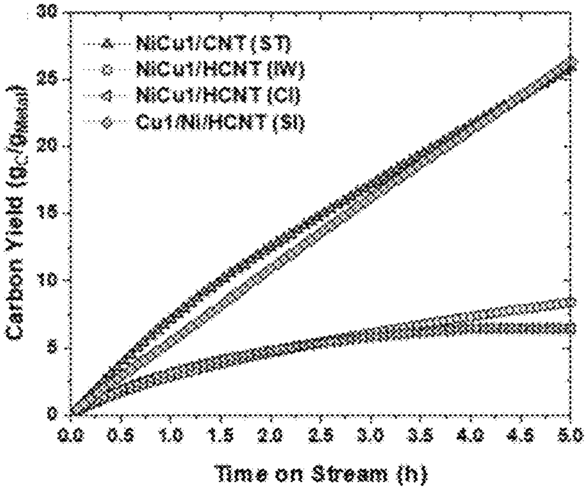

In this example, series of NiCu catalyst systems synthesized by the solvothermal method (ST) with a constant 10 wt % Ni loading were tested at 600° C. under 30 $cm^3$/min of 30 vol % $CH_4$ in $N_2$. Cu loading was changed 0 wt % to 15 wt % to probe the effect of Cu on the TCD activity and morphology of carbon co-product. The catalyst systems properties such as BET and ICP-derived metal content are summarized in Table 6. The addition of Cu to Ni affects the initial TCD activity and stability (FIG. 20). For high loadings of (e.g., nominal Cu loadings of 0 wt %, 0.6 wt %, 1.0 wt %), the earliest measurements of $CH_4$ conversions remain similar to that of pure Ni (e.g., 60%) but the catalyst system stability is enhanced with increasing Cu. Catalyst systems with higher mole fractions of Cu (e.g., nominal Cu weight loadings of 2 wt %, 5 wt %, 10 wt %, and 15 wt %) have lower initial TCD activity but deactivate much more slowly.

FIG. 20 shows $CH_4$ conversions at time on stream for NiCux/CNT (x=0, 0.6, 1, 2, 5, 10, 15) catalyst systems prepared by solvothermal method at reaction temperature of 600° C. under 30 $cm^3$/min 30 vol % $CH_4$ in $N_2$. The background activity of the CNT support was <0.2% $CH_4$ conversion. The carbon yield and carbon deposition rate as a function of time on stream can be found in FIGS. 21A-21D. The lines represent a decaying exponential fit and the fitting parameters are shown in Table 7.

The approximate quantifications can be performed using equations (3) to (5) as described herein.

Figure 22:
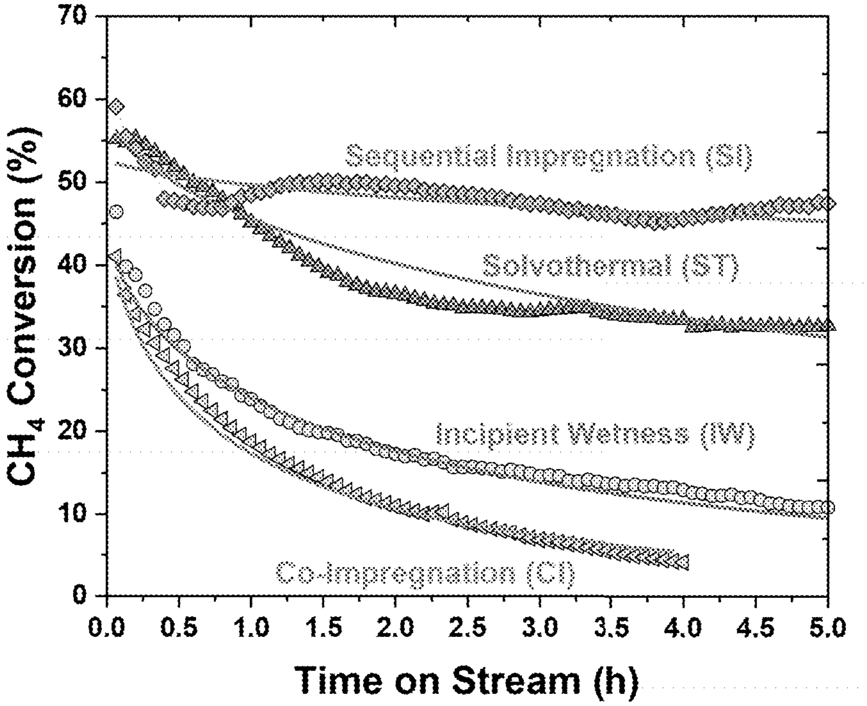
FIG. 22 shows activity of a NiCu1/CNT catalyst system prepared by different synthesis methods (SI, ST, IW, and CI) as a function of TOS using TCD at reaction temperature of 600° C. using a methane composition flow rate of 30 $cm^3$/min with 30 vol % $CH_4$ in $N_2$ (GHSV≈3000 $h^{-1}$ and wherein the background activity of the raw CNT was <0.2% $CH_4$ conversion).

Curves corresponding to the fitting parameters presented in Table 7 were superposed on the data shown in FIGS. 20 and 22.

TABLE 7

Fitting parameters for deactivation at 600° C. and the actual (e.g., experimental) and predicted carbon yield at the indicated time on stream, θ. The catalyst system sample weighed 0.2 g so all but three samples (Ni/CNT (ST), NiCu0.6/CNT (ST), and NiCu1/HCNT (CI)) accumulated an amount of carbon that exceeded the mass of the MWCNT support (e.g., <0.18 g) at the indicated, final time on stream.

| Catalyst system | Cu mol fraction | $X_0$ (%) | k ($h^{-0.5}$) | θ (h) | Actual Carbon Yield ($g_C/g_{cat}$) | Predicted Carbon Yield ($g_C/g_{cat}$) |
|---|---|---|---|---|---|---|
| Ni/CNT (ST) | 0 | 135 | 3.09 | 0.87 | 0.282 | 0.251 |
| NiCu0.6/CNT (ST) | 0.045 | 97 | 1.17 | 5.00 | 0.957 | 1.02 |
| NiCu1/CNT (ST) | 0.081 | 63 | 0.309 | 5.00 | 2.52 | 2.61 |
| NiCu2/CNT (ST) | 0.142 | 48 | 0.333 | 5.00 | 1.89 | 1.88 |
| NiCu5/CNT (ST) | 0.35 | 41 | 0.120 | 5.00 | 2.23 | 2.24 |
| NiCu10/CNT(ST) | 0.455 | 47 | 0.110 | 5.00 | 2.59 | 2.63 |
| NiCu15/CNT (ST) | 0.553 | 32 | 0.0561 | 5.00 | 1.93 | 1.94 |
| NiCu1/HCNT (IW) | 0.086 | 53 | 0.760 | 5.00 | 1.21 | 1.19 |
| NiCu1/HCNT (CI) | 0.079 | 60 | 1.20 | 4.00 | 0.725 | 0.731 |
| Cu1Ni/CNT (SI) | 0.083 | 54 | 0.0800 | 5.00 | 3.15 | 3.13 |

The properties of the Ni and Cu metal in freshly reduced catalyst systems were investigated with XRD (FIGS. 23A-23B) to understand the roles that Cu played in the TCD performance and results are summarized in Table 8. The freshly reduced NiCu catalyst systems are mainly composed of reduced NiCu alloy nanoparticles. The catalyst systems with Ni:Cu mass ratios >5 had larger nanoparticles (e.g., 11-14 nm) compared to the catalyst system with Ni:Cu mass ratio <2 (e.g., 7.3 to 8.6 nm). Other examples showed the crystallite size of monometallic Ni nanoparticle is the dominant factor for TCD activity, which also coincides with the activity trends discussed in this example. That is, catalyst systems with high Ni:Cu mass ratios (e.g., >5) yield metal nanoparticles with larger particle size and higher TCD activity. On the other hand, catalyst systems with low Ni:Cu mass ratios (e.g., <2) yield smaller metal nanoparticles with lower TCD activity. This relationship between TCD activity and NiCu crystallite size is also consistent with previous reports by Pinilla et al. The Ni:Cu ratios derived from XRD are different from the ones obtained via ICP specially at high Ni:Cu ratios (e.g., >5); it was inferred that the XRD analysis might be excluding some particles from the analysis or underestimating the metal compositions. However, it was speculated that the enhanced TCD stability of the catalyst systems with <2 Ni:Cu ratio might be a direct result of the higher Cu loadings used in the catalyst systems.

The spent catalyst systems were also analyzed via XRD to elucidate the role of Cu on catalyst system stability and the results are sown in Table 8. Overall, there were changes in both crystallite size and re-distribution of metal compositions. All but one of the catalyst systems showed a loss of Ni on the alloy (e.g., Ni:Cu ratio decreased), most likely resulting from the selective Ni migration from the metal particles to the carbon co-product. The segregation of Cu and Ni from the different Ni:Cu alloy nanoparticles at the reaction temperatures is consistent with the solubility gap regions of the NiCu phase diagram. Out of the 7 different Ni:Cu catalyst systems evaluated, only NiCu1 underwent particle fragmentation as evidenced by the 15% decrease in average crystallite size. The other six catalyst systems underwent metal sintering as evidence by the average crystallite size increase between 7% and 100%, Table 8. Hence, it was speculated that the changes in TCD catalytic performance depicted in FIG. 20 are a result of both the changes in Ni:Cu ratio and average crystallite size of the active site.

FIG. 22 shows activity of NiCu1/CNT prepared by different synthesis methods as a function of time on stream at reaction temperature of 600° C. under 30 $cm^3$/min 30 vol % $CH_4$ in $N_2$. GHSV≈3000 $h^{-1}$. The background activity of the raw CNT was <0.2% $CH_4$ conversion. The carbon yield and carbon deposition rate as a function of time on stream can be found in FIGS. 21A-21D. The lines represent a decaying exponential fit and the fitting parameters are shown in Table 7.

FIGS. 24A-24F show carbon deposition rate and carbon yield for Ni/CNT, NiCu1/CNT, and NiCu15/CNT at different reaction temperature (550° C. to 700° C.) as a function of time on stream (SOT) under 30 $cm^3$/min 30 vol. % $CH_4$ in $N_2$.

Example 13

In this example, catalysts with the same nominal weight loadings of 10 wt % Ni and 1 wt % Cu were prepared using different synthesis methods to investigate the effect on metal particle size, Ni:Cu composition, and catalytic performance; solvothermal deposition (ST), incipient wetness impregnation (IW), wet co-impregnation (CI), and wet sequential impregnation (SI). The synthesis method affected the $CH_4$ conversion and catalyst system stability (FIG. 22). The catalyst system synthesized by both the ST and SI methods had the highest activity and stability compared to the catalyst system synthesized at by IW and CI. Table 9 summarizes the characterization of the fresh catalyst systems and shows that while all the catalyst systems had similar Ni:Cu ratios, the weight loadings varied up to 47% with respect to the ST catalyst system. FIGS. 21A-21D show that when accounting for the differences in metal content, the catalyst systems synthesized by the ST method had the highest TCD activity (e.g., carbon deposition rate and carbon yield). ICP revealed that all the catalyst systems had similar Ni:Cu ratios (10.7 to 11.8); however, XRD analysis showed that the Ni:Cu ratio on the metal particles ranged from 13.0 to 24.3 while the metal particle size remained similar between 8.0 nm and 11 nm. These results suggested that the synthesis method of the freshly reduced samples affected primarily the distribution of Ni and Cu on the metal nanoparticles and not the metal particle.

XRD analysis of the spent catalyst systems revealed an even larger variation in Ni:Cu ratios (19 to 49). The catalyst systems synthesized by ST and SI methods had the lowest Ni:Cu ratios of 19 (each), while the catalyst systems prepared by IW and CI had significantly higher Ni:Cu ratios of 32 and 49 (Table 9). The ST and SI catalyst systems also had the lowest deactivation rate constants of 0.42 and 0.08. In contrast, the catalyst systems prepared by IW and CI had higher deactivation rate constants of 0.76 and 1.2 (Table 7). Thus, catalyst systems composed of bimetallic NiCu metal nanoparticles with significantly higher Cu contents (smaller Ni:Cu ratios) were more stable. Further, while XRD analysis showed that metal particle size increased after reaction for three of the four catalyst systems, the catalyst system prepared by SI had the largest particle size (15.1 nm) and also exhibited the largest increase in growth (from 8.4 nm). This combination of large particle size and low Ni:Cu ratio, compared to the other catalyst systems, could explain its superior stability. Taken together, the XRD analysis of the spent catalyst systems reveals that the particle size and Ni:Cu ratio changed with the synthesis method, and this can directly explain differences in catalytic stability.

TABLE 9

Crystallite sizes and metal phases of NiCu1 catalyst systems prepared by different synthesis methods based on XRD analysis. Fresh catalyst systems were reduced at 400° C. for 4 hours. Spent catalyst systems were retrieved after reaction at 600° C. under 30 $cm^3$/min 30 vol % $CH_4$ in $N_2$.

| | Fresh | | | | | | | | | Spent | | |
|---|---|---|---|---|---|---|---|---|---|---|---|---|
| | Metal loading[a] (%) | | | | Metal oxide[b] | | Ni-rich alloy[b] | | | Ni-rich alloy[b] | | |
| Catalyst systems | Ni | Cu | Ni:Cu[a] (mol/mol) | BET ($m^2$/g) | wt. % | Particle size/nm | wt. % | Ni:Cu (mol/mol) | Particle size/nm | wt. % | Ni:Cu (mol/mol) | Particle size/nm |
| NiCu1/CNT (ST) | 8.96 | 0.86 | 11.3 | 147 | 0 | — | 100 | 24.3 | 11.0 | 100 | 19 | 9.4 |
| NiCu1/HCNT (IW) | 13.1 | 1.33 | 10.7 | 214 | 24 | 4.3 | 76 | 13.0 | 8.0 | 100 | 32 | 10.6 |
| NiCu1/HCNT (CI) | 10.3 | 0.95 | 11.8 | 217 | 0 | — | 100 | 19.3 | 7.4 | 100 | 49 | 9.3 |
| Cu1Ni/HCNT (SI) | 10.9 | 1.07 | 11.1 | 226 | 0 | — | 100 | 20.2 | 8.4 | 100 | 19 | 15.1 |

[a]Results derived from ICP
[b]Results derived from XRD analysis

Example 14

Figure 25A:
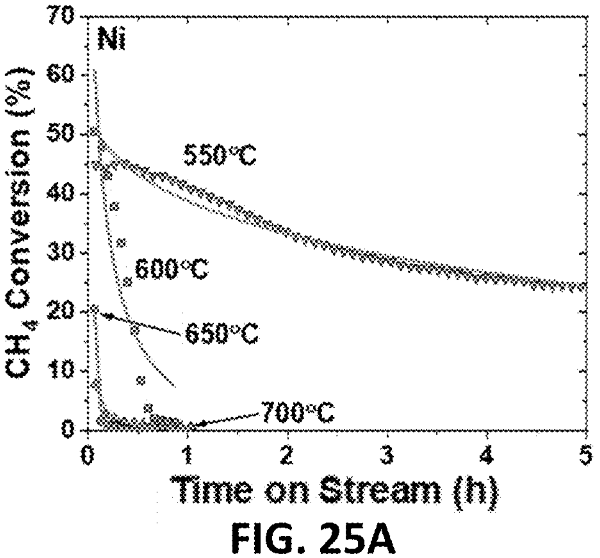
FIGS. 25A-25C are graphs showing activity (measured as $CH_4$ conversion) of Ni/CNT (ST) (FIG. 25A), NiCu1/CNT (ST) (FIG. 25B), and NiCu15/CNT (ST) (FIG. 25C) as a function of TOS at reaction temperatures of 550° C. to 700° C. using a methane composition flow rate of 30 $cm^3$/min with 30 vol % $CH_4$ in $N_2$
Figure 25B:
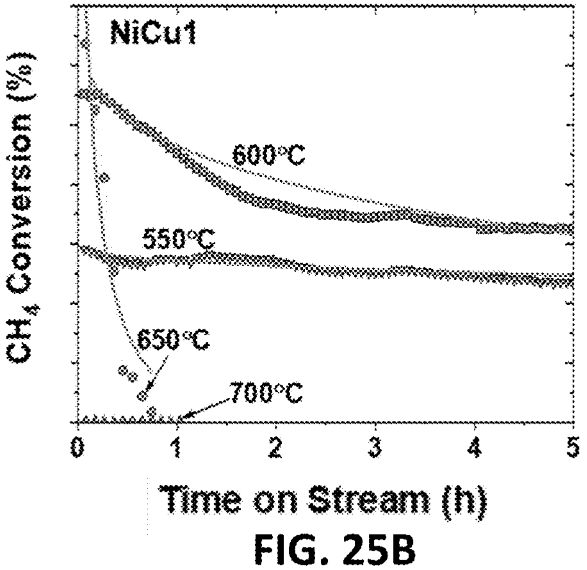
Figure 25C:
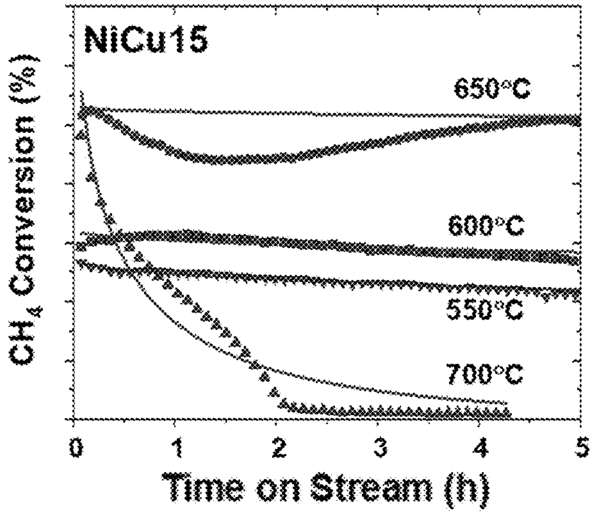

In this example, the performance of three catalyst systems were evaluated [Ni/CNT (ST), NiCu1/CNT (ST), and NiCu15/CNT (ST)] as a function of reaction temperature (550° C.-700° C.). FIGS. 25A-25C show how the Ni:Cu composition affects the TCD activity and stability at different reactions temperatures. For example, at 550° C., pure Ni catalyst systems showed the highest $CH_4$ conversion compared to NiCu1 and NiCu15 and slow deactivation during 4 hours. Increasing the reaction temperature for the pure Ni system to 600° C. caused nearly complete catalyst system deactivation within 1 hour. However, the catalyst system containing 1 wt % and 15 wt % Cu remained stable at 600° C. even though the $CH_4$ conversion was inversely proportional to the Cu content. At 650° C. both pure Ni/CNT and NiCu1/CNT catalyst systems deactivated within 1 hour while NiCu15 remained stable for >4 hours. At 700° C. both Ni and NiCu1 deactivated within 15 min of reaction while NiCu15 exhibits a slower deactivation and lasted for nearly 2 hours. Hence, these results suggest that the addition of Cu is detrimental to the TCD catalytic activity at operation temperatures <550° C., while the addition of Cu is beneficial at temperatures >600° C.

FIGS. 25A-25C show activity of Ni/CNT (ST), NiCu1/CNT (ST), and NiCu15/CNT (ST) as a function of time on stream at reaction temperatures of 550° C.-700° C. under 30 $cm^3$/min 30 vol % $CH_4$ in $N_2$. The background activity of the raw CNT was <0.2% $CH_4$ conversion and was ignored in the curve fitting. The fitting parameters can be found in Table 10.

TABLE 10

Fitting parameters for deactivation at solvothermal catalyst systems run at different temperatures (550, 600, 650, and 700° C.) and the carbon co-product that accumulates at the indicated time on stream, θ. The catalyst system sample weighed 0.2 g so all but one of the samples (Ni/CNT (ST) accumulated an amount of carbon that exceeded the mass of the MWCNT support (e.g., <0.18 g)at the indicated, final time on stream.

| Catalyst system | Cu mol fraction | Temperature (° C.) | $X_0$ (%) | k ($h^{-0.5}$) | θ (h) | Actual Carbon Yield ($g_C/g_{cat}$) | Predicted Carbon Yield ($g_C/g_{cat}$) |
|---|---|---|---|---|---|---|---|
| Ni/CNT (ST) | 0 | 550 | 56.3 | 0.373 | 5 | 24.3 | 24.4 |
| | | 600 | 135 | 3.09 | 0.87 | 0.282 | 0.251 |
| | | 650 | 6094 | 22.1 | 0.67 | 0.268 | 0.228 |
| | | 700 | 30.3 | 5.04 | 1 | 0.0235 | 0.0210 |
| NiCu1/CNT (ST) | 0.081 | 550 | 29.40 | 0.0787 | 5 | 3.50 | 1.71 |
| | | 600 | 62.6 | 0.309 | 5 | 2.52 | 2.61 |
| | | 650 | 225 | 4.50 | 0.53 | 0.266 | 0.187 |
| | | 700 | n/a | n/a | — | — | — |

TABLE 10-continued

Fitting parameters for deactivation at solvothermal catalyst systems run at different temperatures (550, 600, 650, and 700° C.) and the carbon co-product that accumulates at the indicated time on stream, θ. The catalyst system sample weighed 0.2 g so all but one of the samples (Ni/CNT (ST) accumulated an amount of carbon that exceeded the mass of the MWCNT support (e.g., <0.18 g)at the indicated, final time on stream.

| Catalyst system | Cu mol fraction | Temperature (° C.) | $X_0$ (%) | k ($h^{-0.5}$) | θ (h) | Actual Carbon Yield ($g_C/g_{cat}$) | Predicted Carbon Yield ($g_C/g_{cat}$) |
|---|---|---|---|---|---|---|---|
| NiCu15/CNT (ST) | 0.553 | 550 | 27.1 | 0.0943 | 5 | 1.88 | 1.55 |
| | | 600 | 32.1 | 0.0561 | 5 | 1.93 | 1.94 |
| | | 650 | 53.0 | 0.0150 | 5 | 3.11 | 3.39 |
| | | 700 | 88.6 | 1.68 | 4.3 | 1.24 | 0.666 |

Given the assumed functional form for the deactivation function, the mass of carbon at any time on stream, C(θ), can be estimated using Equations 5-7 as described herein.

The predicted amount of carbon co-product accumulated (e.g., carbon yield) closely tracked the actual amount of carbon measured in the reactor (FIG. 26), lending credence to the chosen functional form. On the basis of the adequate fits of both the instantaneous and the integral conversion, the projected carbon yield extrapolated the accumulation of carbon co-product to θ=∞ normalized by the weight of catalysts was calculated using Equation 8 as described herein.

Figure 27:
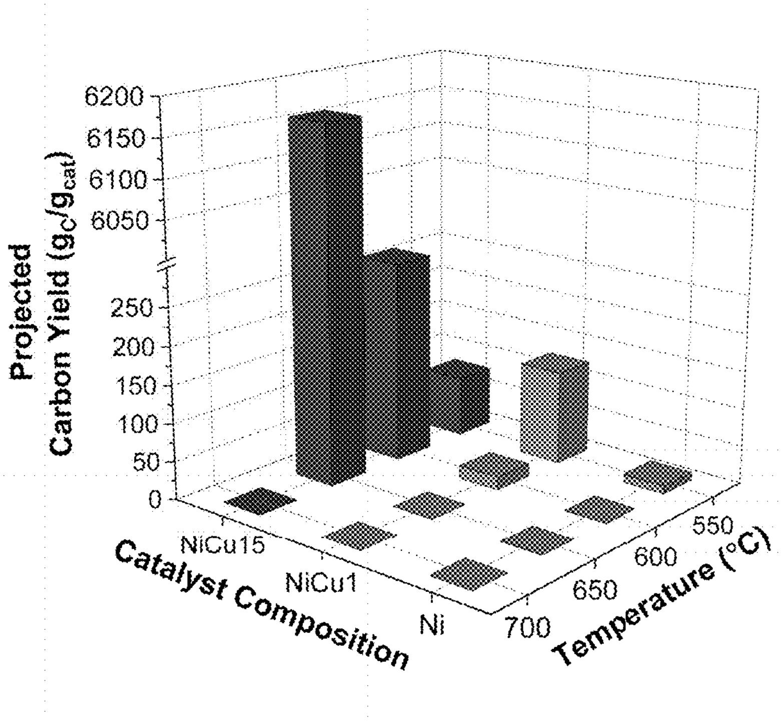
FIG. 27 is a plot showing the projected carbon yield calculated as projected carbon co-product accumulation of carbon at infinite residence divided by the weight of catalyst used according to Equation 8 (provided herein) as a function of the catalyst system composition and operating temperature for catalyst systems prepared by an ST method.
Figure 28A:
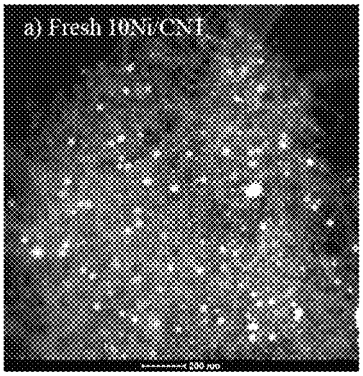
FIGS. 28A-28F show results obtained from using high-angle annular dark-field (HAADF) imaging using a scanning transmission electron microscope to analyze selected catalyst systems before ("fresh") and after reaction ("spent") at 600° C. using a methane composition flow rate of 30 $cm^3$/min with 30 vol % $CH_4$ in $N_2$.
Figure 28C:
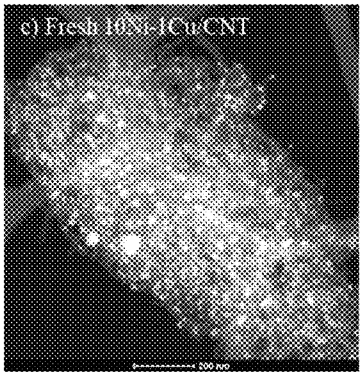
Figure 28E:
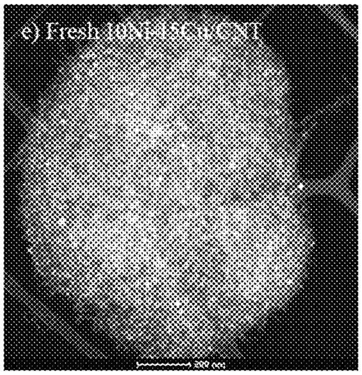
Figure 28B:
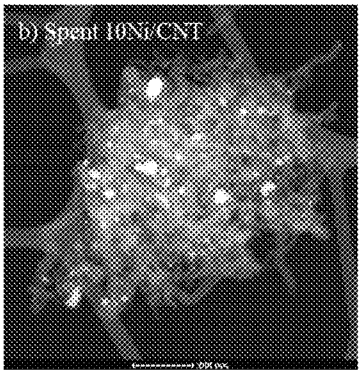
Figure 28D:
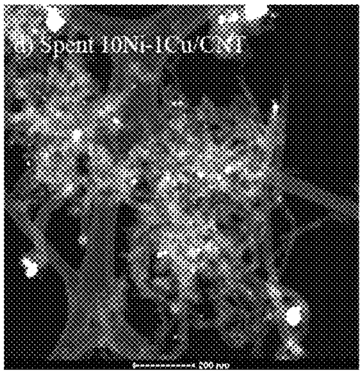
Figure 28F:
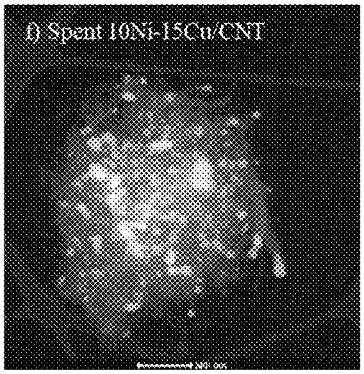
Figure 29A:
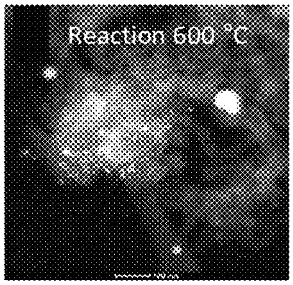
FIGS. 29A-29N show images obtained from elemental analysis of a spent NiCu1/CNT after reaction at 600° C.
Figure 29B:
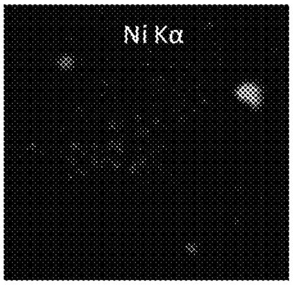
Figure 29C:
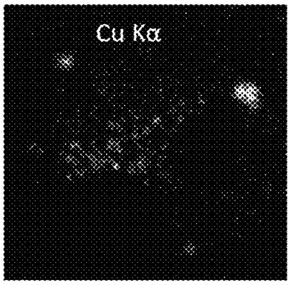
Figure 29D:
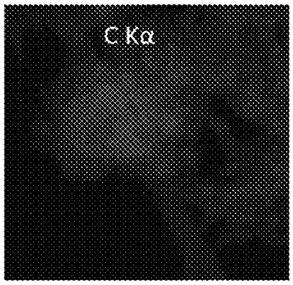
Figure 29E:
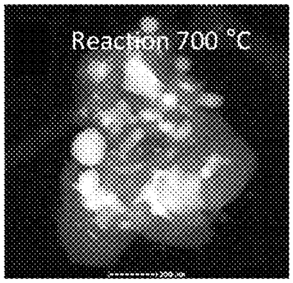
(FIGS. 29E-29L) using a methane composition flow rate of 30 $cm^3$/min with 30 vol. % $CH_4$ in $N_2$.
Figure 29F:
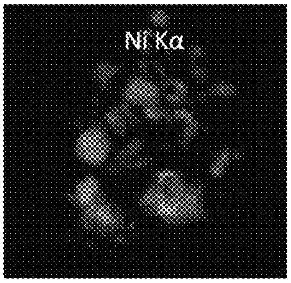
Figure 29G:
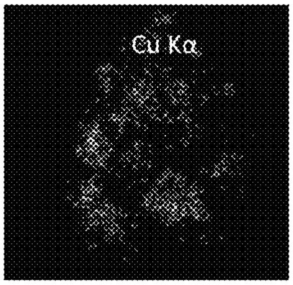
Figure 29H:
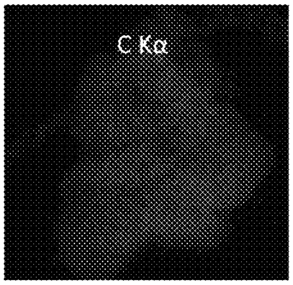
Figure 29I:
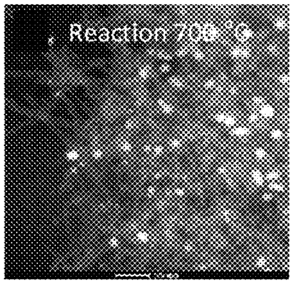
Figure 29J:
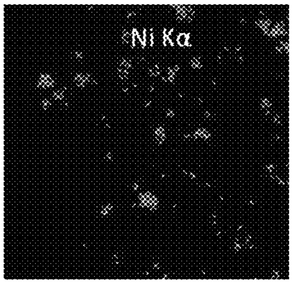
Figure 29K:
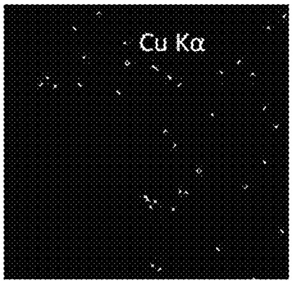
Figure 29L:
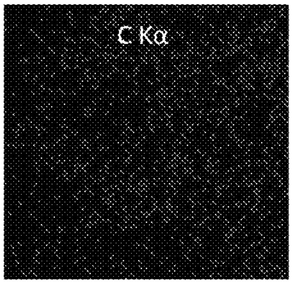
Figure 29M:
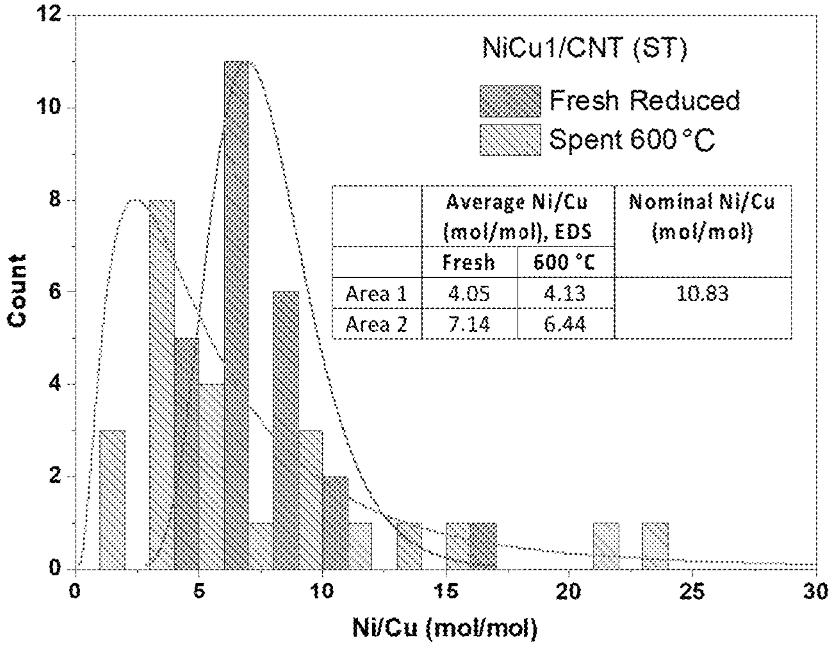
FIG. 29M is the histogram representing the change in elemental distribution between fresh and spent at 600° C.
Figure 29N:
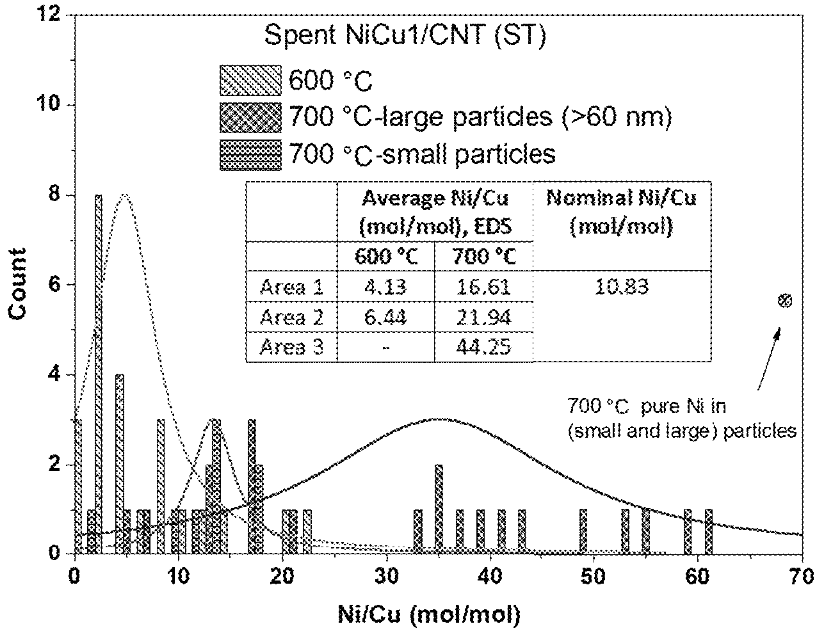
Figure 30A:
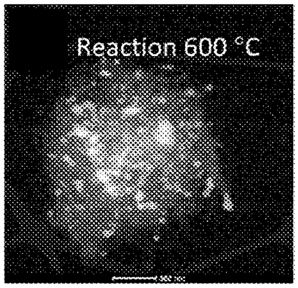
FIGS. 30A-30I show images obtained from elemental analysis of a spent NiCu15/CNT catalyst system after reaction at 600° C.
Figure 30B:
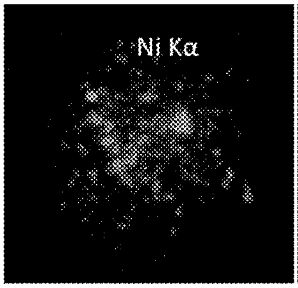
Figure 30C:
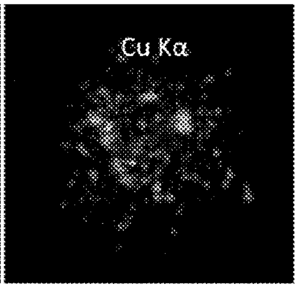
Figure 30D:
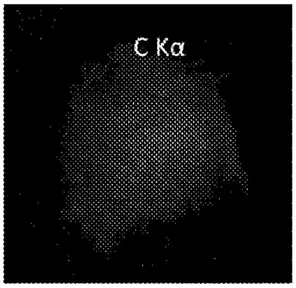
Figure 30E:
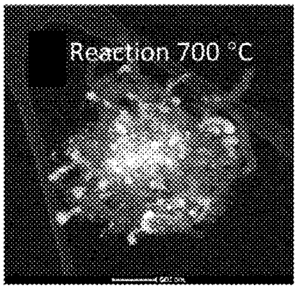
Figure 30F:
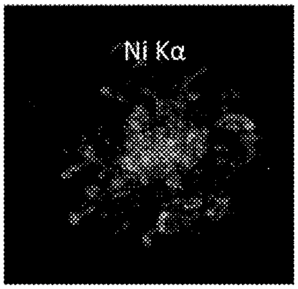
Figure 30G:
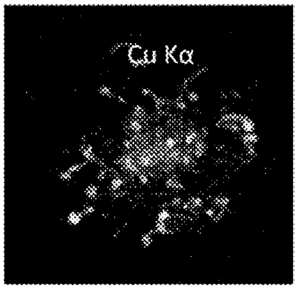
Figure 30H:
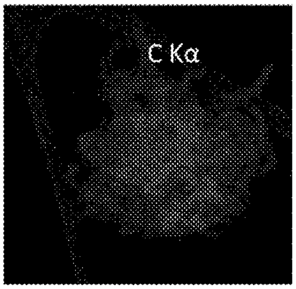
Figure 30I:
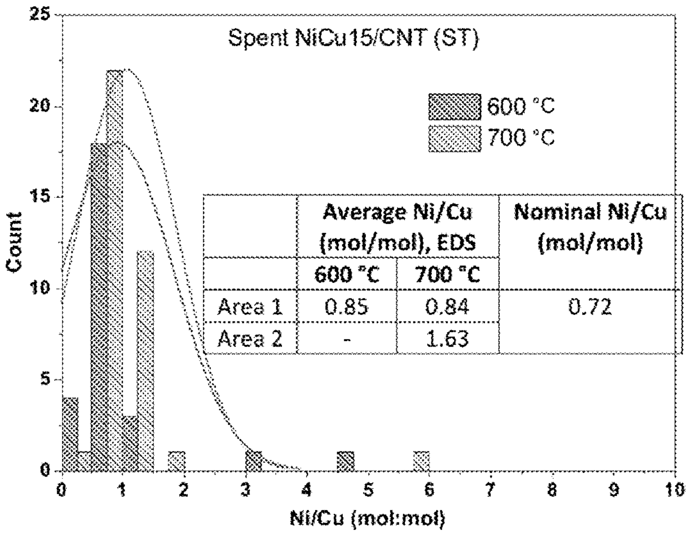
Figure 31A:
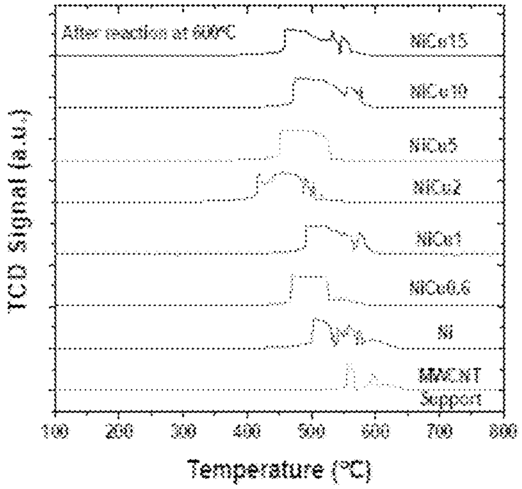
Figure 31B:
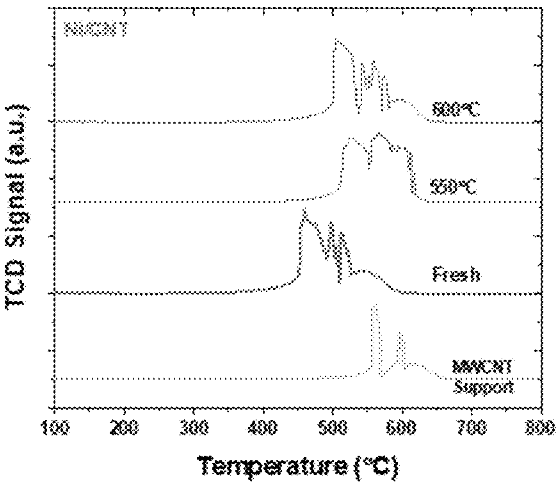
Figure 31C:
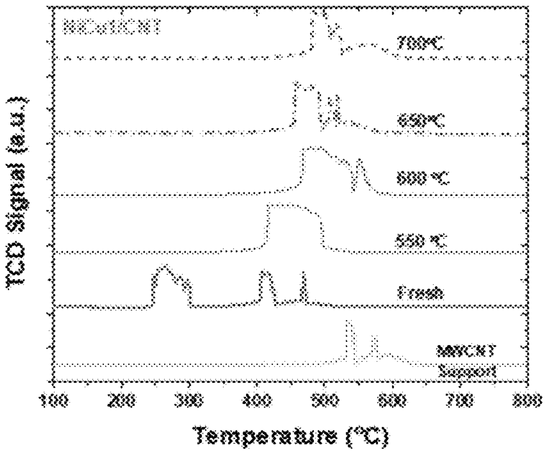
Figure 31D:
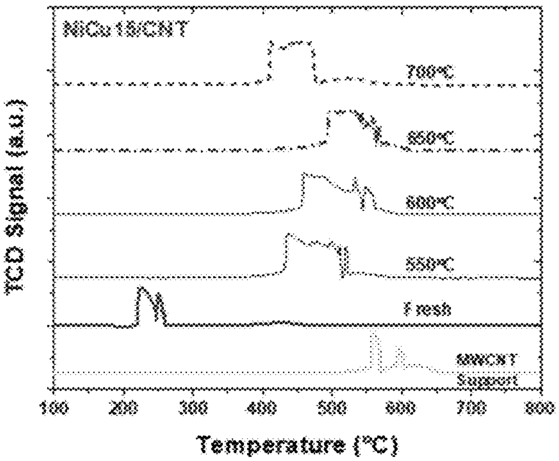
Figure 32A:
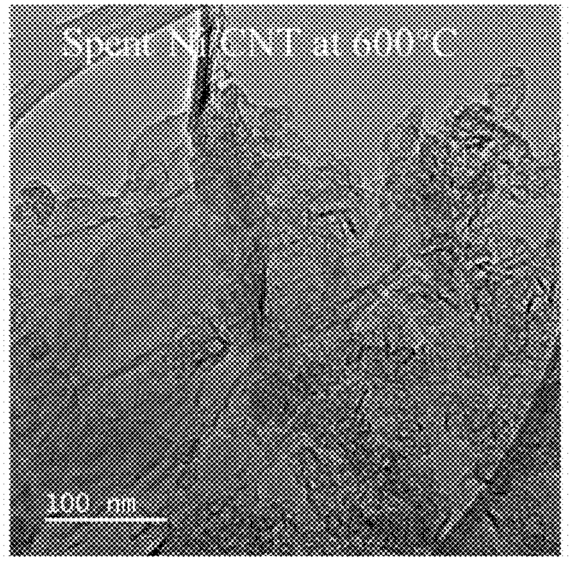
FIGS. 32A-32H show scanning transmission electron microscope (STEM) images of different catalyst systems after reaction ("spent") at 600° C.
Figure 32C:
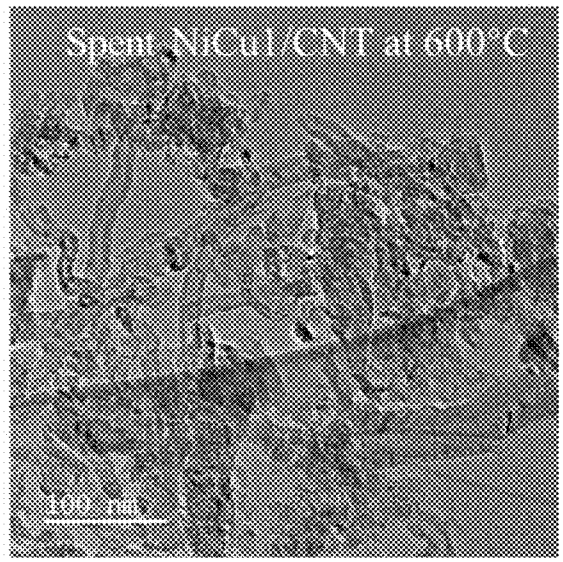
Figure 32B:
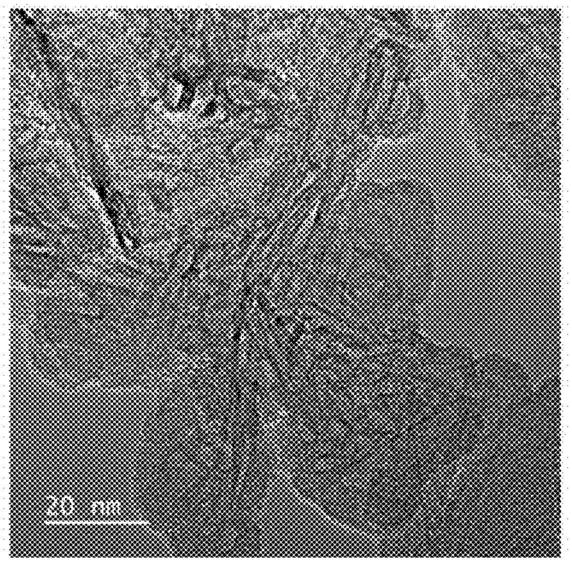
Figure 32D:
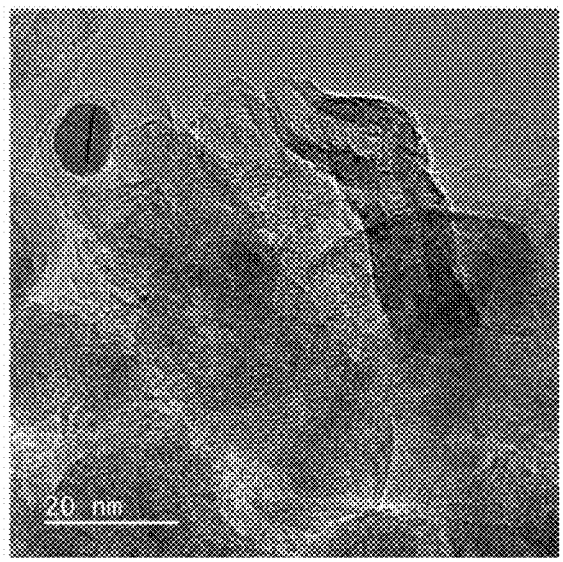
Figure 32E:
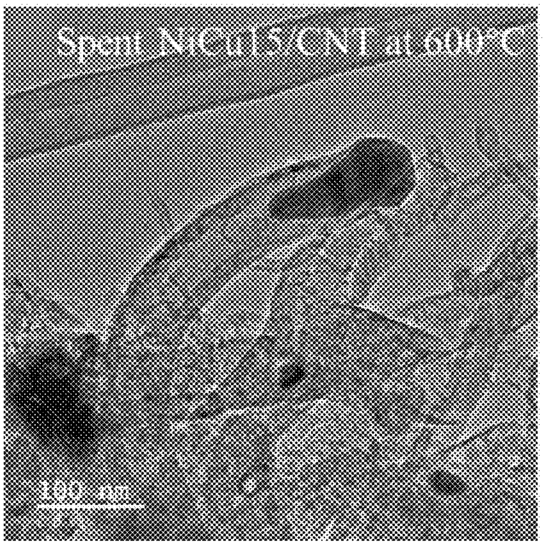
Figure 32G:
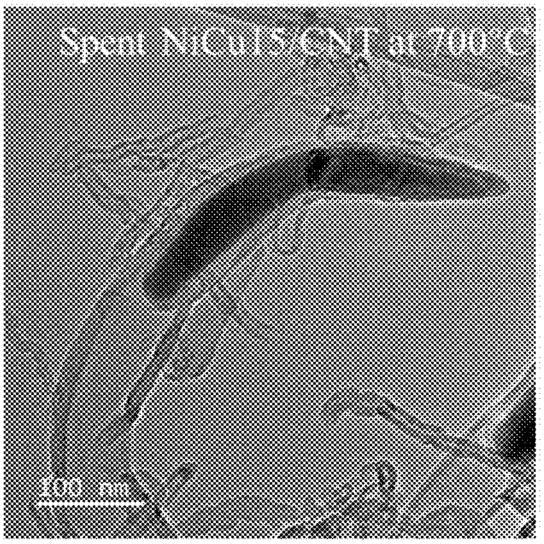
Figure 32F:
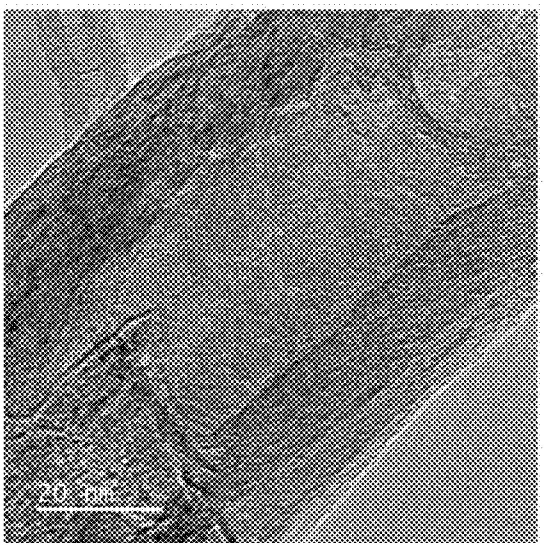
Figure 32H:
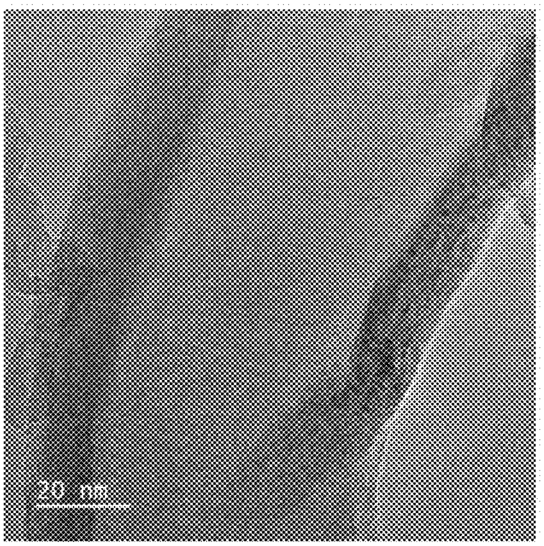
Figure 33A:
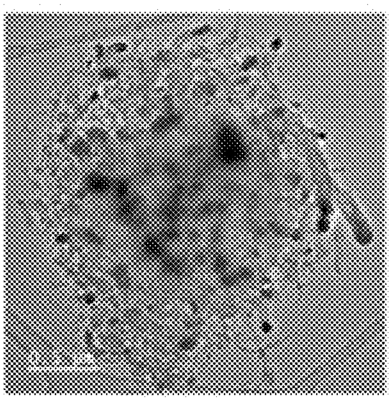
FIGS. 33A-33F show (STEM) images of a spent NiCu15/CNT catalyst system at 600° C. using a methane composition flow rate of 30 $cm^3$/min with 30 vol. % $CH_4$ in $N_2$.
Figure 33B:
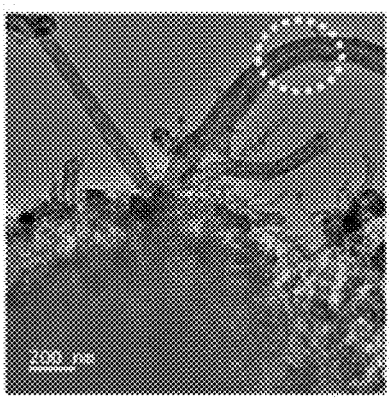
Figure 33C:
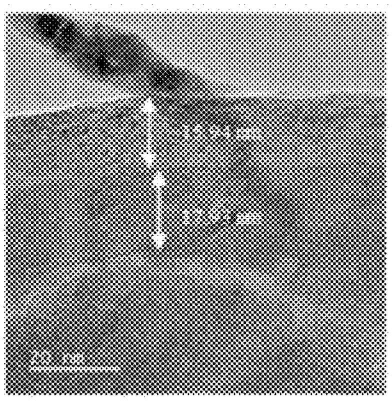
Figure 33D:
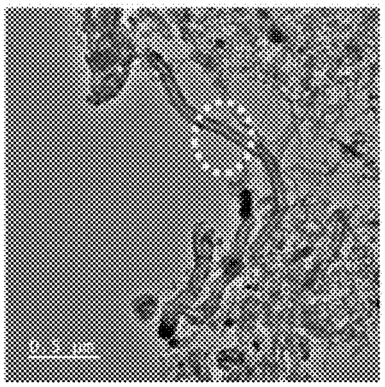
Figure 33E:
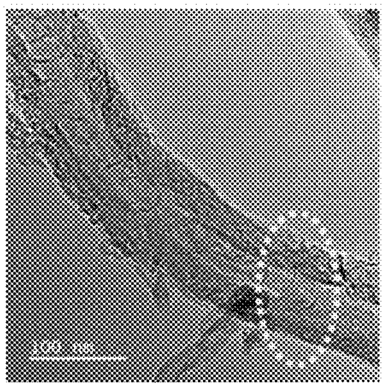
Figure 33F:
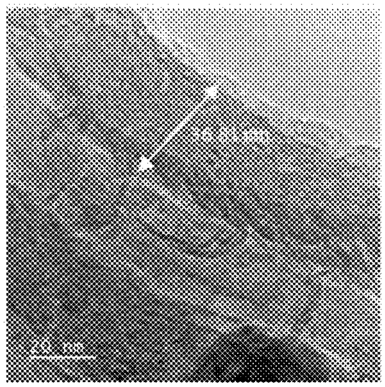
Figure 34A:
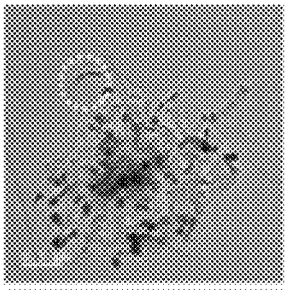
FIGS. 34A-34H show STEM images of a spent NiCu15/CNT catalyst system at 700° C. using a methane composition flow rate of 30 $cm^3$/min with 30 vol. % $CH_4$ in $N_2$.
Figure 34B:
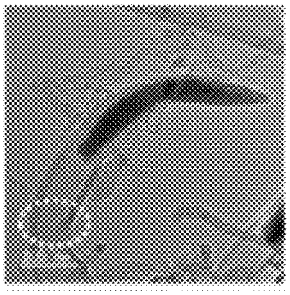
Figure 34C:
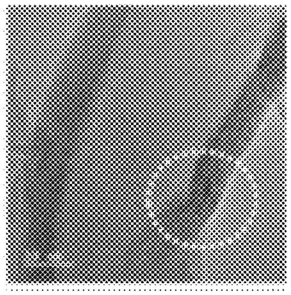
Figure 34D:
Figure 34E:
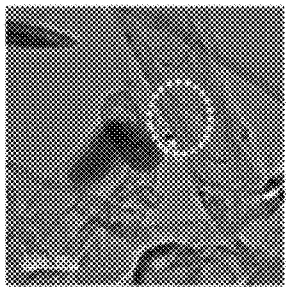
Figure 34F:
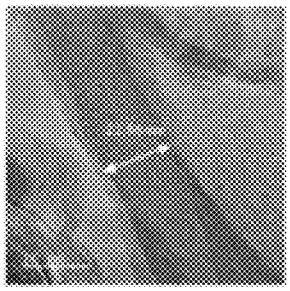
Figure 34G:
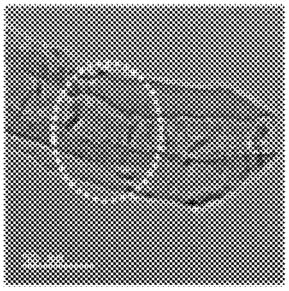
Figure 34H:
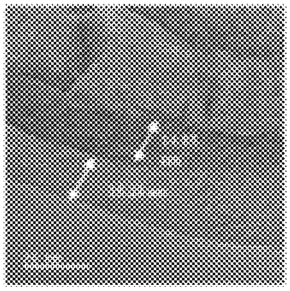
Figure 35A:
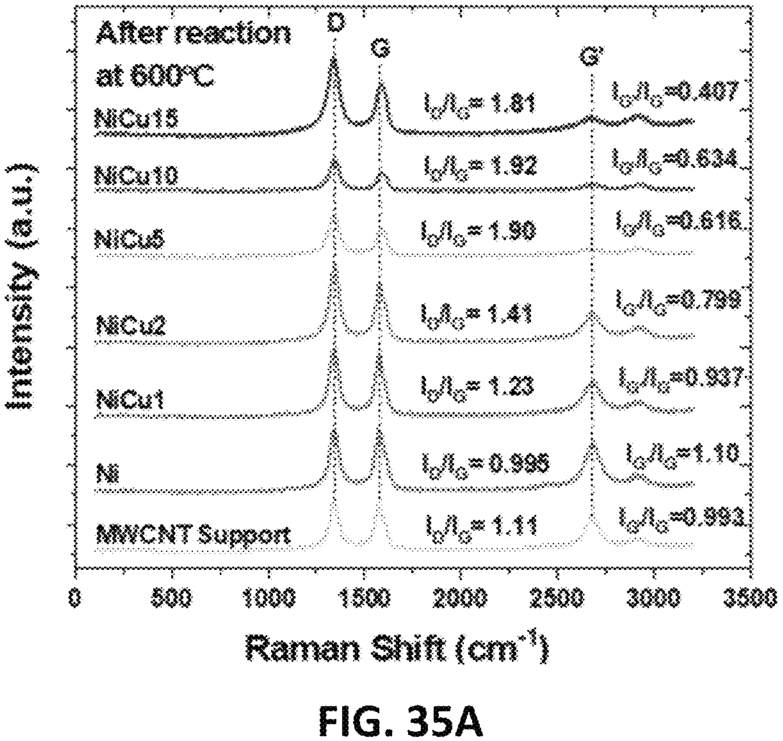
FIGS. 35A-35D show Raman spectra of spent catalyst systems made using an ST method and having different Ni:Cu ratios, wherein TCD was run at 600° C.
Figure 35B:
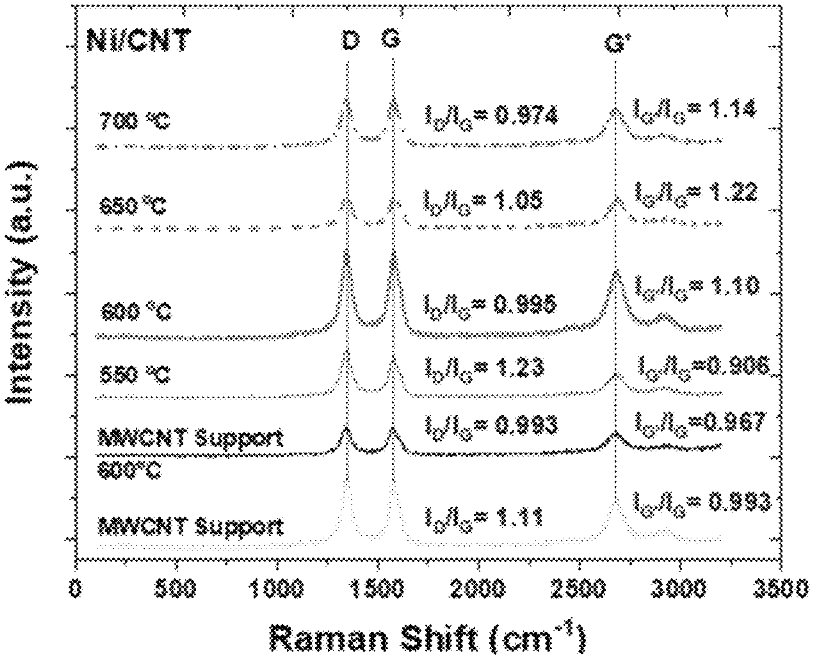
Figure 35C:
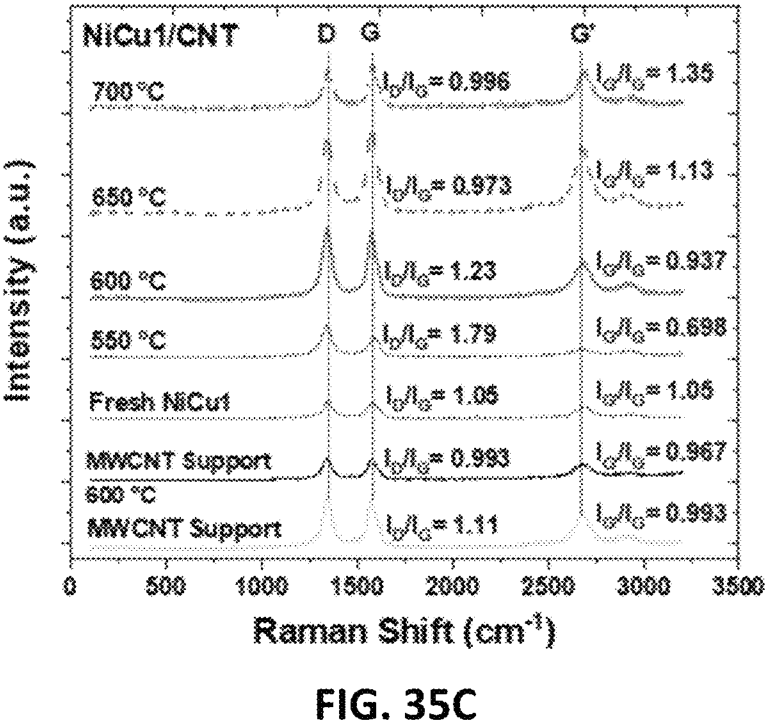
Figure 35D:
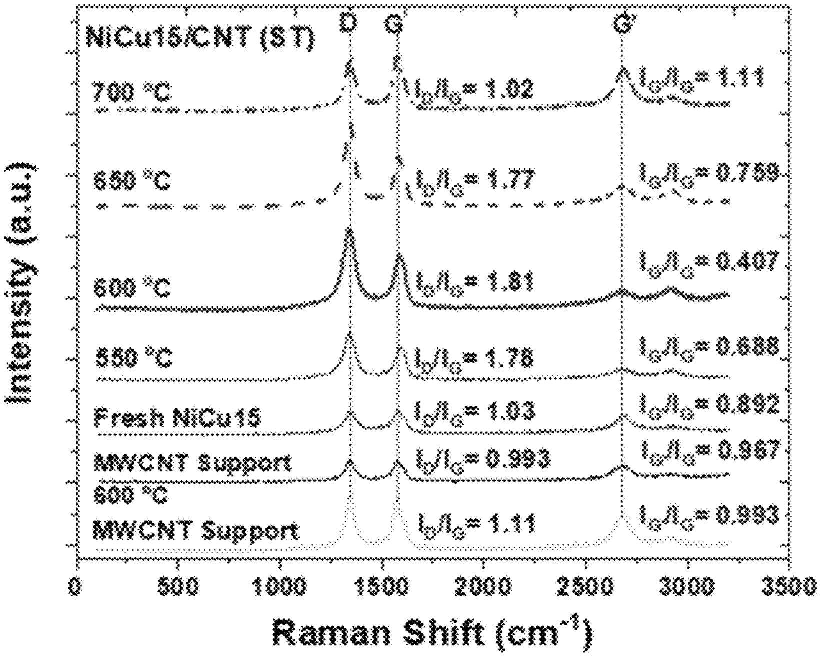

Those values exhibit a maximum that depends on both the operating temperature and catalyst system composition, represented by the mol fraction of Cu (FIG. 27). The carbon accumulation showed that there is an optimum in Ni:Cu ratio of at each operating temperature in this example.

Figure 26:
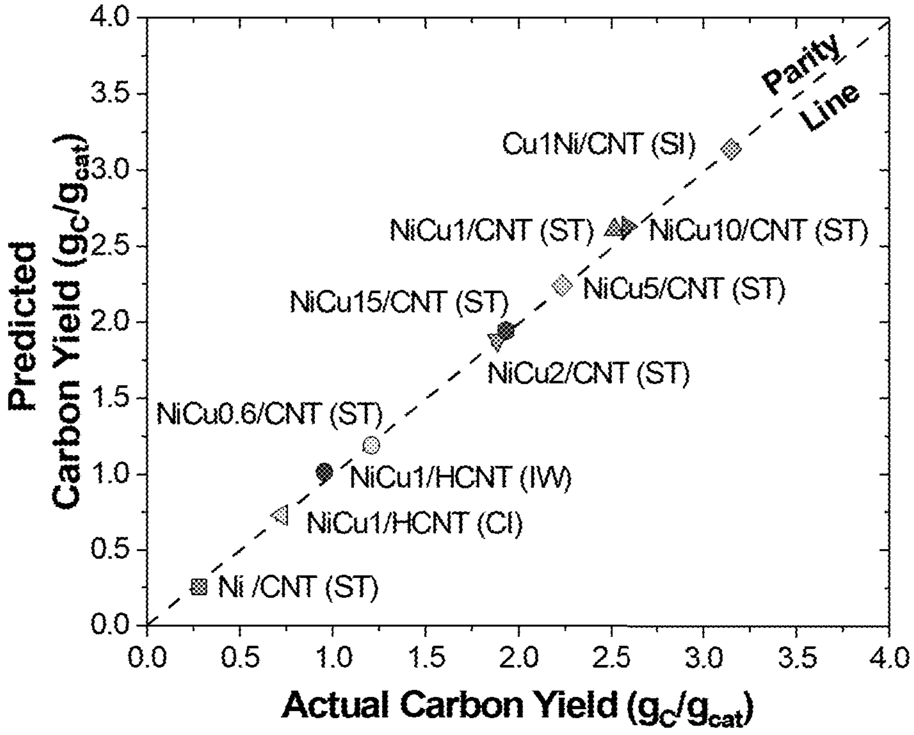
FIG. 26 is a parity plot of carbon yield calculated as the predicted or actual accumulated carbon co-product normalized by the weight of catalyst used at the time on stream shown in Table 7, provided herein.

FIG. 26 shows parity plot of carbon yield calculated as the predicted or actual accumulated carbon co-product normalized by the weight of catalyst used at the time on stream shown in Table 0.

FIG. 27 shows projected carbon yield calculated as projected carbon co-product accumulation of carbon at infinite residence divided by the weight of catalyst used according to Equation (8) as a function of the catalyst system composition and operating temperature for catalyst systems prepared by the solvothermal (ST) method.

The spent catalyst systems were analyzed via XRD to elucidate the role of Cu on catalyst system stability. The results show that metal particle restructuring might have caused catalyst system deactivation at the different reaction temperatures. For example, as shown in Table 9 the metal particles in Ni/CNT remained small at 9.2 nm when operating at 550° C. but sintered to larger metal particle sizes (14.6 nm to 19.4 nm) when the reaction temperature increased, suggesting that a cause of deactivation was metal sintering. NiCu1/CNT maintained small metal particle sizes and TCD activity at 550° C. and 600° C., which is consistent with the small change in metal particle size and Ni:Cu ratio observed with respect to the fresh material. However, NiCu1 deactivated at 650° C. in less than 1 hour while the metal particles sintered and segregated Cu into a secondary Cu-rich alloy. At 700° C., NiCu1 was not active for TCD and the composition and particle size remained similar to that of the fresh catalyst system, suggesting that the catalyst system deactivated before metal restructuring occurred.

It was speculated that the deactivation at higher temperatures might be caused by selective formation of graphitic carbon and subsequent plugging of the active site. Interestingly, NiCu15/CNT catalyst system had similar metal particle size (17.2 to 21.4 nm) at 550° C., 600° C., and 650° C. for which the catalyst system was active and stable; however, the Ni:Cu ratio of the metal particles changed with reaction condition. These results suggest there was a preferential segregation of Ni out of the metal particle at 550° C. by the change in Ni:Cu ratio with respect of the fresh catalyst system (0.133 and 0.790 respectively). At 600° C. and 650° C., the Ni:Cu ratio increased (0.254 and 0.418) suggesting that the segregation of Ni was less at higher reaction temperatures. At 700° C., the Ni:Cu ratio of the metal particles was similar to that of fresh catalyst system (0.676 and 0.790), further corroborating that the Ni segregation is less at higher temperatures; however, the metal particle size only stabilized to 10.4 nm (from 8.60 nm on the fresh catalyst system as opposed to the larger metal particle size observed at the lowest temperatures. It was speculated that the slow deactivation at 700° C. was caused by the poisoning of active sites before they could stabilize to the preferential particle morphology (e.g., <0.254 Ni:Cu ratio and >17 nm). In this example, these results suggest that the role of Cu is to stabilize large metal particles (>17 nm); however, increasing the reaction temperatures cause metal migration and changes the Ni:Cu ratio below the required to stabilize the large metal particles. The properties of the carbon co-product form might also play a role on the catalyst system stability, which is explored in the following section.

Example 15

Figure 23A:
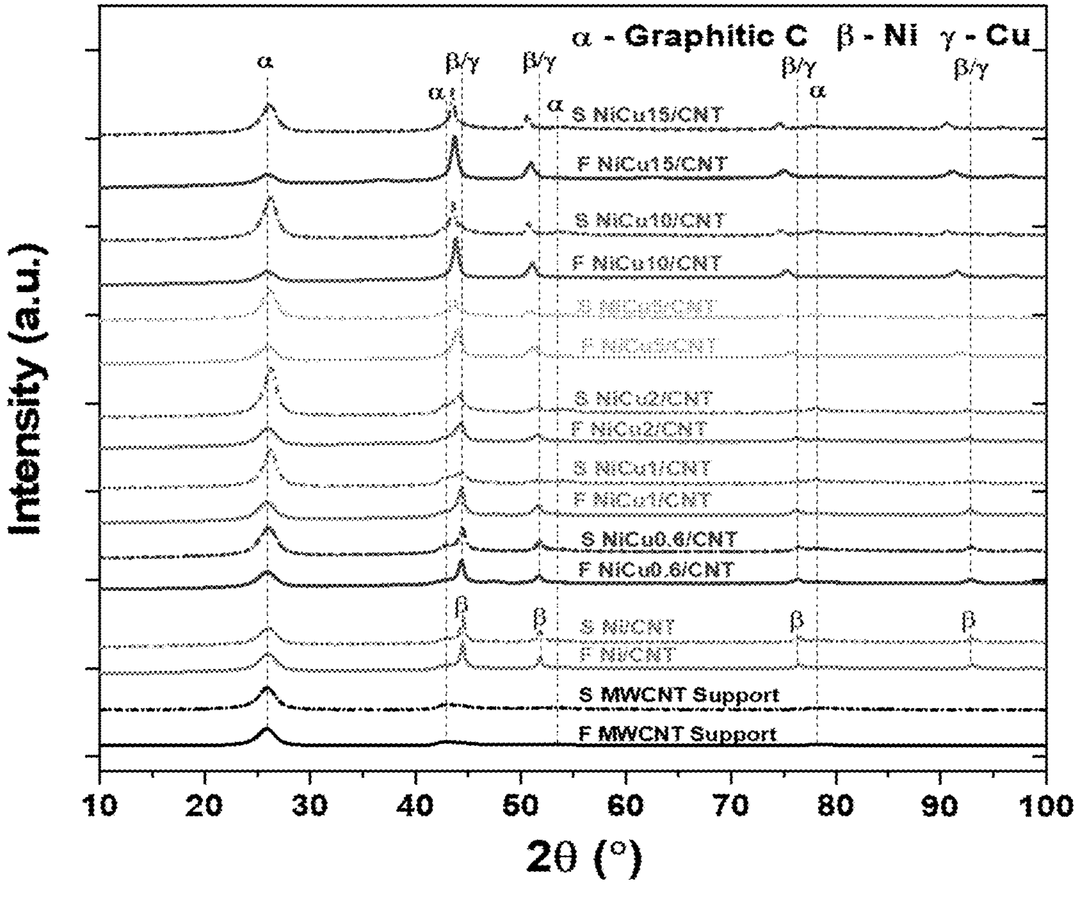
FIGS. 23A-23B show XRD patterns of fresh reduced ("F") and spent ("S") forms of an ST-synthesized NiCux/CNT catalyst system (FIG. 23A) and a Ni1Cux/CNT catalyst system prepared by different synthesis methods (IW, CI, and SI), wherein the fresh catalyst systems were reduced at 400° C. for 4 hours in 5 vol % $H_2$ in $N_2$ and the spent catalyst systems were retrieved after TCD reaction at 600° C. using a methane composition flow rate of 30 $cm^3$/min with 30 vol % $CH_4$ in $N_2$.
Figure 23B:
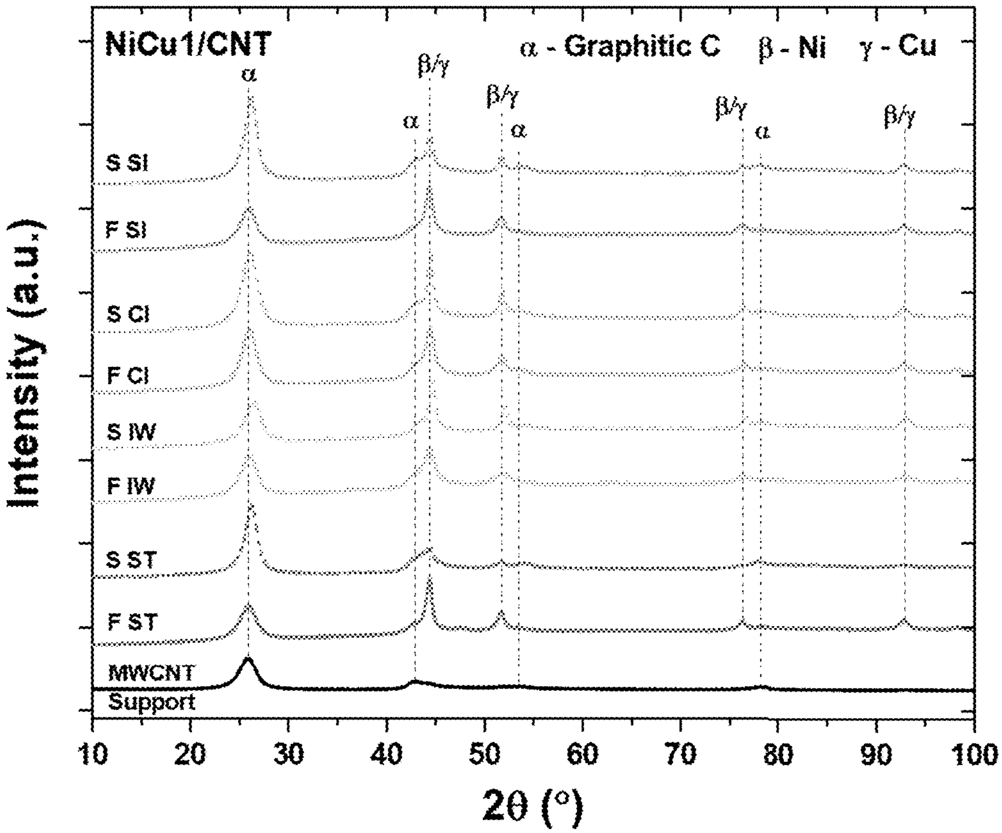
Figure 24A:
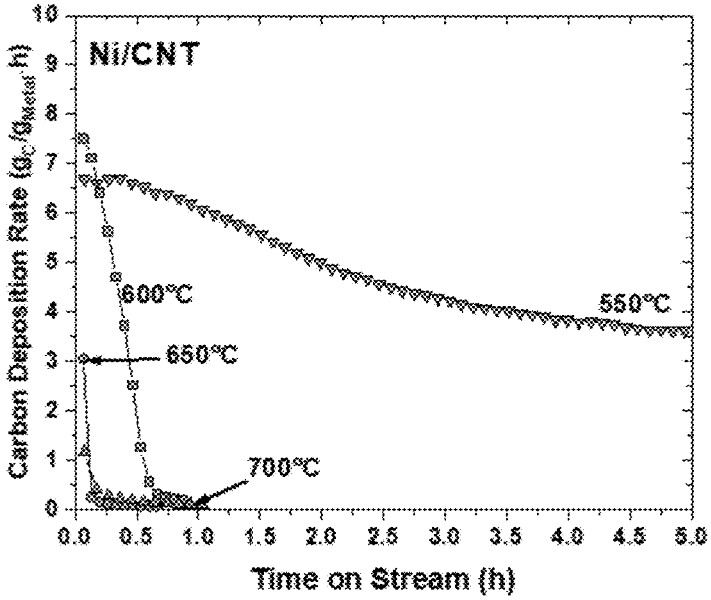
FIGS. 24A-24F show results for carbon deposition rate (FIGS. 24A-24C) and carbon yield (FIGS. 24D-24F) for Ni/CNT, NiCu1/CNT, and NiCu15/CNT at different reaction temperatures (550° C. to 700° C.) as a function of TOS using a methane composition flow rate of 30 $cm^3$/min with 30 vol. % $CH_4$ in $N_2$.
Figure 24B:
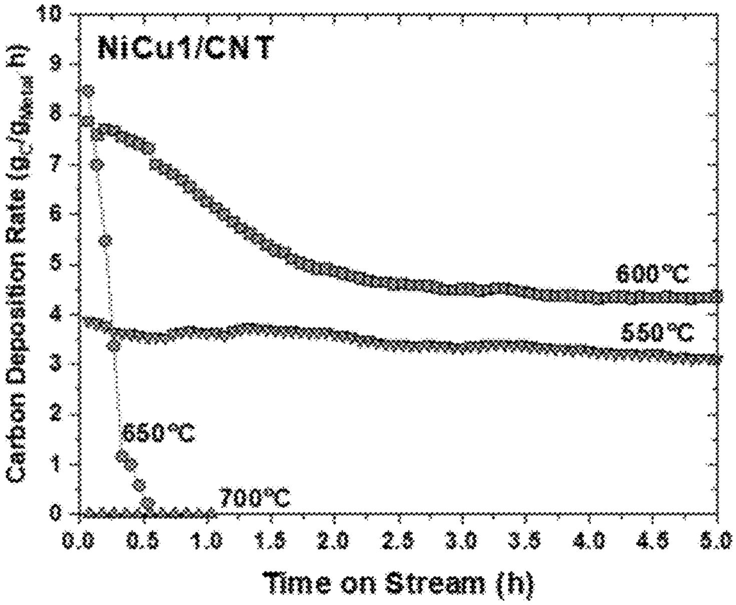
Figure 24C:
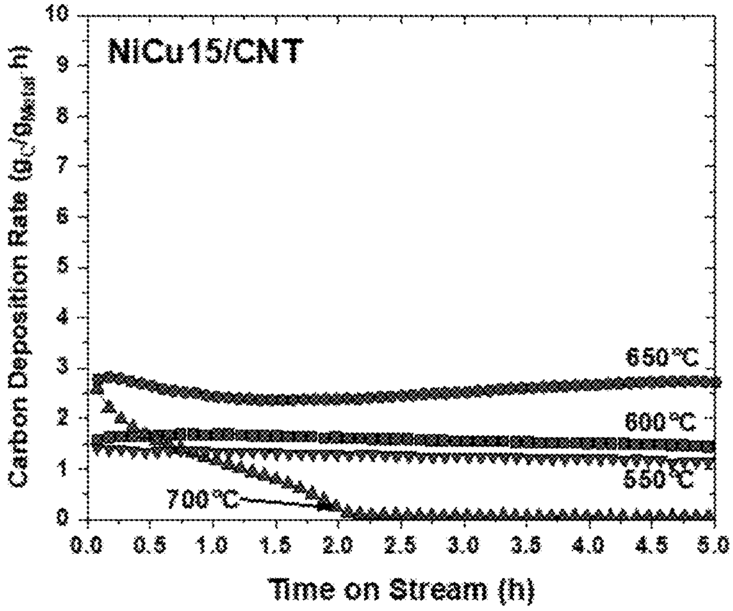
Figure 24D:
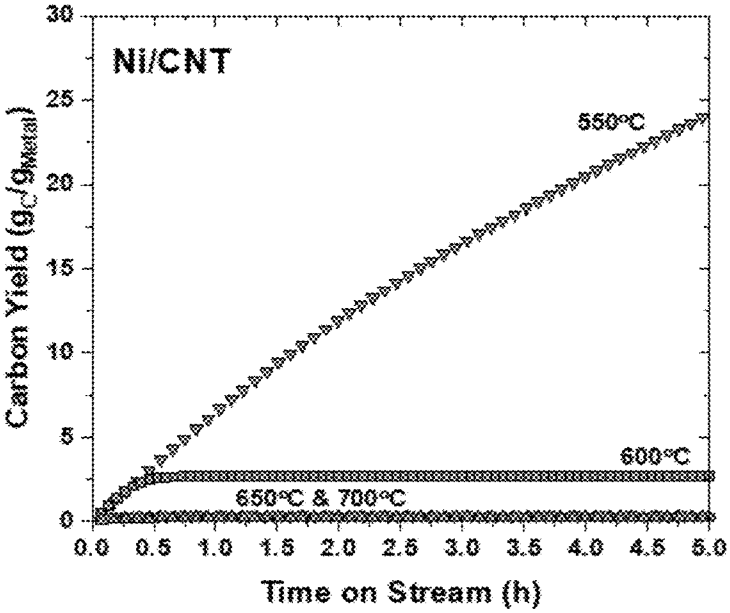
Figure 24E:
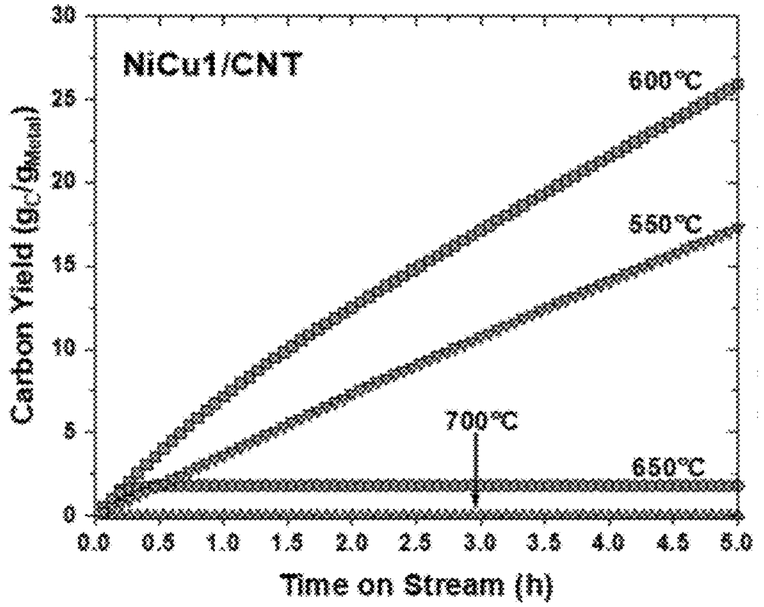
Figure 24F:
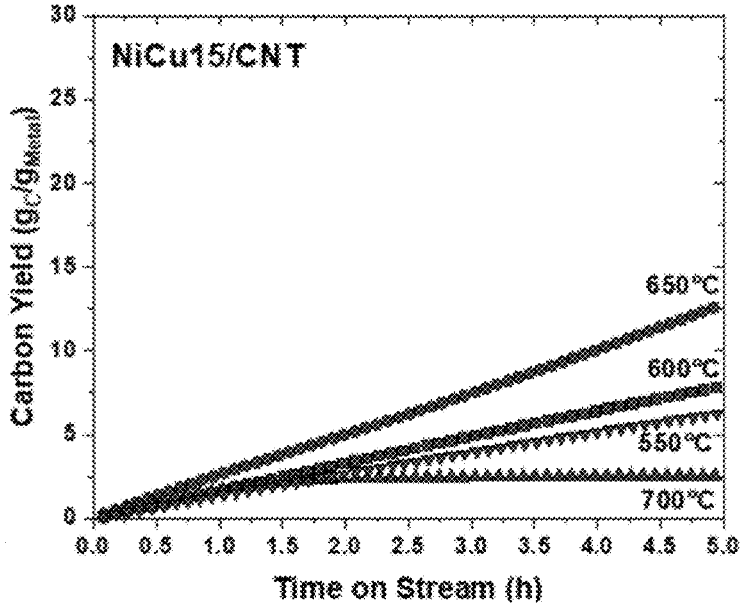

As shown in FIGS. 23A-23B, XRD of the catalyst system run at 600° C. reveals that the graphitic carbon features increase as the Ni and NiCu alloy metal features decrease corroborating the deposition of carbon. TPO of the spent samples run at 600° C. shows the deposited carbon co-product was mainly composed of crystalline carbon with oxidation temperatures was between 400° C. and 500° C. as opposed to amorphous carbon which typically oxidizes at 200° C.-350° C. (see FIGS. 31A-31D). The oxidation temperature of the commercial (raw) MWCNT decreases from 500° C.-550° C. to 200° C.-250° C. upon the additional of NiCu bimetallic metal nanoparticles (e.g., fresh NiCux/CNT), suggesting that the bimetallic particles are catalyzing the oxidation reaction. However, the spent NiCux/CNT materials exhibited oxidation temperatures between 400° C. and 450° C. (in the presence of bimetallic nanoparticles), suggesting that the CNT formed during the TCD reaction have higher thermal stability than the commercial CNTs used in this example as support. While the presence of monometallic 10 wt % Ni lowered the oxidation temperature of the spent material with respect to raw MWCNT by ≈50°

C., the addition of up to 15 wt % Cu to 10 wt % Ni further lowered the oxidation temperature by an additional ≈50° C. It was speculated this is caused by the increase in metal content that can catalyze the oxidation reaction at lower temperatures as opposed to a change in carbon co-product composition.

FIGS. 28A-28F show high-angle annular dark-field (HAADF) imaging using a scanning transmission electron microscope (STEM) of selected catalyst system before (fresh) and after reaction (spent) at 600° C. under 30 $cm^3$/min 30 vol % $CH_4$ in $N_2$. Associated elemental maps obtained with Energy-Dispersive Spectroscopy (EDS) can be found in FIGS. 29A-29N and FIGS. 30A-30I. FIGS. 28A-28F show the STEM images of selected samples after reaction at 600° C. revealing the selective formation of CNT as carbon co-product as well as the morphology and size of the metal particles. Overall, all the fresh catalyst systems are composed of a wide range of metal particles between 10 nm and 20 nm as XRD suggested; however, the spent catalyst system was composed of larger >50 nm (as well as <20 nm) particles for the three different compositions, which suggests that metal sintering took place during the TCD reaction. The XRD analysis summarized in Table 8 also showed metal particle sintering but did not capture the formation of the larger metal nanoparticles. It was speculated that the larger metal nanoparticles observed by STEM are domains of multiple smaller crystals, which explains why the XRD analysis did not fully capture them. It was determined that Ni and Cu remain in the metal particle regardless of the metal particle size; however, there appear to be changes in the Ni:Cu ratios of the spent materials and formation of Ni-rich and Cu-rich particles as revealed by the XRD analysis. More importantly, the HAADF STEM micrographs of the spent catalyst systems also reveal the selective formation of CNTs as the main solid co-product on the large metal nanoparticles. FIGS. 32A-32H shows the differences in morphologies of CNT produced by the different catalyst systems highlighting the role that Ni:Cu ratio played. FIGS. 32A-32H are scanning transmission electron microscope (STEM) images of selected catalyst system after reaction (spent) at a-c) 600° C. and d) 700° C. under 30 $cm^3$/min 30 vol % $CH_4$ in $N_2$. Additional STEM images can be found in FIGS. 33A-33F and FIGS. 34A-34H.

The addition of 1 wt % Cu (e.g., NiCu1/CNT) produced multiwall CNT carbon co-product, which had a wall diameter ≈5 nm. Further increasing the Cu loading resulted in the formation of larger Ni:Cu metal particles, which generated large CNT with wall thickness >10 nm. FIGS. 33A-33F depict more STEM images of spent NiCu15/CNT at 600° C. The changes in carbon co-product morphology depicted in this example as a function of metal particle size is consistent with previous reports.

FIGS. 35A-35D show Raman spectra of a) spent solvothermal (ST) catalyst systems with different Ni:Cu ratio run at 600° C., b) Ni/CNT, c) NiCu1/CNT, and d) NiCu15/CNT run at different temperatures under 30 $cm^3$/min 30 vol % $CH_4$ in $N_2$. The spectra were collected using a 10 mW laser at a 532 nm excitation wavelength. With the exception of Ni/CNT run at >600° C., all the other catalyst system run at 700° C., and CNT support, >80% of the mass of the catalyst system was composed of carbon co-product generated during TCD.

Raman spectroscopy can be used to assess the carbon quality using the three main bands: a) D-band (1340 $cm^{-1}$) associated with defects in the graphitic lattice, 2) G-band (1580 $cm^{-1}$) associated with ordered carbon, and 3) G'-band (or 2D band, 2700 $cm^{-1}$) associated with interactions between stacked graphene layers that can be used to distinguish between single-wall CNTs (SWCNTs) or multi-wall CNTs (MWCNTs). FIGS. 35A-35D show the $I_D/I_G$ and $I_{G'}/I_G$ ratios of the spent catalyst systems compared to the pristine support (MWCNT Support), pristine support run under reaction conditions, and fresh catalyst systems. The results reveal a direct correlation with the Ni:Cu ratio and the $I_D/I_G$ and $I_{G'}/I_G$ ratios of the generated CNT. For example, the $I_D/I_G$ ratio was similar for the as received MWCNT (1.11) and MWCNT after exposed to reaction conditions (0.993) as well as the fresh catalyst systems (1.05 to 1.0); however, the spent catalyst systems showed a different $I_D/I_G$ ratio suggesting that the CNT generated during TCD had different properties to that of the starting support. With the exception of Ni/CNT (ST) and NiCu1/HCNT (CI), the rest of the catalyst systems had a similar final carbon deposited per gram of catalyst (>4 $g_{carbon\ co\text{-}product}/g_{carbon\ support}$); hence, in this example, the changes in $I_D/I_G$ and $I_{G'}/I_G$ ratios as a function of Ni:Cu composition can be attributed to changes in the morphology of the deposited carbon co-product. Ni/CNT was only active for 1 hour at 600° C. and there was little carbon deposited (~1 $g_{carbon\ co\text{-}product}/g_{carbon\ support}$), hence the Raman features is similar to that of the CNT support. As the Ni:Cu ratio decreases (e.g., higher Cu loadings), the $I_D/I_G$ ratio increases suggesting that the produced carbon co-product has a higher defect density, which may be caused by the larger diameter and wall thickness of the CNT co-product. The $I_{G'}/I_G$ ratio decreases with the increase in Cu loading (e.g., decrease in Ni:Cu ratio) which is consistent with the presence of multiwall CNT (multiwall CNT) with higher number of walls. The Raman observations are consistent with the (HAADF) STEM images which showed the formation of multiwall CNT with wider diameter (and wall thickness), FIGS. 28A-28F and FIGS. 32A-32H. The larger diameter multiwall CNT were formed due to the restructuring of metal into larger domains and crystallite, which is also consistent with the XRD analysis.

Figure 36:
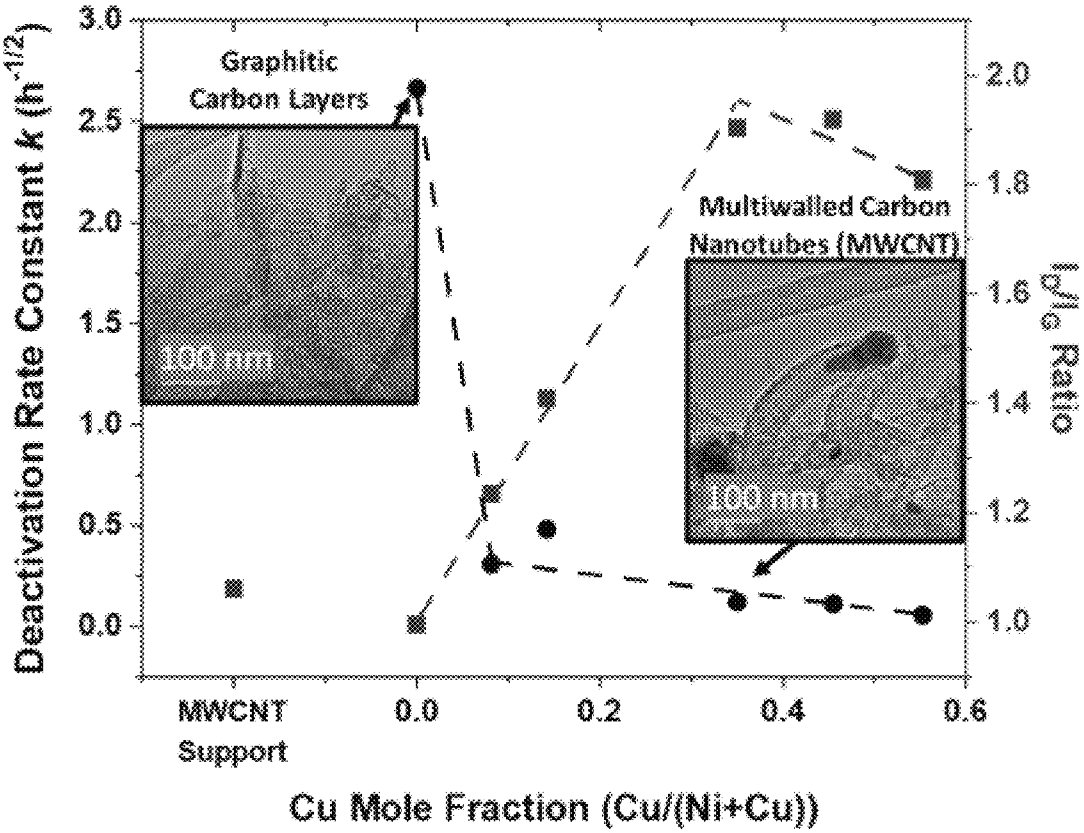
FIG. 36 shows results illustrating the deactivation rate constant and Raman $I_D/I_G$ ratios obtained from analyzing carbon co-products obtained when using a catalyst system of NiCux/CNT (wherein x=0, 0.6, 1, 2, 5, 10, 15), prepared using an ST method, in TCD at a reaction temperature of 600° C. using a methane composition flow rate of 30 $cm^3$/min with 30 vol % $CH_4$ in $N_2$.

The amount of Cu addition to Ni can therefore be directly correlated to both catalyst system stability and quality of the carbon as evidenced by Raman spectroscopy. FIG. 36 compares both the $I_D/I_G$ ratio of the carbon product and the deactivation rate after reaction at 600° C. as a function of Cu mol fraction. A small increase in Cu mol fraction (e.g. 0.081; NiCu1/CNT) significantly reduced the deactivation rate constant from 2.77 to 0.42 $h^{-05}$ (85% decrease), while increasing the $I_D/I_G$ ratio from 1.00 to 1.23 (23% increase). However, further increase in Cu loading had less effect on deactivation rate relative to the $I_D/I_G$ ratio. For example, by nearly doubling the Cu mol fraction from 0.081 to 0.142 little change in deactivation rate was observed (0.48 versus 0.42). However, the $I_D/I_G$ ratio increased from 1.23 to 1.41. The $I_D/Ig$ ratio reached a plateau of ~1.9 with Cu mol fractions between 0.35 and 0.55.

FIG. 36 show deactivation rate constant and Raman $I_D/I_G$ ratio of resulting carbon product for NiCux/CNT (x=0, 0.6, 1, 2, 5, 10, 15) catalyst systems prepared by solvothermal method at reaction temperature of 600° C. under 30 $cm^3$/min 30 vol % $CH_4$ in $N_2$. The deactivation rate constants and $I_D/I_G$ ratios are taken from Table 7 and FIGS. 35A-35D, respectively.

Example 16

As shown in FIGS. 35A-35D, both $I_D/I_G$ and $I_{G'}/I_G$ ratios change with reaction temperature as well as Ni:Cu ratio. Ni/CNT run at 550° C. showed slightly higher $I_D/I_G$ ratio compared to that of the CNT support (1.23 and 1.11 respectively), suggesting that the properties of the CNT co-product generated are similar to that of the CNT support. The Raman spectra collected at higher reaction temperatures with 10Ni/CNT was similar to that of the CNT support because the catalyst system had low carbon yield (at 600° C.) or was inactive (650 and 700° C.) due to the fast deactivation. NiCu1/CNT at 550° C. had similar TCD performance to 10Ni/CNT but showed a higher $I_D/I_G$ ratio (1.79 and 1.23 respectively) highlighting the effect of Ni:Cu ratio on the carbon-coproduct morphology. At 600° C., the NiCu1 TCD performance resembled that at 550° C. but the $I_D/I_G$ ratio decreased from 1.79 to 1.23. it was speculated that this is partially caused by the change in metal particle size (Table 10) via metal sintering resulting in the formation of CNT with different diameters and wall thicknesses. At 650 and 700° C., the NiCu1/CNT $I_D/I_G$ ratio further decreases to about 1.0 due to low carbon deposition, resulting in a near identical $I_D/I_G$ ratio compared to the CNT support. NiCu15/CNT at 550° C. had similar TCD performance to NiCu1/CNT and had nearly identical $I_D/I_G$ (1.78 and 1.79 respectively) and $I_G/I_G$ (0.690 for both) regardless of the differences in the initial metal particle size and Ni:Cu composition. In this example, this result suggests that both catalytic systems might generate similar active sites (e.g., larger metal particles) under reaction conditions resulting in similar CNT morphologies. At 600 and 650° C., NiCu15/CNT remain active and stable for TCD and the resulting carbon co-product had similar $I_D/I_G$ ratio (1.81 and 1.77 respectively) suggesting that the stabilized active was similar as at 550° C. As shown in Table 11, the crystallite sizes derived from XRD of the spent NiCu15/CNT catalyst systems remained similar regardless of the reaction temperature (between 17.2 and 21.4 nm), suggesting that the crystallite size is the main factor dictating the morphology of the carbon co-product. At 700° C., NiCu15/CNT was the most active and stable catalyst system tested but deactivated within 2 hours of reaction, resulting in low overall carbon deposition. Hence, the obtained Raman signal comes mostly from the CNT support as evidence by the similar $I_D/I_G$ and $I_G/I_G$ ratios of the NiCu15/CNT and support.

As shown in Table 11 the crystallite size (10.4 nm and 8.6 nm) and Ni:Cu molar ratio (0.676 and 0.790) of the spent NiCu15/CNT remained similar to that of the fresh catalyst system suggesting that a fraction of the metal nanoparticles deactivated before restructuring into the larger crystallite needed to catalyze the stable TCD reaction. HAADF-STEM images of the NiCu15/CNT catalyst system run at 700° C. confirms that the spent catalyst system still had sections of intact ≈10 nm NiCu metal particle (FIGS. 30A-30I). Other examples also showed that >15 nm particles are needed to catalyze the TCD reaction and selective CNT formation; however, ≤10 nm metal particles deactivate due to the preferential formation of graphitic layers (and metal particle blockage) as opposed to CNT. FIGS. 32A-32H and FIGS. 30A-30I confirmed that >50 nm nanoparticles were still formed at 700° C. which explained the initial TCD. STEM images of the spent NiCu15/CNT at 700° C. reveal that the carbon co-product formed on the >50 nm metal particles was primarily multiwall CNT with wall thickness >14 nm. Hence, Cu serves dual purposes for the TCD reaction; 1) modifies the carbon co-product morphology to multiwall CNT and 2) causes the metal particles to restructure into larger metal particles, which are more stable for TCD at higher temperatures and selective towards the formation of multiwall CNT.

Examples 9-16 investigated the role of Cu in the TCD performance of Ni—Cu/CNT catalyst systems. The examples showed that crystallite size, Ni:Cu ratio, and operating temperature were key factors for TCD activity, stability, and carbon coproduct morphology. NiCu catalyst system synthesized with different Ni:Cu ratios offered different benefits as a function of reaction temperature. At 550° C., there was a detrimental TCD activity effect with addition of Cu; however, the resulting carbon co-product had different properties. At 600° C. the addition of Cu benefitted the TCD activity and stability and modified the properties of the carbon co-product. At >650° C., only the catalyst system with high Cu loading remained active and stable for TCD.

Characterization of the catalyst systems after reaction revealed that the addition of Cu to Ni results in the stabilization of larger metal nanoparticles, which are more stable

TABLE 11

Crystallite sizes and composition of spent solvothermal Ni/CNT, NiCu1/CNT, and NiCu15/CNT catalyst systems based on XRD analysis. The spent catalyst systems were retrieved after reaction at different temperatures (550, 600, 650, and 700° C.) under 30 $cm^3$/min 30 vol. % $CH_4$ in $N_2$.

| | 550° C. Ni-rich alloy | | | 600° C. Ni-rich alloy | | |
|---|---|---|---|---|---|---|
| Spent catalyst systems | wt. % (%) | Ni:Cu (mol/mol) | Crystallite size (nm) | wt. % (%) | Ni:Cu (mol/mol) | Crystallite size (nm) |
| Ni/CNCT (ST) | 100 | — | 9.20 | 100 | — | 16.9 |
| NiCu1/CNT (ST) | BDL[a] | BDL[a] | BDL[a] | 100 | 17.6 | 9.40 |
| NiCu15/CNT (ST) | 100 | 0.133 | 21.4 | 100 | 0.254 | 17.2 |

| | 650° C. Ni-rich alloy | | | 650° C. Cu-rich alloy | | | 700° C. Ni-rich alloy | | |
|---|---|---|---|---|---|---|---|---|---|
| Spent catalyst systems | wt % (%) | Ni:Cu (mol/mol) | Crystallite size (nm) | wt. % (%) | Ni:Cu (mol/mol) | Crystallite size (nm) | wt. % (%) | Ni:Cu (mol/mol) | Crystallite size (nm) |
| Ni/CNCT (ST) | 100 | — | 18.3 | — | — | | 100 | — | 14.6 |
| NiCu1/CNT (ST) | 87 | ∞ | 19.4 | 13. | 2.80 | 27.0 | 100 | 19.7 | 14.6 |
| NiCu15/CNT (ST) | 100 | 0.418 | 21.5 | — | — | — | 100 | 0.676 | 10.4 |

[a]Below Detection Limit: The features of the metal were too dilute due to carbon formation and potential metal fragmentation and crystallite properties could not be determined.s for TCD at higher reaction temperatures and more selective towards CNT growth. In the absence of Cu, bamboo-shaped CNT was the main morphology observed and the addition of Cu resulted in a change in CNT morphology to multiwall CNT. In all cases, the active site restructuring by the preferential segregation of Cu out of the NiCu alloy (e.g., the Ni:Cu ratio increases) and change in metal particle size. At low Cu loadings (e.g., high Ni:Cu ratio) the catalyst system deactivated at reaction temperatures >600° C. due to the encapsulation of the metal active sites before restructuring and loss of Cu. At high Cu loadings (e.g., low Ni:Cu ratio), reaction temperatures between 550 and 650° C. caused metal particle restructuring into <17 nm particles with higher Ni:Cu loading compared to the fresh catalyst system, which resulted in the preferential multiwall CNT formation. Operation at 700° C. caused encapsulation of metal particles before being able to restructure, resulting in catalyst system deactivation. These examples highlight how catalyst system composition and operation conditions can be used to optimize catalyst system stability and yield different carbon co-product morphologies generated during methane TCD.

In view of the many possible aspects to which the principles of the present disclosure may be applied, it should be recognized that the illustrated embodiments are only preferred examples and should not be taken as limiting the scope of the present disclosure. Rather, the scope is defined by the following claims. We therefore claim as our invention all that comes within the scope and spirit of these claims.

We claim:

1. A method, comprising:

contacting a methane composition with a thermocatalytic catalyst system at a reaction temperature ranging from 500° C. to 700° C. to produce $H_2$ and a carbon co-product, wherein the thermocatalytic catalyst system comprises a Ni—Cu alloy catalyst and a support separating the thermocatalytic catalyst system from the carbon co-product;

contacting the carbon co-product with a solution comprising a first metal that is Ni or Cu to impregnate the carbon co-product with the first metal, thereby forming an impregnated support;

heating the impregnated support using a ramping temperature protocol to provide a pre-catalyst system, wherein the ramping temperature protocol comprises increasing a temperature to which the impregnated support is exposed by 5° C. per minute until a final temperature of 350° C. is reached;

contacting the pre-catalyst system with a solution comprising a second metal that is Ni or Cu to re-form the thermocatalytic catalyst system;

reusing the thermocatalytic catalyst system to produce further amounts of $H_2$ and the carbon co-product;

wherein the first metal and the second metal are different.

2. The method of claim 1, wherein separating the thermocatalytic catalyst system from the carbon co-product comprises:

contacting the thermocatalytic catalyst system and the carbon co-product with an acid to produce a suspension comprising (i) the carbon co-product and (ii) a liquid solution; and separating the carbon co-product from the liquid solution.

3. The method of claim 1, wherein the carbon co-product is treated with an acid prior to contacting the carbon co-product with the first metal.

4. The method of claim 1, wherein the reaction temperature is 600° C., and the carbon co-product has an ID/IG ratio ranging from 1 to 2, and/or an $I_G/I_G$ ratio lower than 0.70.

5. The method of claim 1, wherein the reaction temperature ranges from 550° C. to 700° C., the methane composition comprises 30 vol % $CH_4$, and the $H_2$ is produced at a rate ranging from 0.5 to 15 g $H_2$/(g metal·h).

6. The method of claim 1, wherein the reaction temperature ranges from 550° C. to 700° C., and the carbon co-product is produced at carbon deposition rate ranging from 1 to 4 g carbon/(g metal·h).

7. The method of claim 1, wherein the reaction temperature ranges from 600° C. to 650° C., and the methane composition is converted to $H_2$ at a $CH_4$ conversion rate of at least 25% for at least 4 hours.

8. The method of claim 1, wherein the reaction temperature ranges from 670° C. to 700° C., and the methane composition is converted to $H_2$ at a $CH_4$ conversion rate of at least 10% for at least 1.5 hours.

9. The method of claim 1, wherein the Ni—Cu alloy catalyst comprises nanoparticles having an average particle size ranging from greater than 0 nm to 10 nm before the the methane composition is contacted with the thermocatalytic catalyst system.

10. The method of claim 9, wherein the nanoparticles exhibit a particle size change after the methane composition is contacted with the thermocatalytic catalyst system at a reaction temperature of 600° C., and the Ni—Cu alloy catalyst comprises nanoparticles that exhibit a size change ranging from 40% to 110% after reaction.

11. The method of claim 1, wherein the Ni and Cu of the Ni—Cu alloy catalyst are present at a Ni:Cu mass ratio ranging from greater than zero to 4.5.

12. The method of claim 1, wherein the Ni and Cu of the Ni—Cu alloy catalyst are present at a Ni:Cu mass ratio ranging from 0.6 to 0.7.

13. The method of claim 1, wherein the Ni and Cu of the Ni—Cu alloy catalyst are present at a Ni:Cu mass ratio ranging from 0.1 to 2; and the reaction temperature ranges from 550° C. to 700° C.

14. A method, comprising:

contacting a methane composition with a thermocatalytic catalyst system at a reaction temperature ranging from 600° C. to 650° C. to produce $H_2$ and a carbon nanotube, wherein the thermocatalytic catalyst system comprises a Ni—Cu alloy catalyst and a carbonaceous support separating the thermocatalytic catalyst system from the carbon nanotube;

contacting the carbon nanotube with a solution comprising a first metal that is Ni or Cu to impregnate the carbon nanotube with the first metal, thereby forming an impregnated nanotube;

heating the impregnated nanotube using a ramping temperature protocol to provide a pre-catalyst system, wherein the ramping temperature protocol comprises increasing a temperature to which the impregnated nanotube is exposed by 5° C. per minute until a final temperature of 350° C. is reached;

contacting the pre-catalyst system with a solution comprising a second metal that is Ni or Cu to re-form the thermocatalytic catalyst system;

reusing the thermocatalytic catalyst system to produce additional $H_2$ and carbon nanotubes;

wherein the first metal and the second metal are different.

15. A method for making a catalyst system, comprising:

i) contacting a solution comprising a first metal with a support material to impregnate the support material with the first metal, thereby forming an impregnated support;

ii) heating the impregnated support using a ramping temperature protocol to provide a pre-catalyst system, wherein the ramping temperature protocol comprises increasing a temperature to which the impregnated support is exposed by 5° C. per minute until a final temperature of 350° C. is reached;

iii) contacting the pre-catalyst system with a solution comprising a second metal to form a bimetallic impregnated support; and (iv) heating the bimetallic impregnated support using the ramping temperature protocol to provide the catalyst system;

wherein the first metal and the second metal are different from each other and independently are selected from Ni and Cu.

16. The method of claim 15, further comprising performing a preliminary heating step before performing the ramping temperature protocol, wherein the preliminary heating step comprises heating the impregnated support at a temperature ranging from 130° C. to 200° C. for a time period ranging from 6 hours to 10 hours.

17. The method of claim 15, wherein the first metal and the second metal are provided by metal precursors selected from $Ni(NO_3)_2 \cdot 6H_2O$, $Ni(NO_3)_2 \cdot 6H_2O$, $NiCl_2$, $NiCl_2 \cdot 6H_2O$, $NiBr_2$, $NiF_2$, $NiBr_2 \cdot 3H_2O$, $Cu(NO_3)_2 \cdot 2.5H_2O$, $CuSO_4$, $CuCl_2$, $Cu(NO_3)_2$, $Cu(NO_3)_2 \cdot 3H_2O$, CuO, $Cu(CH_3COO)_2$, $Cu_3(PO_4)_2$, $Cu(ClO_4)_2$, $CuO_2$, $Cu(hfac)_2$, $CuO_3Si$, $Cu(CO_2CH_3)$, $Cu(NH_3)_4$, $Cu(SCN)_2$, $Cu(NH_3)_4SO_4 \cdot H_2O$, $Cu(OH)_2$, and $CuBr_2$.

18. A method, comprising:

separating a carbon product from a mixture comprising the carbon product and a catalyst system to provide an amount of isolated carbon product;

contacting a portion of the amount of isolated carbon product with a solution comprising a first metal that is Ni or Cu to impregnate the isolated carbon product with the first metal, thereby forming an impregnated support;

heating the impregnated support using a ramping temperature protocol to provide a pre-catalyst system, wherein the ramping temperature protocol comprises increasing a temperature to which the impregnated support is exposed by 5° C. per minute until a final temperature of 350° C. is reached; and contacting the pre-catalyst system with a solution comprising a second metal that is Ni or Cu to form a regenerated catalyst system;

wherein the first metal and the second metal are different.

19. The method of claim 18, further comprising using the regenerated catalyst system to produce $H_2$ and a carbon co-product from methane.

20. The method of claim 18, wherein the first metal and the second metal are provided by metal precursors selected from $Ni(NO_3)_2 \cdot 6H_2O$, $Ni(NO_3)_2 \cdot 6H_2O$, $NiCl_2$, $NiCl_2 \cdot 6H_2O$, $NiBr_2$, $NiF_2$, $NiBr_2 \cdot 3H_2O$, $Cu(NO_3)_2 \cdot 2.5H_2O$, $CuSO_4$, $CuCl_2$, $Cu(NO_3)_2$, $Cu(NO_3)_2 \cdot 3H_2O$, CuO, $Cu(CH_3COO)_2$, $Cu_3(PO_4)_2$, $Cu(ClO_4)_2$, $CuO_2$, $Cu(hfac)_2$, $CuO_3Si$, $Cu(CO_2CH_3)$, $Cu(NH_3)_4$, $Cu(SCN)_2$, $Cu(NH_3)_4SO_4 \cdot H_2O$, $Cu(OH)_2$, and $CuBr_2$.

* * * * *